United States Patent
Klefenz

(10) Patent No.: US 8,121,350 B2
(45) Date of Patent: Feb. 21, 2012

(54) APPARATUS, METHOD AND COMPUTER PROGRAM FOR DETERMINING A POSITION ON THE BASIS OF A CAMERA IMAGE FROM A CAMERA

(75) Inventor: Franz Klefenz, Mannheim (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 380 days.

(21) Appl. No.: 12/521,359

(22) PCT Filed: Dec. 27, 2007

(86) PCT No.: PCT/EP2007/011437
§ 371 (c)(1),
(2), (4) Date: Sep. 1, 2009

(87) PCT Pub. No.: WO2008/080606
PCT Pub. Date: Jul. 10, 2008

(65) Prior Publication Data
US 2010/0329513 A1    Dec. 30, 2010

(30) Foreign Application Priority Data
Dec. 29, 2006 (DE) .................. 10 2006 062 061

(51) Int. Cl.
*G06K 9/00* (2006.01)
*H04N 9/00* (2006.01)
(52) U.S. Cl. ........................ 382/104; 348/148
(58) Field of Classification Search .............. 382/100, 382/103–104, 106–107, 195, 190; 348/113, 348/148–149, 222.1; 345/173, 441–443; 715/863; 455/456.1; 340/907, 933; 701/1–7, 701/207
See application file for complete search history.

(56) References Cited

U.S. PATENT DOCUMENTS
5,072,396 A    12/1991    Fitzpatrick et al.
(Continued)

FOREIGN PATENT DOCUMENTS
DE    195 05 487 A1    9/1995
(Continued)

OTHER PUBLICATIONS

Ha V. Le, et al., "Video-Assisted Global Positioning in Terrain Navigation: Hough Transform Solution," http://web.archive.org/web/20050301104010/http://citeseer.ist.psu.edu/556994.html, 8 pages.

(Continued)

*Primary Examiner* — Samir Ahmed
*Assistant Examiner* — Mehdi Rashidian
(74) *Attorney, Agent, or Firm* — Keating & Bennett, LLP

(57) ABSTRACT

An apparatus for determining a position on the basis of a camera image from a camera includes a Hough transformer, a positional description establisher and a database comparator. The Hough transformer is formed to identify circular arcs or elliptical arcs in the camera image or in a preprocessed version of the camera image derived therefrom, and to identify a plurality of straight stretches passing in various directions through the camera image or through the preprocessed version. The positional description establisher is formed to obtain a positional description describing the identified circular arcs or elliptical arcs and the identified straight stretches by parameters, on the basis of the identified circular arcs or elliptical arcs and on the identified straight stretches. The database comparator further is formed to compare the positional description with a plurality of comparative positional descriptions and to obtain information on a position as a result of the comparison.

21 Claims, 25 Drawing Sheets

U.S. PATENT DOCUMENTS

| | | | |
|---|---|---|---|
| 5,130,709 | A | 7/1992 | Toyama et al. |
| 5,530,420 | A | 6/1996 | Tsuchiya et al. |
| 5,762,292 | A | 6/1998 | Joshi |
| 5,781,437 | A | 7/1998 | Wiemer et al. |
| 5,944,768 | A | 8/1999 | Ito et al. |
| 6,018,697 | A | 1/2000 | Morimoto et al. |
| 6,023,290 | A | 2/2000 | Seita |
| 6,233,523 | B1 | 5/2001 | Sood |
| 6,314,364 | B1 | 11/2001 | Nakamura |
| 6,363,160 | B1 | 3/2002 | Bradski et al. |
| 6,414,712 | B1 | 7/2002 | Wanielik et al. |
| 6,442,510 | B1 | 8/2002 | Klefenz |
| 6,560,529 | B1 | 5/2003 | Janssen |
| 6,732,046 | B1 | 5/2004 | Joshi |
| 6,801,638 | B1 | 10/2004 | Janssen et al. |
| 6,810,323 | B1 | 10/2004 | Bullock et al. |
| 7,007,011 | B1 | 2/2006 | Joshi |
| 7,064,262 | B2 | 6/2006 | Klefenz et al. |
| 2001/0029428 | A1 | 10/2001 | Huertgen et al. |
| 2001/0036293 | A1* | 11/2001 | Laumeyer et al. ............ 382/104 |
| 2001/0055373 | A1 | 12/2001 | Yamashita |
| 2001/0056326 | A1 | 12/2001 | Kimura |
| 2002/0031242 | A1 | 3/2002 | Yasui et al. |
| 2002/0065739 | A1 | 5/2002 | Florance et al. |
| 2002/0075282 | A1 | 6/2002 | Vetterli et al. |
| 2002/0085095 | A1 | 7/2002 | Janssen |
| 2002/0114518 | A1 | 8/2002 | Josh |
| 2002/0130953 | A1* | 9/2002 | Riconda et al. ............... 348/115 |
| 2002/0163521 | A1 | 11/2002 | Ellenby et al. |
| 2002/0169537 | A1 | 11/2002 | Regensburger et al. |
| 2003/0151664 | A1 | 8/2003 | Wakimoto et al. |
| 2004/0006422 | A1 | 1/2004 | Fehr et al. |
| 2004/0215377 | A1 | 10/2004 | Yun |
| 2004/0236506 | A1 | 11/2004 | Kolb et al. |
| 2005/0027439 | A1 | 2/2005 | Schoepp |
| 2005/0065721 | A1 | 3/2005 | Herrtwich et al. |
| 2005/0110621 | A1 | 5/2005 | Hahn et al. |
| 2005/0122397 | A1 | 6/2005 | Henson et al. |
| 2005/0182564 | A1* | 8/2005 | Kim ............................. 701/211 |
| 2005/0238203 | A1 | 10/2005 | Yoshimura |
| 2005/0249379 | A1 | 11/2005 | Yoshimura |
| 2005/0270784 | A1 | 12/2005 | Hahn et al. |
| 2006/0025920 | A1 | 2/2006 | Nezu et al. |
| 2006/0210116 | A1 | 9/2006 | Azuma |
| 2007/0165908 | A1 | 7/2007 | Braeunl et al. |
| 2008/0012860 | A1* | 1/2008 | Klefenz et al. ................ 345/441 |
| 2011/0098056 | A1* | 4/2011 | Rhoads et al. ............ 455/456.1 |
| 2011/0234840 | A1* | 9/2011 | Klefenz et al. ............ 348/222.1 |

FOREIGN PATENT DOCUMENTS

| | | |
|---|---|---|
| DE | 38 30 496 C1 | 9/1996 |
| DE | 196 30 194 A1 | 1/1998 |
| DE | 198 41 262 A1 | 3/2000 |
| DE | 101 17 870 A1 | 10/2002 |
| DE | 101 27 156 A1 | 12/2002 |
| DE | 102 48 534 A1 | 4/2004 |
| DE | 10 2005 047 160 B4 | 4/2007 |
| EP | 0 740 163 A2 | 10/1996 |
| EP | 1 503 354 A1 | 2/2005 |
| EP | 1 508 889 A2 | 2/2005 |
| EP | 1 519 152 A1 | 3/2005 |
| EP | 1 032 891 B1 | 4/2005 |
| EP | 1 614 997 A1 | 1/2006 |
| EP | 1 677 076 A2 | 7/2006 |
| GB | 2 362 213 A | 11/2001 |
| JP | 04-272710 A | 9/1992 |
| JP | 07-063572 A | 3/1995 |
| JP | 09-033271 A | 2/1997 |
| JP | 2002-148052 A | 5/2002 |
| JP | 2002-366128 A | 12/2002 |
| JP | 2003-225266 A | 8/2003 |
| WO | 2004/029877 A2 | 4/2004 |
| WO | 2004/048895 A1 | 6/2004 |
| WO | 2005/090918 A1 | 9/2005 |
| WO | 2005/120071 A2 | 12/2005 |
| WO | 2006/039389 A2 | 4/2006 |
| WO | 2008/002638 A1 | 1/2008 |
| WO | 2008/003095 A2 | 1/2008 |

OTHER PUBLICATIONS

Markus Ulrich et al., "Real-Time Object Recognition Using a Modified Generalized Hough Transform," Pattern Recognition, vol. 36, Part 11, pp. 1-8.

R. Chan et al., "New Parallel Hough Transform for Circles," Computers and Digital Techniques, IEE Proceedings—vol. 138, Issue 5, Sep. 1991, pp. 335-344.

LOBO: "Inertial Sensor Data Integration in Computer Vision Systems," University of Coimbra, Faculty of Science and Technology, Electrical and Engineering Department, Feb. 2002.

Schreiber et al.: "Improving Calibration of 3-D Video Oculography Systems," IEEE Transactions on Biomedical Engineering, Apr. 2004, vol. 51, No. 4, pp. 676-679.

Ferrari et al., "Object Detection by Contour Segment Networks," Computer Vision Group.

Brückmann et al., "A Neural Net for 2D-Slope and Sinusoidal Shape Detection," International Scientific Journal of Computing, ISSN 1727-6209.

Gegenfurtner et al., "Color in the Cortex Revisited," Nature Neuroscience Publishing Group, Apr. 2001, vol. 4, No. 4, pp. 339-340.

Epstein, "Parallel Hardware Architectures for the Life Sciences," University of Delft, Delft University Press, 2004, pp. 1-153.

Hámori et al., "Receptive Field Atlas of the Retinotopic Visual Pathway and Some Other Sensory Organs Using Dynamic Cellular Neural Network Models", DNS-8-2000, pp. 1-192.

Lázár et al., "Functional Representations of Retina Channels Via the RefineC Retina Simulator".

Ho et al., "A High-Speed-Algorithm for Elliptical Object Detection," IEEE Transactions on Image Processing, Mar. 1996, vol. 5, No. 3, pp. 574-550.

Walsh, "How Does the Cortex Construct Color?," Proceedings of the National Academy of Sciences of the United States of America, Nov. 23, 1999, vol. 96, No. 24, pp. 13594-13596.

Bartels et al., "The Architecture of the Colour Centre in the Human Visual Brain: New Result and a Review," Eur. J. Neurosci, 1999, 12 (1), 172-193 (2000), pp. 1-20.

Romaya, "A Computer Model of the Land Mondrian Retinex Experiment," Eur. J. Neurosci., 2000, 12 (1), 191-193, pp. 21-23.

Bartels et al., "The Chronoarchitecture of the Cerebral Cortex," Philosophical Transactions of the Royal Society B Apr. 29, 2005, pp. 733-750.

Rüttiger et al., "Selective Color Constancy Deficits After Circumscribed Unilateral Brain Lesions," The Journal of Neuroscience, Apr. 15, 1999, 19 (8): 3094-3106, pp. 3094-3106.

Chern et al., "Design and Integration of Parallel Hough-Transform Chips for High-Speed Line Detection," Proceedings of the 2005 11th International Conference on Parallel and Distributed Systems, 2005.

Funt et al., "Color Constant Color Indexing," IEEE Transactions on Pattern Analysis and Machine Intelligence, May 1995, vol. 17, No. 5, pp. 522-529.

Bourennane et al., "Contour Estimation by Array Processing Methods," Hindawi Publishing Corporation, EURASIP Journal on Applied Signal Processing, vol. 2006, pp. 1-15.

* cited by examiner

FIGURE 3A
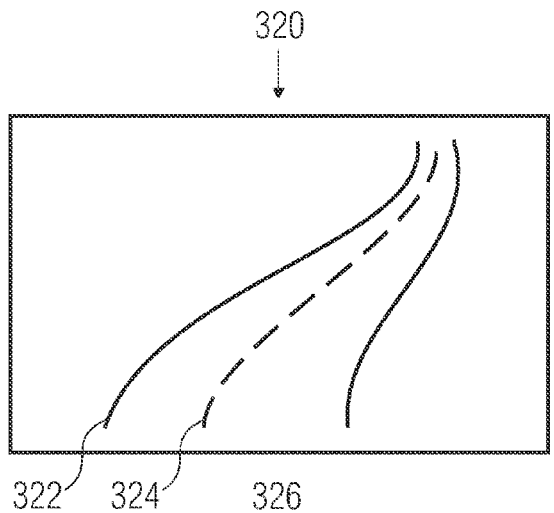
322  324  326
FIGURE 3B
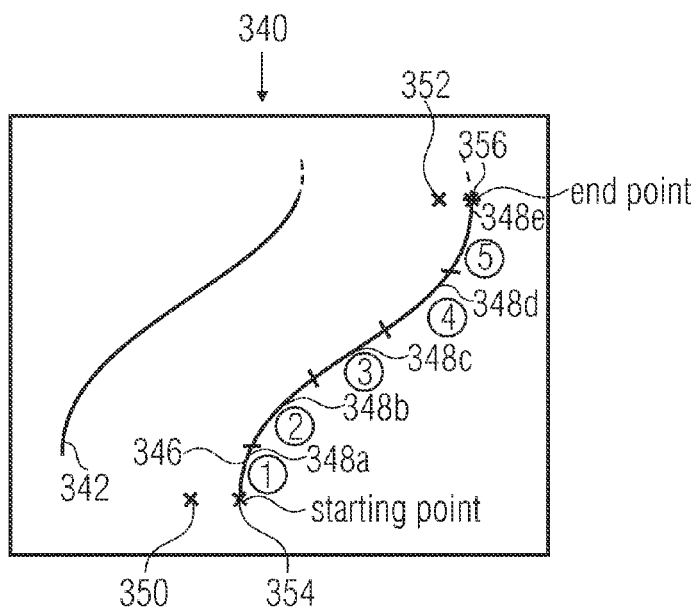
FIGURE 3C
① straight stretch, length 500m
② arc right, radius of curvature 150m, angle 30°
③ straight stretch, length 300m
④ arc left, radius of curvature 100m, angle 30°
⑤ straight stretch, length 400m

900 original video image threshold image contour image image of extremes parameter set image of extremes parameter set image of extremes comparative pattern

APPARATUS, METHOD AND COMPUTER PROGRAM FOR DETERMINING A POSITION ON THE BASIS OF A CAMERA IMAGE FROM A CAMERA

BACKGROUND OF THE INVENTION

The present invention generally relates to an apparatus, a method and a computer program for determining a position based on a camera image, and in particular to a video supported navigation.

In technology, a number of concepts are known to determine a position of an object in space. Thus, there are for example navigation systems which enable a position determination based on one or several radio signals. For example, the GPS position determination system enables to determine a position by receiving and processing signals from a plurality of satellites.

Further, systems already exist, in which a position is determined based on an image recorded by a camera. Thus, DE 102 48 534 A1 describes a method for a position determination of a mobile terminal device. For position determination, the mobile terminal device of the subscriber records images or image sequences of an environment via an optical recording device, wherein the subscriber is located in this environment. The images or image sequences recorded by the recording means are transmitted to a position and navigation server together with position data and data for device setting of the mobile terminal device and the associated camera. The data and images or image sequences received there are compared to images or image sequences of an image database, wherein position data is associated to the images or image sequences of the image database consisting of exact measurement data of the area represented by the images or the image sequences. For image comparison, algorithms known from video surveillance are used.

The comparison of the recorded images to the images and/or the image sequences of the image database is executed on the basis of an image pattern comparison. Here, advantageously, algorithms known from video and image surveillance are used. For example, methods for text recognition are used, so that street names, house numbers, or names of buildings are extracted from the image information. If a match with an image stored in the image database is detected using the image pattern comparison, a position of the observer is calculated.

SUMMARY

According to an embodiment, an apparatus for determining a position on the basis of a camera image from a camera may have: a Hough transformer formed to identify circular arcs or elliptical arcs in the camera image or in a preprocessed version of the camera image derived therefrom, and to identify a plurality of straight stretches passing in various directions through the camera image or through the preprocessed version, wherein the Hough transformer is formed to provide information on a location of an identified circular arc or elliptical arc, and to provide information on a radius of curvature of the identified circular arc or elliptical arc; a positional description establisher formed to acquire a positional description describing the identified circular arcs or elliptical arcs and the identified straight stretches by parameters, on the basis of the identified circular arcs or elliptical arcs and on the identified straight stretches, wherein the positional description for identified circular arcs or elliptical arcs comprises information on a location of an identified circular arc or elliptical arc and information on a radius of curvature of the identified circular arc or elliptical arc; and a database comparator formed to compare the positional description with a plurality of comparative positional descriptions, and to acquire information on a position as a result of the comparison, wherein the database comparator is formed to form a difference between a feature vector of the positional description and feature vectors of the comparative positional descriptions, and to output, as the result, positional information belonging to the corresponding comparative positional description in response to the difference for one of the comparative positional descriptions being sufficiently small.

According to another embodiment, a method of determining a position on the basis of a camera image from a camera may have the steps of: Hough-transforming the camera image or a preprocessed version of the camera image, in order to identify circular arcs or elliptical arcs in the camera image or in the preprocessed version of the camera image, and to identify a plurality of straight stretches passing in various directions through the camera image or through the preprocessed version derived therefrom, wherein, by Hough-transforming, information on a location of an identified circular arc or elliptical arc and information on a radius of curvature of the identified circular arc or elliptical arc are provided; establishing a positional description describing the identified circular arcs or elliptical arcs and the identified straight stretches by parameters, on the basis of the identified circular arcs or elliptical arcs and the identified straight stretches, wherein the positional description for identified circular arcs or elliptical arcs comprises information on a location of an identified circular arc or elliptical arc and information on a radius of curvature of the identified circular arc or elliptical arc; and comparing the positional description with a plurality of comparative positional descriptions in a database, in order to acquire information on the position as a result of the comparison, wherein a difference between a feature vector of the positional description and feature vectors of the comparative positional descriptions is being formed, and wherein positional information belonging to the corresponding comparative positional description is output as the result in response to the difference for one of the comparative positional descriptions being sufficiently small.

According to another embodiment, a computer program may performe, when the computer program is executed on a computer, a method of determining a position on the basis of a camera image from a camera, wherein the method may have the steps of: Hough-transforming the camera image or a preprocessed version of the camera image, in order to identify circular arcs or elliptical arcs in the camera image or in the preprocessed version of the camera image, and to identify a plurality of straight stretches passing in various directions through the camera image or through the preprocessed version derived therefrom, wherein, by Hough-transforming, information on a location of an identified circular arc or elliptical arc and information on a radius of curvature of the identified circular arc or elliptical arc are provided; establishing a positional description describing the identified circular arcs or elliptical arcs and the identified straight stretches by parameters, on the basis of the identified circular arcs or elliptical arcs and the identified straight stretches, wherein the positional description for identified circular arcs or elliptical arcs comprises information on a location of an identified circular arc or elliptical arc and information on a radius of curvature of the identified circular arc or elliptical arc; and comparing the positional description with a plurality of comparative positional descriptions in a database, in order to acquire information on the position as a result of the comparison, wherein a difference between a feature vector of the positional description and feature vectors of the comparative positional descriptions is being formed, and wherein positional information belonging to the corresponding comparative positional description is output as the result in response to the difference for one of the comparative positional descriptions being sufficiently small.

The present invention provides an apparatus for determining a position based on a camera image according to claim 1.

It is a central idea of the present invention, that a position determination is possible in an especially efficient and/or reliable way, by identifying arcs (arcs of a circle or of an ellipse) and straight stretches in a camera image by a Hough transformer, as the information on arcs and straight stretches includes especially characteristic information about a position.

The apparatus for determining a position thus includes a position description generator which is implemented to obtain a position description based on the identified arcs or identified straight stretches, which describes the identified arcs and the identified straight stretches by parameters. The corresponding description thus describing an environment by information on detected image elements in the camera image (arcs and straight stretches) may thus be supplied to a database comparator, wherein the database comparator is implemented to compare the position description to a plurality of comparative position descriptions to obtain information about a position as a result of the comparison.

Within the scope of the inventive method, special advantages result from the use of the Hough transformer. Thus, the Hough transformer is typically able to detect characteristic image elements, i.e. for example arcs of a circle or arcs of an ellipse and straight stretches passing through the image in different directions, even if the image elements comprise interruptions. Thus, it is no rarity, that in a camera image from a camera showing an environment, characteristic lines like e.g. a course of a road are not continuously visible, as they are partially hidden for example by different objects. Thus, for example a road mark representing an especially characteristic line in an image may be partially soiled or hardly visible. If the line at least shows a course locally, however, which corresponds to the course of a comparative line known to the Hough transformer, the Hough transformer may identify corresponding lines even if the same are partially interrupted. Thus, the Hough transformer is all in all able to identify also incomplete image elements.

Apart from that it is to be noted, that in the inventive apparatus the contents of the image and/or the camera image is reduced to the basic elements, i.e. image elements that may be identified by the Hough transformer. It turned out, that in particular image elements that may be identified by a Hough transformer have an especially high information content, and that thus the content of the camera image provided by the camera may be characterized by a low number of parameters describing the image elements identified by the Hough transformer. Thus, the position description generated by the position description generator based on the image elements identified by the Hough transformer represents a reliable description of the image that may be handled well with regard to the information amount. Thus, the position description generated in the inventive way is very well suitable for a database comparison. Thus, advantageously only few types of image elements exist (for example circular arcs or elliptical arcs and straight stretches passing in different directions), that may be described by few parameters each (e.g. position, curvature radius, length, direction). Thus, an efficient database comparison may be executed whose complexity is substantially lower than a conventionally used full image (frame) comparison.

In other words, it is to be noted that the image elements identified by the Hough transformer represent an especially expressive and interference insensitive fingerprint of the image which is thus especially suitable for determining a position based on the camera image.

Apart from that, the present invention further provides a method for determining a position based on a camera image from a camera and a corresponding computer program.

Other features, elements, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which:

FIG. 3a shows a graphical illustration of a perspective mapping of a road;

FIG. 3b shows a graphical illustration of a top view to a road;

FIG. 3c shows an exemplary illustration of a description of a course of the road as a list of straight stretches and arcs;

DETAILED DESCRIPTION OF THE INVENTION

Figure 1:
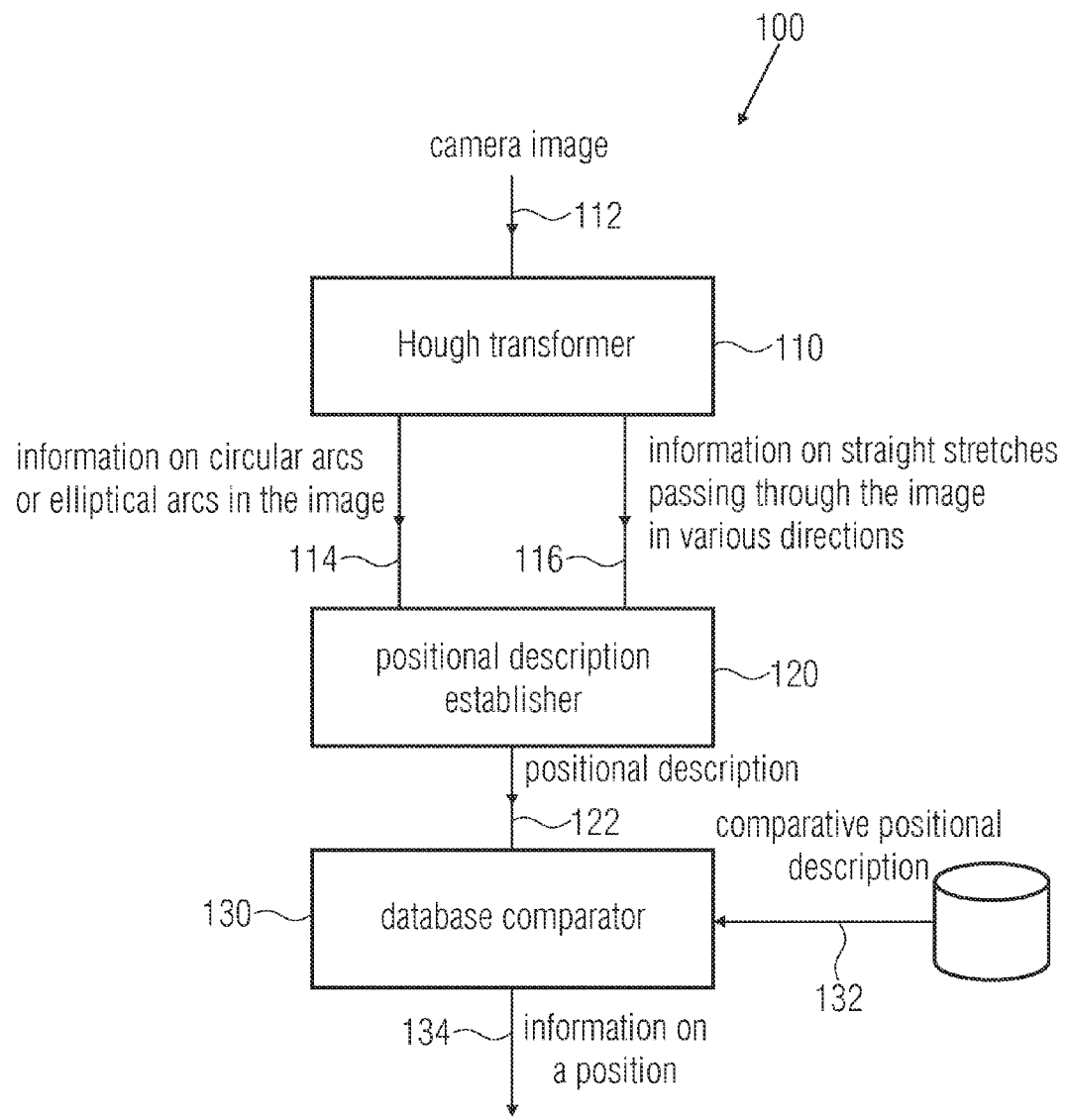
FIG. 1 shows a block diagram of an inventive apparatus for determining a position.

FIG. 1 shows a block diagram of an inventive apparatus for determining a position based on a camera image from a camera. The apparatus according to FIG. 1 is designated by 100 in its entirety.

The apparatus 100 includes a Hough transformer 110. The Hough transformer 110 is implemented to receive a camera image 112 or a preprocessed version of a camera image. The Hough transformer is implemented to provide information 114 on circular arcs or elliptical arcs identified in the camera image 112. Additionally, the Hough transformer is implemented to provide information 116 about straight stretches passing through the camera image 112 in different directions.

The apparatus 100 further includes a position description generator 120 which is implemented to receive the information 114 about circular arcs or elliptical arcs in the camera image and the information 116 about straight stretches passing in different directions through the camera image. The position description generator is further implemented to obtain a position description 122 based on the identified circular arcs or elliptical arcs and further based on the identified straight stretches, which describes identified circular arcs or elliptical arcs and the identified straight stretches by parameters.

The apparatus 100 further includes a database comparator 130 which is implemented to receive the position description 122 from the position description generator 120 and compare the same to a plurality of comparative position descriptions 132. Further, the database comparator is implemented to obtain information 134 about a position as a result based on the result of the comparison between the position description 122 and the comparative position descriptions 132.

Based on the above structural description, in the following the functioning of the apparatus 100 is briefly explained. The Hough transformer 110 receives the camera image 112 and by executing a Hough transform identifies different image elements in the camera image 112. Thus, the Hough transformer 110 is advantageously implemented to identify for example sections of circular lines or sections of elliptical lines contained in the camera image 112. Advantageously, the Hough transformer 110 here provides information characterizing the identified circular arcs or elliptical arcs in more detail. For example, the Hough transformer 110 may provide information about the position of a circular arc or an elliptical arc. It is thus advantageous for the Hough transformer 110 to describe an extreme point of a circular arc (and/or circular arc section) or an elliptical arc (and/or elliptical arc section) by the information 114. An extreme point here is a point of a circular arc or of an elliptical arc which is farthest in a predetermined direction. If the camera image for example exists in the form of image points arranged in a raster consisting of raster lines and raster columns, then an extreme point of an arc is for example a point at the far left of an arc, a point at the far right of an arc, a point right at the top of an arc or a point right at the bottom of an arc.

Further, the Hough transformer 110 may (optionally) additionally be implemented to determine information about a curvature radius of an arc identified in the camera image 112 and to pass on the corresponding information to the position description generator 120 within the scope of the information 114.

With regard to the straight stretches identified in the camera image 112, the Hough transformer 110 may for example be implemented to describe the identified straight stretches by information about a length, a direction, a starting point and/or an endpoint. The corresponding information is provided to the position description generator 120 advantageously within the scope of information 116, by the Hough transformer 110.

It is thus to be noted, that the Hough transformer 110 is advantageously implemented to obtain the information 114, 116. The Hough transformer 110 may here, for example, be configured to identify arcs and straight stretches in one single pass. Alternatively, the Hough transformer 110 may include two separate partial Hough transformers of which a first partial Hough transformer is implemented to identify arcs (i.e. sections of circular arcs or elliptical arcs) and of which a second partial Hough transformer is implemented to identify straight stretches passing in different directions through the image. In one alternative embodiment, the Hough transformer 110 may also include a non-configurable Hough field which may be reconfigured to identify arcs in the camera image 112 in a first pass and to identify straight stretches in the camera image in a second pass. It is further to be noted, that in an embodiment, the camera image 112 may be supplied to the Hough transformer in different directions (e.g. one time with an ascending order of image columns, for example beginning with a first image column, an one time with a descending order of image columns, for example beginning with the last image column. Additionally or alternatively, the camera image 112 may for example be supplied to the Hough transformer line after line in an ascending order of image lines and/or line after line in a descending order of image lines.

Thus, for example, in an efficient way arcs having curvatures in different directions (to the bottom, to the top, to the left and/or to the right) may be identified. Also an identification of straight stretches passing in different directions through the image is possible in an especially efficient way when the camera image 112 is processed in different directions (i.e., e.g. one time line after line and one time column after column, and/or one time in an ascending order of lines and one time in a descending order of lines and/or one time in an ascending order of columns and one time in a descending order of columns).

It is to be noted, that the different processing steps may alternatively be executed after one another or in parallel to each other.

The position description generator 120 is advantageously implemented to summarize information 114 about circular arcs or elliptical arcs in the image and/or camera image 112 and information 116 about straight stretches passing in different directions through the image and/or the camera image 112 into a position description 122. In this respect, the position description generator 120 may for example be implemented to generate a feature vector as a position description 122 which includes the information about the different identified image elements (circular arcs and/or circular arc sections, elliptical arcs and/or elliptical arc sections and/or straight stretches) in a certain order. Further the position description generator 120 may for example be implemented to select selected image elements from an entirety of identified arcs and straight stretches. Thus, the position description generator 120 may for example be implemented to select such arcs and straight stretches from the entirety of identified arcs and straight stretches for the generation of the position description which describe a continuous course of a road and/or at least an approximately continuous line. Alternatively, the position description generator 120 may also include information about any image elements identified by the Hough transformer 110 into the position description 122.

Further, the position description generator 120 may apply a predefined filter rule to select selected image elements from the image elements identified by the Hough transformer 110 and to form the position description 122 based on the selected image elements (arcs and straight stretches).

Further, the position description generator 120 may for example be implemented to arrange the image elements identified by the Hough transformer 110 in a certain way, for example according to a predetermined arrangement rule. Thus, the position description generator 120 may for example be implemented to arrange the image elements for generating the position description 122 with regard to an order so that the arranged image elements form a continuous line course. Alternatively, the position description generator 120 may form the position description 122 for example so that the description of the image elements in the position description 122 corresponds to another arrangement rule. For example, the position description generator 120 may generate the position description 122 so that the position description 122 includes the image elements identified by the Hough transformer assorted according to parameters of the image elements. Thus, for example arcs may be assorted with regard to where they are located in the camera image 122 (e.g. from left to right and/or from top to bottom). Alternatively, the arcs may for example also be assorted according to their curvature radius. In a similar way, for example identified straight stretches may be assorted in the position description 122 according to their position and/or length and/or direction.

Thus, it is to be noted all in all, that the position description 122 is advantageously generated by the position description generator 120 so that the position description 122 is as characteristic as possible for the camera image.

The database comparator 130 receives the position description 122 and compares the position description to a plurality of comparative position descriptions 132 which are for example stored in a database. If the database comparator 130 receives the position description 122 for example in the form of a feature vector, the database comparator may for example be implemented to form a difference between the feature vector of the position description 122 and feature vectors of the comparative position descriptions 132. If a distance and/or difference between two feature vectors is sufficiently small, for example smaller than a predetermined maximum admissible deviation, or minimal, the database comparator 130 may for example detect that a sufficient match between the position description 122 and the comparative position description 132 exists. Thus, the database comparator 130 may for example output position information belonging to the corresponding comparative position description 132 as the result 134.

Details with regard to the inventive concept for determining a position based on a camera image are described in the following with reference to FIGS. 2a to 2d.

Figure 2A:
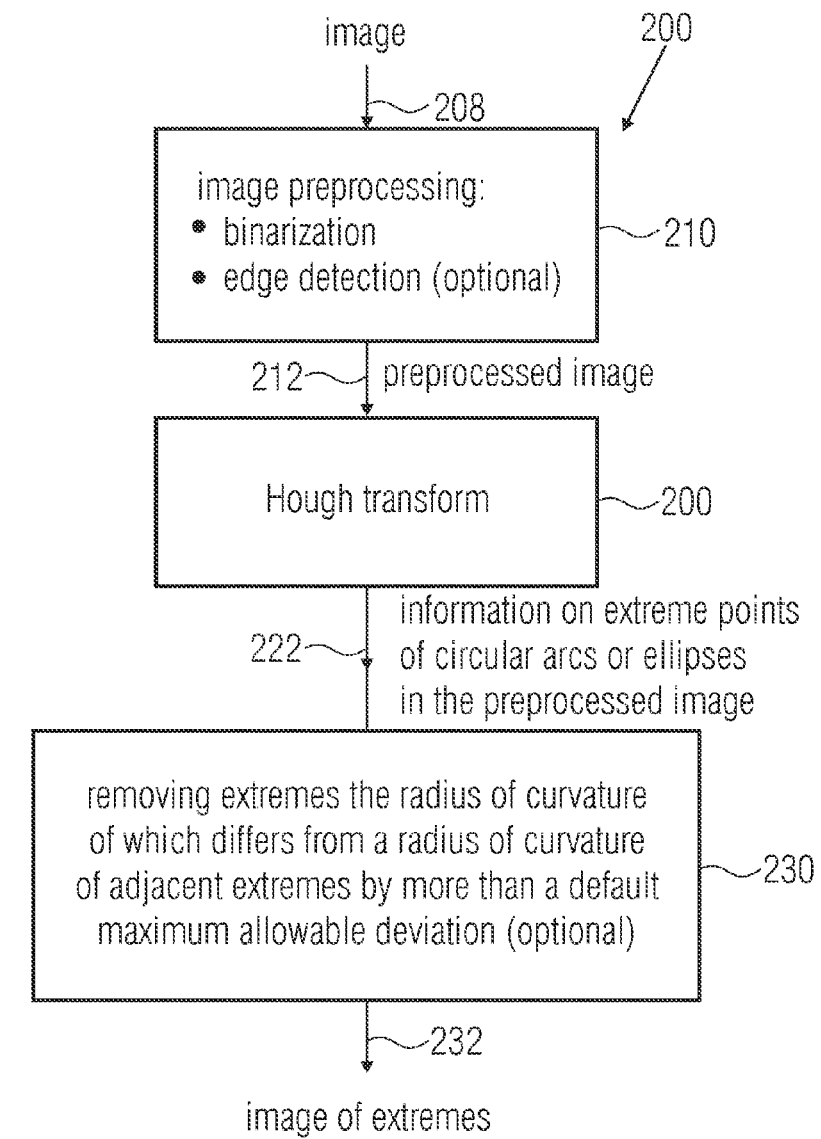
FIG. 2a shows a flowchart of a method for determining an image of extremes from an image, according to one embodiment of the present invention.
Figure 2A:
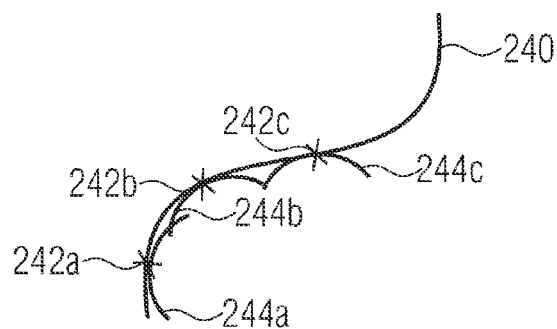

FIG. 2a shows a flowchart of an inventive method for calculating an image of extremes from an image according to an embodiment of the present invention.

The method according to FIG. 2a is designated by 200 in its entirety. In a first step 210, the method 200 includes executing an image preprocessing. The image preprocessing for example includes binarizing the image for an edge detection in the image. Due to the image preprocessing 210, thus from the image 208 a preprocessed image 212 results. The method 200 further includes executing a Hough transform 220 using the preprocessed image 212. The execution 220 of the Hough transform thus provides information 222 about extreme points of circular arcs or elliptical arcs in the preprocessed image. The Hough transform 220 may further alternatively or additionally provide information about straight stretches passing angularly trough the image 208 or through the preprocessed image 212, respectively. If the information 222 in this case includes information about straight stretches in the preprocessed image 212 or in the image 208, respectively, for example information about center points of the straight stretches takes the position of the information about the extreme points.

The Hough transform 220 thus for example provides information about extreme points of circular arcs or points of ellipses as information 222 and optionally additionally information about center points of straight stretches in the image 208 or in the preprocessed image 212. The information 222 thus includes information about characteristic points (extreme points of circular arcs or elliptical arcs and additionally, optionally, center points of straight stretches) in the image 208 or in the preprocessed image 212, respectively. Advantageously, curvature radii are associated with the extreme points of the circular arcs or the elliptical arcs which are generated and/or determined by the Hough transform 220. For example, a curvature radius which is infinite is associated with the center points of straight stretches optionally described by the information 222 provided based on the Hough transform 220.

In a third step 230, the method 200 further includes removing extremes and additionally optionally center points of straight stretches whose associated curvature radius is different from a curvature radius of at least one adjacent extreme by more than a predetermined maximum admissible deviation. By the third step 230, thus based on the information about extreme points of circular arcs or elliptical arcs in the image 208 and/or in the preprocessed image 212 (and additionally, optionally based on the information about center points of straight stretches) an image of extremes 232 is generated. In step 230 of removing extremes it is thus for example achieved that the image of extremes 232 only includes such extreme points of arcs (circular arcs or elliptical arcs) and/or center points (of straight stretches) whose curvature radius is at least approximately consistent with curvature radii of adjacent extreme points and/or center points. In other words, in the image of extremes 232 such extreme points and/or center points of straight stretches are removed whose curvature radius is different by more than a maximum admissible deviation from curvature radii of adjacent extreme points and/or center points of straight stretches. Thus it is guaranteed, that extremes points and/or center points of straight stretches contained in the image of extremes 232 form an at least approximately continuous course with regard to the curvature radius.

Such a prefiltering 230 of the information 222 formed by the Hough transform 220 is sensible, as it is desired within the scope of position determination to basically identify such lines in the image and/or camera image 208, which are characteristic for the camera image. These are typically comparatively long and regular lines. Long and regular lines stand out in many cases by the fact that if they are bent they comprise comparatively "smooth" transitions between different curvatures.

One single continuous and bend-free line may for example be approximated to adjacent line points each by approximation circles and/or approximation ellipses. A corresponding bent line is designated by 240 in FIG. 2a. Three designated line points are designated by 242a, 242b and 242c. Corresponding curvature circles and/or curvature ellipses are designated by 244a, 244b and 244c. It is obvious, that the circles of curvature 244a, 244b, 244c of the adjacent line points 242a, 242b, 242c at least approximately comprise the same radii if the line 240 is bend-free. It is further to be noted, that other unwanted image contents, e.g. vegetation or other irregular or jagged forms contain a plurality of circular arcs or elliptical arcs of different curvatures. Thus, in the presence of such irregular structures, adjacent extreme points comprise typically very different curvature radii and are thus removed by step 230. Thus, an image of extremes 232 results in which information about irregularly formed objects, like e.g. irregular vegetation objects are removed and/or at least reduced with regard to the information 222. Thus, the image of extremes 232 represents a filtered illustration adjusted with regard to information which are irrelevant for a position determination.

It is to be noted, however, that step 230 is to be regarded as being optional. In other words, the information 222 provided by the Hough transform 220 about extreme points of circular arcs or elliptical arcs in the preprocessed image 212 may directly take the position of the image of extremes 232.

Apart from that it is to be noted that optionally also the image preprocessing 210 may be omitted when the Hough transform 220 is for example implemented to directly operate on the image and/or the camera image 208.

Figure 2B:
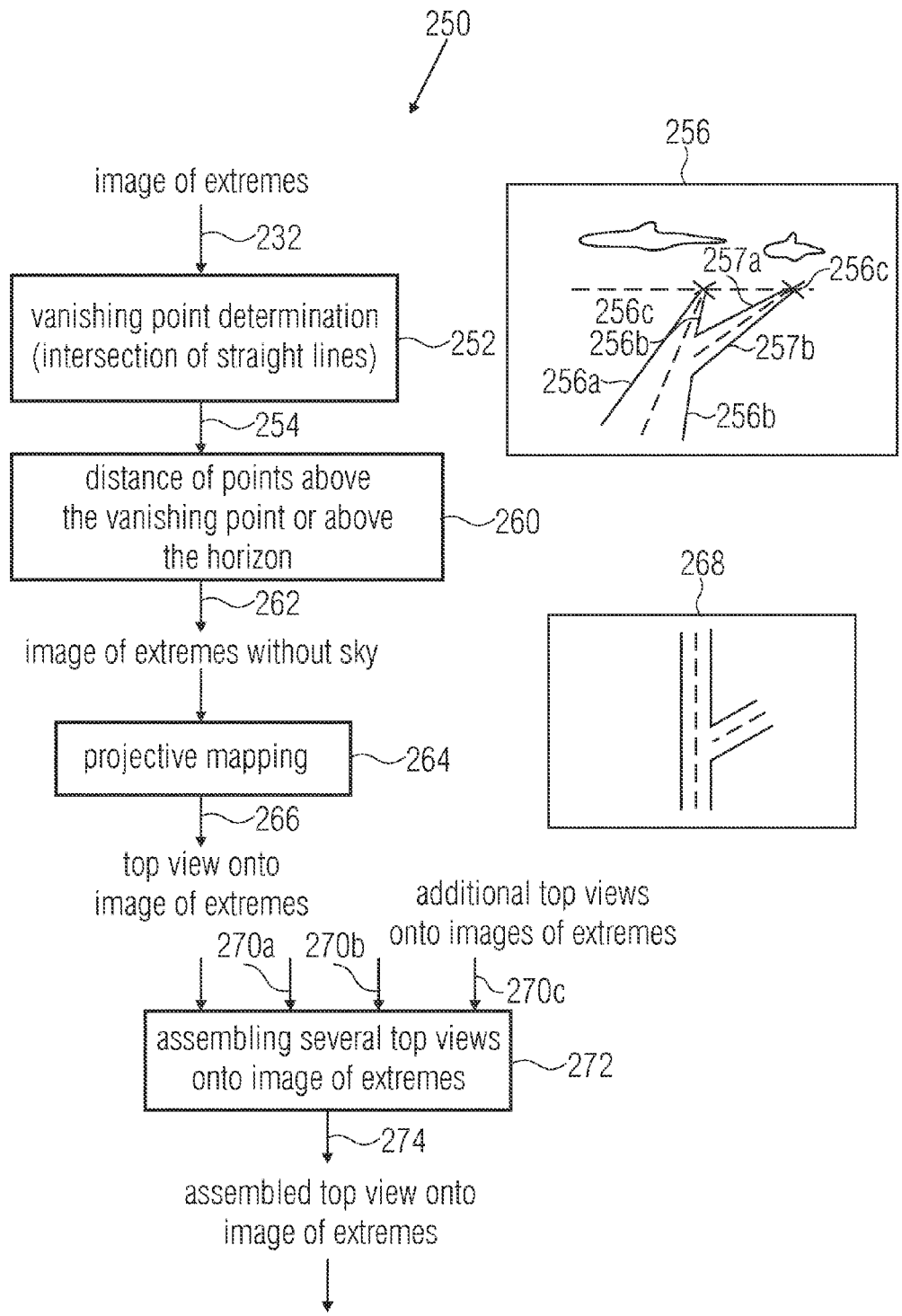
FIG. 2b shows a flowchart of an inventive method for determining a combined top view of an images of extremes based on several images of extremes according to an embodiment of the present invention.

In the following it is explained with reference to FIG. 2b how a combined top view on an image of extremes may be generated from the image of extremes, i.e. for example from the image of extremes 232. FIG. 2b in this respect shows a flowchart of an inventive method for determining a combined top view to an image of extremes from an image of extremes.

The method according to FIG. 2b is designated by 250 in its entirety. The method 250 includes a first step 252 of a vanishing point determination. By the vanishing point determination 252, for example from the image of extremes 232 one or several vanishing points, i.e. intersections of straight lines are determined. Accordingly, the vanishing point determination 252 provides information 254 about one or several vanishing points. In vanishing point determination 252, advantageously straight lines of a predetermined minimum length are determined in the image of extremes 232 and/or alternatively in the preprocessed image 212 or in the camera image 208. Here, advantageously the information provided by the Hough transform 220 may be consulted.

If at least two straight stretches are identified in the image 208, in the preprocessed image 212 and/or in the image of extremes 232, an intersection point of the straight lines may be determined. The intersection of the straight lines is typically the point in which parallel stretches which run away from the camera using which the camera image is recorded intersect due to a projective mapping. For reasons of clarity, FIG. 2b shows a perspective image 256 of two very long straight roads. A left boundary 256a and a right boundary 256b seem to intersect in a first vanishing point 256c due to a projective mapping. Two boundaries 257a, 257b of a second long straight road which leads to the first road seem to intersect in a second vanishing point 257c due to the projective mapping. If, for example, the stretches and/or straight lines are determined with the help of a Hough transform and bound the roads which are straight at least along a certain section, then for example with the help of a calculation of an intersection of the two straight lines the position of the vanishing point 256c may be calculated with little computational effort. Thus, within the scope of vanishing point determination 252 one or several vanishing points 256c, 257c may be determined.

In a further step 260, for example points above the vanishing point or points below a horizon are removed to obtain an image of extremes 262 without sky. If, for example, only one vanishing point 256c is known, it may be assumed that the horizon passes through the one vanishing point 256c and further typically passes horizontally through the image, if it is assumed that the camera image 208 is recorded with a camera which is arranged at least approximately horizontally.

Thus, for example within the scope of step 260 all points which lie in the camera image 208 above the vanishing point 256c may be removed, as it may for example be assumed that the corresponding image portion is sky. If further two vanishing points, for example vanishing points 256c and 257c are known, it may for example be assumed, that the horizon is defined by the connecting line between the two vanishing points 256c, 257c. Thus, for example a horizon line may be defined connecting the vanishing points 256c, 257c. Further, in the image 208, in the preprocessed image 212 or in the image of extremes 232 image portions may be removed lying above the horizon line. Thus, the image of extremes without sky results.

It is to be noted, that the corresponding preprocessing using a vanishing point determination 252 and a removal 260 of points above the vanishing point or the horizon is to be regarded as optional. If a road for example goes towards a mountain and/or mountains, for example the mountain which is located above the determined horizon line may well represent information important for position determination.

A selected filtering of the image may for example also be executed such, however, that for example above a horizon line a further filtering of extreme points is executed in which, for example, extreme points belonging to cloud structures are removed by a suitable selection of a filter rule, while extreme points belonging to mountains are maintained. In other words, above the horizon line an additional filtering of the image of extremes 232 may take place, wherein certain extreme points which do or do not fulfill certain criteria with regard to an associated curvature radius or an associated direction of straight lines are removed.

Further, based on the image of extremes 232 or based on the image of extremes 262 without sky a projective mapping 264 is executed. By the projective mapping 264, advantageously from the image of extremes 262 without sky (alternatively from the image of extremes 232, however) a top view 266 onto the image of extremes is generated. In this respect it is to be noted, that from the field of optics projective mappings are known using which a perspective view may at least approximately be converted into a top view. One example in this respect is illustrated in a graphical illustration 268. The graphical illustration 268 shows a top view onto the courses of a road illustrated in the perspective illustration of the graphical illustration 256.

Apart from that it is to be noted here, that the graphical illustrations 256, 268 do not show images of extremes as they are typically processed within the scope of the inventive method. Rather, the graphical illustrations 256, 268 show schematical images for reasons of clarity. It is to be noted, however, that for example the straight stretches are described by center points of sections. Curved lines in the image of extremes 232, the image of extremes 262 without sky and in the top view 266 onto the image of extremes are illustrated by extreme points of arcs, however.

Thus, the transition between the graphical illustrations 256, 268 and the actual illustration in the form of extreme points of arcs and/or center points of straight stretches is easily comprehensible.

Apart from that it is to be noted, that in a preferred embodiment a plurality of camera images 208 is recorded consecutively, wherein it is assumed that the camera recording the camera images 208 is, for example, moved along with a vehicle. In other words, a plurality of camera images 208 is available recorded subsequently and thus also from different locations (if it is assumed that the vehicle to which the camera is mounted moves). Thus, in a preferred embodiment of the present invention, not only one single top view 266 to an image of extremes is available but rather, apart from the mentioned top view 266 onto the image of extremes further top views 270a, 270b, 270c onto images of extremes are available. Thus, the method 250 advantageously includes combining 272 several top views onto images of extremes, whereby a combined top view 274 onto an image of extremes results. Details with regard to combining several top views onto images of extremes are explained in more detail in the following.

It is to be noted, however, that the step 272 of combining several top views onto images of extremes into a combined top view 274 onto an image of extremes is to be regarded as optional. In other words, the processing which is to be described in the following with regard to a combined top view 274 may alternatively be executed using the top view 266 onto a single image of extremes.

Figure 2C:
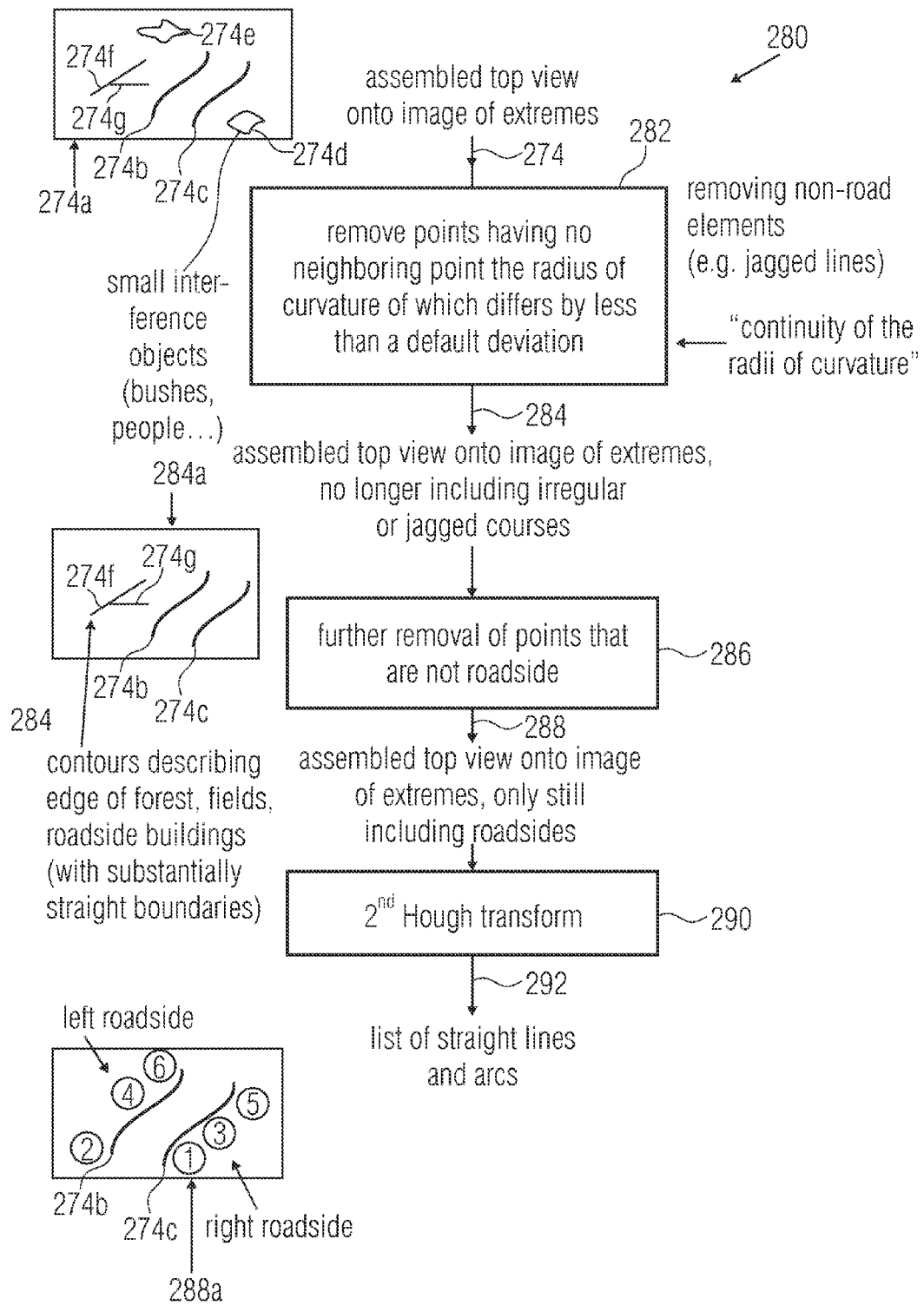
FIG. 2c shows a flowchart of an inventive method for determining a list of straight lines and arcs based on a combined top view onto an image of extremes according to an embodiment of the present invention.

In the following, it is described with reference to FIG. 2c, how a list of straight lines and arcs may be generated from a combined top view onto an image of extremes. For this purpose, FIG. 2c shows a flowchart of an inventive method for generating a list of straight lines and of arcs from a combined top view onto an image of extremes. The method according to FIG. 2c is designated by 280 in its entirety.

The method 280 includes a step 282 of removing non-road elements from the combined top view 274 onto an image of extremes and/or extreme value image. The step 282 of removing non-road elements advantageously includes removing extreme points comprising no adjacent extreme point whose curvature radius is different by less than a predetermined deviation. In other words, the fact is used that road elements like, for example, road boundary marks are typically bend-free lines, so that the curvature radii of approximation circles and/or approximation ellipses change continuously (and/or in small steps). In other words, a continuity of curvature radii is used in road elements. It is to be noted here, that for example a straight stretch comprises a curvature radius being infinite. A curvature or turn which is not too sharp by the way comprises a comparatively large curvature radius. If, for example, a straight course of the road goes over into a slight curve, the curvature radius changes from infinite (straight stretch) to the curvature radius of the curve and/or bend of for example 500 meters. Here, by the way, it is assumed that the curvature radius "infinite" is different sufficiently little from a curvature radius which is selected sufficiently large (for example of the curvature radius of 500 meters). Thus, in step 282 non-road elements, e.g. jagged lines describing a vegetation or other interference objects, are removed from the combined top view 274 onto an image of extremes. Thus, a combined top view 284 onto an image of extremes results which does not include any irregular or jagged courses anymore. In other words, from step 282 from the combined top view 274 onto an image of extremes an adjusted combined top view 284 results.

In this respect it is by the way to be noted, that the step 282 of removing non-road elements may be regarded as optional.

In a step 286, the method 280 further includes a further removal of points, which are no roadsides, from the adjusted combined top view 284. Extreme points which describe no roadside may, for example, be identified by the fact that a line course formed by the corresponding points does not form a continuous line course from a starting point where a first camera image is recorded to an endpoint where a subsequent camera image is recorded.

It may be assumed, that the vehicle to which the camera is attached moves along the course of the road, and that thus the boundary of the course of the road is given by a line along which the vehicle moves. If the starting point of the vehicle at a first point in time and the endpoint of the vehicle at a second point in time are, for example, known relative to the combined top view 274 onto an image of extremes, thus at least approximately a starting point and an endpoint of a line course is known forming the road boundary. Thus, it may be determined, that line courses not passing from the starting point to the endpoint do not describe the traveled course of the road.

Thus, by the removal of extreme points describing no roadsides (and/or of lines which are not associated to roadsides) in step 286, a further adjusted combined top view 288 onto an image of extremes results. The further adjusted combined top view 288 advantageously but not necessarily describes only road courses. In other words, the combined top view 288 advantageously includes extreme points of arcs and/or extreme points of straight stretches associated with road courses.

In a step 290, the method 280 further includes an execution of a second Hough transform. The second Hough transform 290 is advantageously applied to the adjusted combined top view 288. In this regard it is to be noted, that by the above described processing using steps 210, 220, 230, 252, 260, 262, 272, 282, 286 a combined top view onto an image of extremes was generated, in which roadsides are advantageously illustrated by courses of adjacent extreme points of circular arcs or elliptical arcs and/or of center points of straight stretches. In other words, the boundary of the road course is in the illustration 288 advantageously described by a plurality of identified extremes.

Figure 2D:
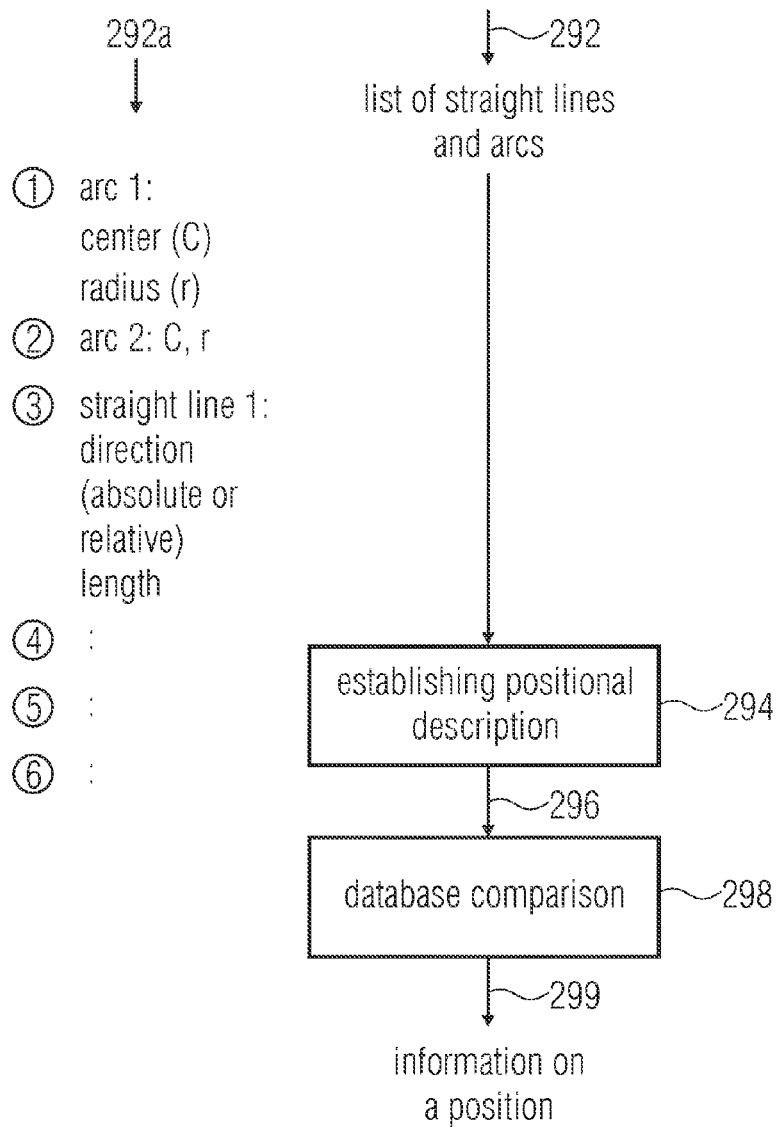
FIG. 2d shows a flowchart of an inventive method for obtaining information about a position based on a list of straight lines and arcs according to an embodiment of the present invention.
Figure 2E:
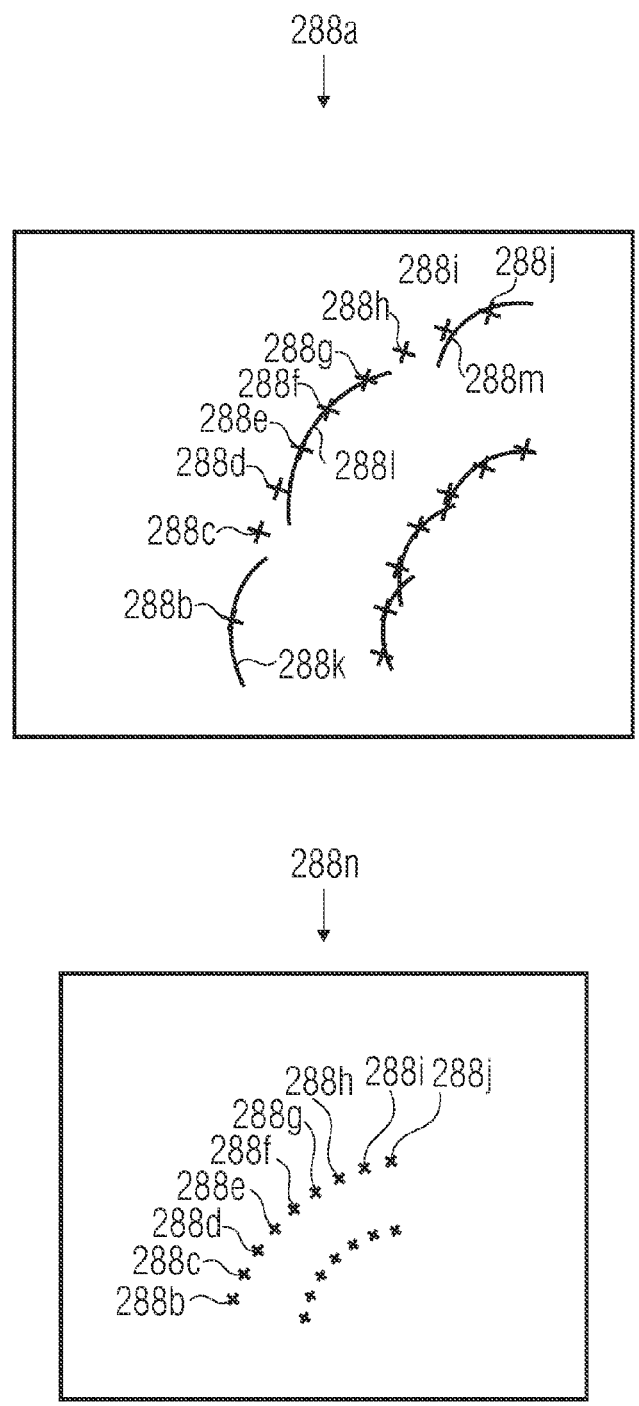
FIG. 2e shows a graphical illustration of a combined top view to an image of extremes.

For illustration purposes, FIG. 2e shows a top view onto an image of extremes 288. A first graphical illustration 288a shows the combined top view 288 together with circular arcs and/or elliptical arcs plotted therein. The graphical illustration 288a shows a plurality of extreme points 288b to 288j. For the extreme points 288b, 288f and 288j associated circular arcs and/or elliptical arcs 288k, 288l, 288m are illustrated. A further graphical illustration 288n only shows the extreme points 288b to 288j basically forming the combined top view 288.

It is to be noted, however, that the combined top view 288 may alternatively also be the camera image 208 or the preprocessed camera image 212. In other words, also the image 208 or the preprocessed image 212 may serve as input data of the second Hough transform 290. Also a projective mapping 264 may be applied to the image 208 and/or to the preprocessed image 212, however, and further several partial images may be combined to obtain the input data used by the second Hough transform 290.

In summary it may thus be noted, that in one embodiment also exclusively the second Hough transform 290 may be applied, while the first Hough transform 220 is omitted. In this case, the second Hough transform 290 thus for example receives the image 208, the preprocessed image 112 or a further processed version of the image 208 or of the preprocessed image 212 as an input image. The further processed version of the image 208 and/or of the preprocessed image 212 may, for example, be gained from the image 208 or the preprocessed image 212 by applying some or all of steps 252, 260, 264, 272.

Within the scope of the second Hough transform 290, by the way from the input image of the second Hough transform 290 a list 292 of straight lines and arcs is generated in the input image of the second Hough transform 290. In other words, the second Hough transform 290 generates information on arcs (e.g. circular arcs or circular arc segments and/or elliptical arcs and/or elliptical arc segments, respectively) and on straight stretches in the image based on the input image of the second Hough transform as described above.

Based on the list 292 of arcs and straight stretches, subsequently in a step 294 a position description 296 is generated. In the generation 294 of a position description, for example the list 292 of straight lines and arcs is assorted according to the predetermined sequence and/or order criterion. Further, alternatively or additionally, the list 292 of straight stretches and arcs in the generation 294 of a position description is filtered according to a filter criterion in order to remove single straight stretches or arcs from the list 292 of straight lines or arcs, so that the position description 296 all in all includes less straight stretches or arcs than the list 292 of straight stretches and arcs.

Further, generating 294 a position description may include providing several permutations (with regard to the order) of the list 292 of straight stretches and arcs to obtain several permutated sets of descriptions of straight stretches and arcs as the position description 296.

Further, generating 294 a position description may alternatively or additionally include selecting several real subsets of straight stretches and arcs from the list 292 of straight stretches and arcs, so that for example the position description 296 contains several selected real subsets of the list 292 of straight stretches and arcs, wherein the individual subsets are different to each other.

The method according to FIGS. 2a to 2d further includes the execution 298 of a database comparison. In the database comparison 298 the position description 296 is compared to a plurality of comparative position descriptions stored in a database, and a measure for a similarity between the position description 296 and the plurality of comparative position descriptions is determined. Further, one of the comparative position descriptions is determined, so that for example a difference between the position description 296 and the ascertained comparative position description is minimal. Alternatively, it may also be regarded as sufficient if a difference between the position description 296 and a comparative position description is sufficiently small, i.e. for example is smaller than a predetermined maximum admissible deviation. If thus a comparative position description is determined, which matches the position description 296 sufficiently well (so that for example a difference is minimized or so that a difference is smaller than a predetermined maximum admissible difference) then the position information belonging to the comparative position description is provided as a result 299. The result 299 thus carries information about the fact from which position the image 208 was recorded.

In the following, the schematical images illustrated in FIGS. 2c and 2d are briefly explained. Thus, FIG. 2c shows a graphical illustration 274a, for example describing a combined top view 274 onto an image of extremes. The graphical illustration 274a for example shows a left boundary 274b of a course of a road and a right boundary 274c of a course of a road. Further, the graphical illustration 274a shows two small interference objects 274d, 274e for example describing vegetation (e.g. bushes) or persons. Further, the graphical illustration 274a shows additional long stretched or slightly curved courses 274f, 274g, for example representing boundaries of buildings or of fields. In step 282, in which due to requirements with regard to the continuity of curvature radii irregularly bounded elements are removed, the smaller interference objects 274d, 274e are for example removed from the image according to the graphical illustration 274a, as these are typically formed irregularly and further are comparatively small (compared to an expansion of the road course).

Thus, the combined top view 284 onto the image of extremes results, which includes no irregular or jagged courses anymore. The combined top view 284 is illustrated in a graphical illustration 284a.

Within the scope of step 286, as already mentioned, points and/or lines are removed which are no roadside. Thus, the combined top view 288 onto the image of extremes results, which only (or at least basically) includes road courses. A schematical illustration of the combined top view 288 is illustrated in a graphical illustration 288a. The graphical illustration 288a for example only shows a left track boundary 274b and a right track boundary 274c. The left track boundary 274d is for example described in the input image of the second Hough transform 290 by a line, for example, including an arc to the right (designated by an encircled "2"), a straight stretch (designated by an encircled "4"), and an arc to the left (designated by an encircled "6")). The right roadside and/or road boundary 274c includes a first arc to the right (designated by an encircled "1") a first straight stretch (designated by an encircled "3") and a first arc to the left (designated by an encircled "5"). It is by the way sufficient, however, if the input image 288 of the second Hough transform 290 describes one single track boundary, i.e. either the left track boundary 274b or the right track boundary 274c.

Within the scope of the second Hough transform 290, then based on the input image 288 of the second Hough transform the arcs and straight stretches in the input image of the Hough transform are described by associated parameters. In other words, a parameterized list 292 of straight lines and arcs results, as it is for example illustrated in the graphical illustration 292a according to FIG. 2d. The list 292 of straight lines and arcs thus for example describes the arcs "1", "2", "5" and "6" by associated parameters, like, for example, a position of an arc center point or an arc extreme point and/or a curvature radius. The list 292 further for example describes the straight stretches "3" and "4" according to the graphical illustration 288a by parameters, like for example an absolute or relative direction and/or a length and/or a position. For example, the direction may be described absolutely (e.g. considering direction information from a compass) or relatively to a direction of view of the camera.

Further, the direction may for example be described relative to further straight stretches in the image. The position of the straight stretches may, for example, be described by coordinates of a starting point, a center point or an endpoint. As far as needed, further additionally information about a length of the straight stretch may be contained in the list 292. It is to be noted, that the mentioned information on the parameters of the arcs or straight stretches is advantageously provided by the second Hough transform 290. In this respect it is to be noted, that a Hough transform is typically suitable to differentiate line courses with different parameters (e.g. arcs with different curvature radii or stretches with different directions) and further provide information about the parameters of different line courses contained in an image.

The position description 296 advantageously includes the same parameters as the list 292 of straight lines and arcs, wherein the selection and/or arrangement of the elements (arcs and straight stretches) in the position description 296 as compared to the list 292 is typically but not necessarily changed.

It is further to be noted, that the comparative position descriptions used for the database comparison 298 advantageously include the same types of parameters as the position description 296, so that a comparison is possible.

In the following, with reference to FIGS. 3a, 3b and 3c a further embodiment of the inventive position determination is described.

FIG. 3a here shows a perspective image of a road course. The graphical illustration according to FIG. 3a is designated by 320 in its entirety. The perspective illustration 320 shows a left road boundary 322 of a road, a median strip 324 of the road and a right road boundary 326 of the road.

FIG. 3b shows a top view to the road course illustrated in the graphical illustration 320 of FIG. 3a. The graphical illustration of FIG. 3b is designated by 340 in its entirety. It is noted here, that the top view 340 according to FIG. 3b for example results from the perspective view 320 according to FIG. 3a from a projective mapping, as it was for example described with reference to FIG. 2b, step 264.

The graphical illustration 340 shows a top view to a road course, wherein the left track boundary is designated by 342 and wherein the right track boundary is designated by 346. It is to be noted, that the right track boundary 346 for example consists of a plurality of straight stretches and arcs, here designated by 348a, 348b, 348c, 348d and 348e. The individual elements are by the way also designated by encircled numbers "1" to "5", in order to refer to FIG. 3c.

Further, apart from that, for example a starting position 350 of a vehicle and an end position 352 of the vehicle is known, from the position of which the road course is recorded by a camera. Based on the known starting position 350 it may for example be concluded, that a first point of the straight stretch 348a is a starting point 354 of a track boundary. Further, it may be concluded from the end position 352, that a second point of the straight stretch 348e is an endpoint 356 of a track boundary and/or a road and/or track course. Thus, it may all in all be determined, for example, that the straight stretches and arcs 348a to 348e form a continuous line course between the starting point 354 and the endpoint 356.

When executing a Hough transform, for example the straight stretches and arcs 348a to 348e of the right road boundary 346 are identified. By the Hough transforms, however, for example also straight stretches or arcs of the left road boundary 342 and, if applicable, other straight stretches or arcs may be identified. Thus, a list 292 of straight lines and arcs provided by the Hough transform (for example the Hough transform 290) for example includes information about the straight stretches and arcs 348a to 348e and, if applicable, information about additional straight stretches and/or arcs.

A corresponding description 370 of the straight stretches and arcs 348a to 348e is, for example, illustrated in FIG. 3c. All identified elements (all straight stretches and arcs) are here for example designated by a stretch type identifier which indicates, whether the identified element is a straight stretch, an arc curved to the right ("arc right") or an arc curved to the left ("arc left"). For straight stretches, the list according to FIG. 3c further includes the length, for example in meters. For arcs, the list according to FIG. 3, however, for example includes a curvature radius and an angle. The angle for example describes a difference between a direction (and/or tangential direction) at the beginning of the arc and a direction (and/or tangential direction) at the end of the arc. The list according to FIG. 3c may apart from that contain further entries (for example information about straight stretches or arcs of the left road boundary 342). Apart from that, the list provided by the Hough transformer 290 may also be arranged differently. In other words, the Hough transform 290 not necessarily provides a list which is ordered according to the geometric arrangement of the identified elements (straight stretches and arcs).

A corresponding arrangement and/or an ordered position description 296 may, for example, be generated within the scope of generating 294 a position description. In other words, the position description 296 advantageously describes a continuous road course from a starting point 354 to an endpoint 356 in an ordered way.

Figure 4:
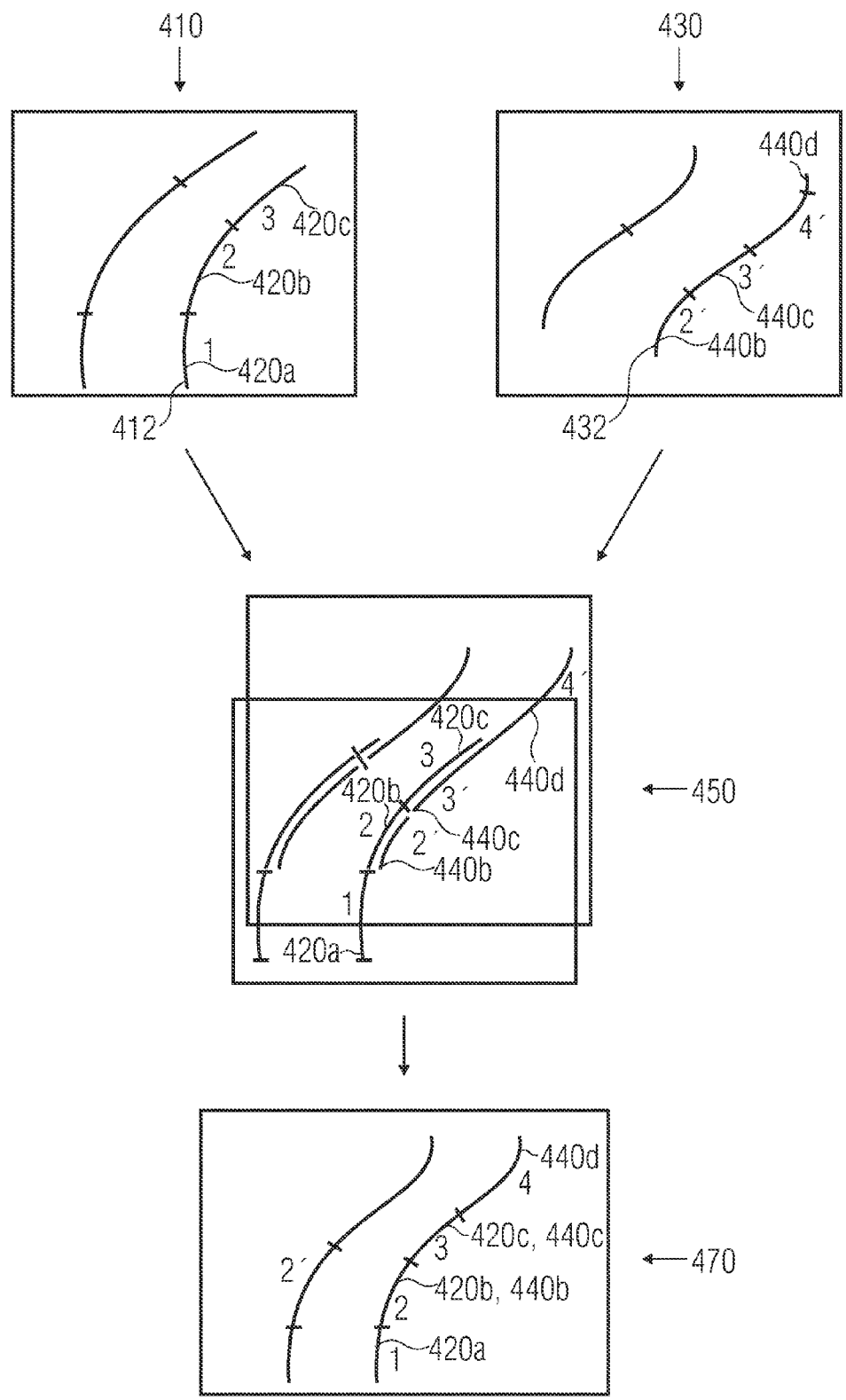
FIG. 4 shows a schematical illustration of proceedings in a determination of a combined top view to a course of a road.

In the following, it is described with reference to FIG. 4, how two individual images which were recorded by a camera in different positions of the vehicle to which the camera is mounted are combined. A first graphical illustration 410 shows a first partial image. Elements (straight stretches and arcs) of a right track boundary 412 are designated by 420a, 420b and 420c. A second graphical illustration 430 shows a second partial image which was recorded from a second camera position. For example, the vehicle to which the camera is mounted moved along the road course at a point in time in which the second partial image 430 was recorded as compared to a point in time in which the first partial image 410 was recorded. The graphical illustration 430 shows elements (straight stretches and circular arcs) of a right road/track boundary 432. The straight stretches and circular arcs are here designated by 440b, 440c and 440d. In this respect it is to be noted, that the arc 440b corresponds to the arc 420b and that further the straight stretch 440c corresponds to the straight stretch 420c.

From the first partial image 410 and the second partial image 430 for example in step 272 a combined image is generated. It is to be noted, that the partial images according to the graphical illustrations 410, 430 may for example be top views 266 onto images of extremes, so that by combining a combined top view 274 to an image of extremes results. The partial images according to the graphical illustration 410, 430 may, however, also be other types of images. For example, the partial images 410, 420 may be top views onto the road course, without the line courses in the partial images forming extreme points of arcs and center points of stretches.

Combining the two partial images 410, 430 is, for example, executed by rotating and/or shifting partial images with respect to each other and then comparing the same in an overlapping area. If a difference between two partial images shifted and/or rotated with regard to each other is sufficiently small in an overlapping area, then it may for example be assumed, that the shifting and/or rotation of the two partial images with regard to each other was selected correctly and/or suitably.

It is to be noted, that in a preferred embodiment a gradual shifting and/or rotation of the two partial images 410, 430 with regard to each other takes place, until the deviation of the partial images in an overlapping area is sufficiently small. As a starting value for shifting and/or rotating, here for example a previously determined average value of shiftings and/or rotations may be used. If, for example, a sequence of images is recorded out of a vehicle, a probability for the fact that the vehicle moves with an approximately constant speed is comparatively high. Thus, a shifting by which two subsequent partial images are shifted with regard to each other is typically approximately constant in time. If it is apart from that assumed that a vehicle for example drives along a long stretched curve, it may be assumed, that an angle around which the vehicle rotates between the recording of two partial images is approximately constant in time. Thus, an average value across a spatial shift and/or rotation between preceding partial images is a meaningful variable which may be used as an estimate and/or starting value for shifting between a currently regarded partial image and a subsequent partial image.

A graphical illustration 450 thus shows an overlapping and/or overlaying of the partial images illustrated with regard to the graphical illustrations 410, 430. It may be seen, that a good match between the first partial image according to the graphical illustration 410 and the second partial image according to the second graphical illustration 430 results when the two partial images are shifted against each other, as illustrated. Thus, a combined image may be formed which is obvious from a graphical illustration 470. The complete image 470 for example results from combining and/or overlaying the two partial images according to the graphical illustrations 410, 430. It may be seen here, that the complete image 470 for example shows a longer section of the road course than the partial images 410, 430, so that the information of the combined image 470 is more meaningful than the information of the individual images and/or partial images 410, 430.

In the following, examples for images of road courses are described.

Figure 5:
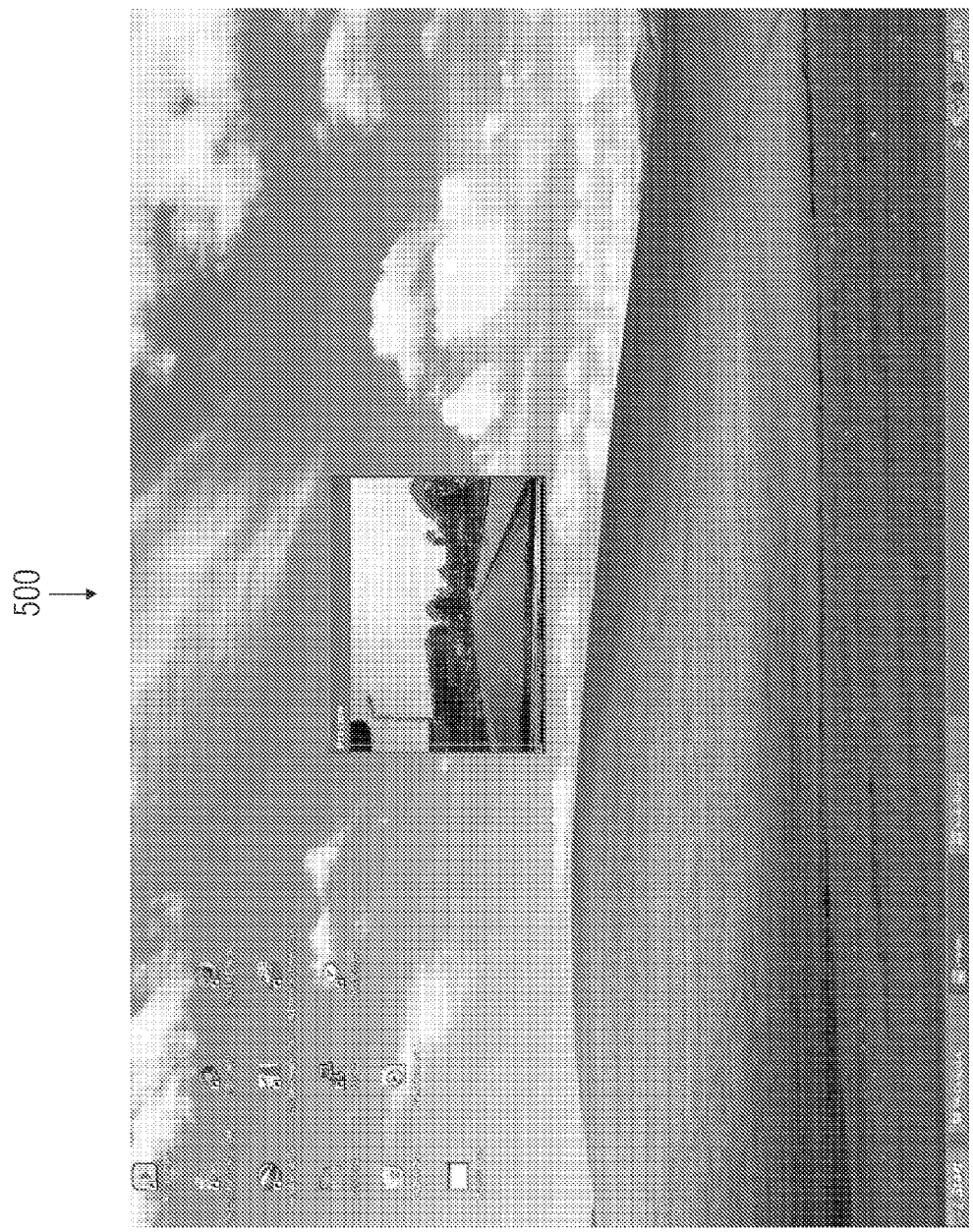
FIG. 5 shows a graphical illustration of a course of a road and extreme values identified therein.

Thus, FIG. 5 shows an outdoor shot with regard to a video navigation. The graphical illustration of FIG. 5 is designated by 500 in its entirety. In the image of the graphical illustration 500 according to FIG. 5, a silhouette of a scene is separated from a sky. Every red point corresponds to a certain extreme value having an (associated) curvature radius. As a curvature radius, for example ten image points and/or pixels were selected. An algorithm thus detects arcs and/or arc segments with a curvature radius between a minimum curvature radius of for example ten image points and a curvature radius being infinite. The image according to the graphical illustration 500 here shows three functional principles of the inventive concept:

"get the feed back on the ground"—ground/sky separation;
trees as clouds of points as they have many leaves;
vanishing point determination by the separated roadsides.

Figure 6:
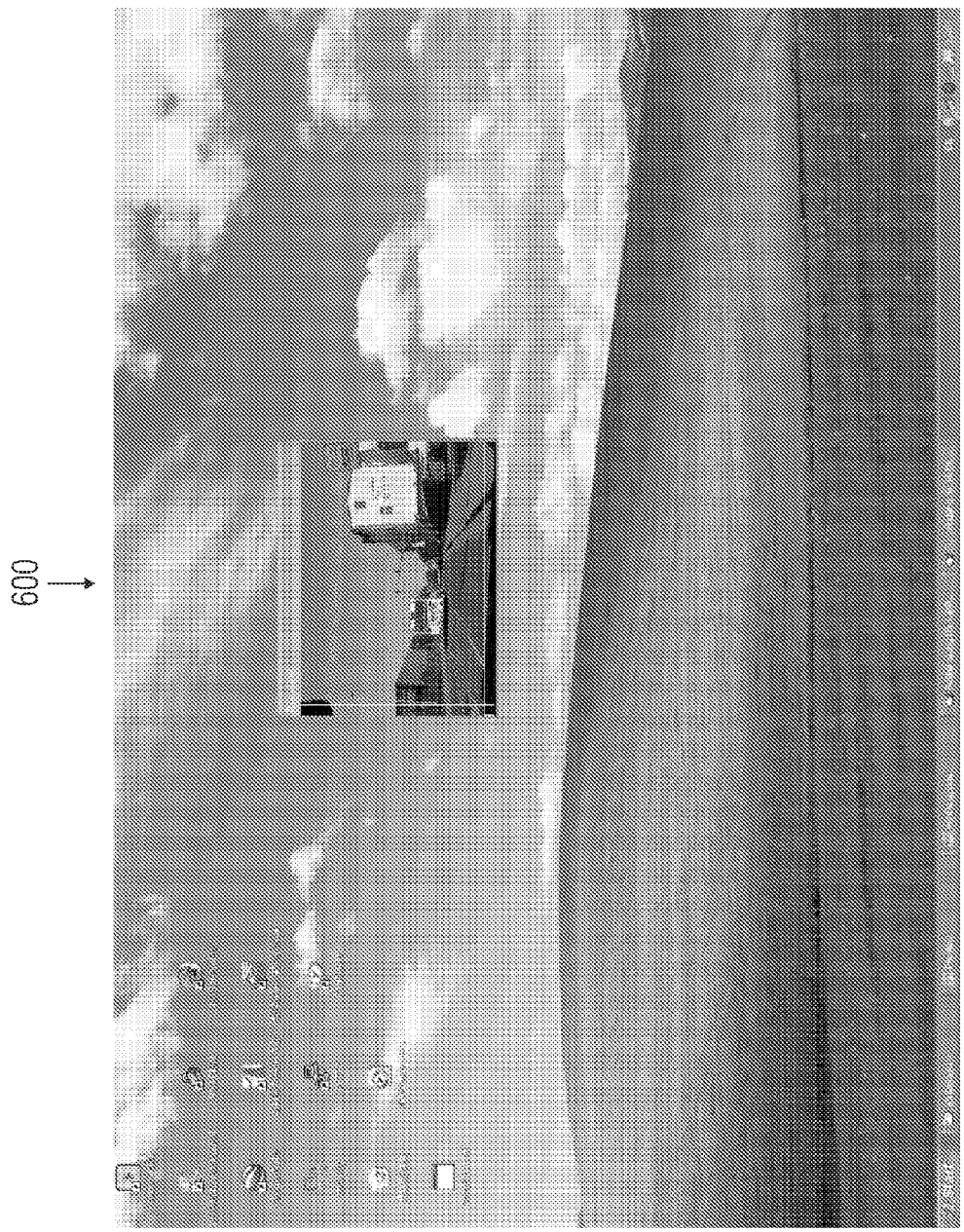
FIG. 6 shows a graphical illustration of a course of a road and extreme values identified therein.
Figure 7:
FIG. 7 shows a graphical illustration of a course of a road and extreme values identified therein.

FIGS. 6 and 7 show two images describing the movement of a bus. FIG. 6 shows the movement of the bus recorded in a first image frame, e.g. in an image frame 61. FIG. 7 shows the movement of the bus recorded in a second image frame, e.g. in an image frame 70.

Figure 8:
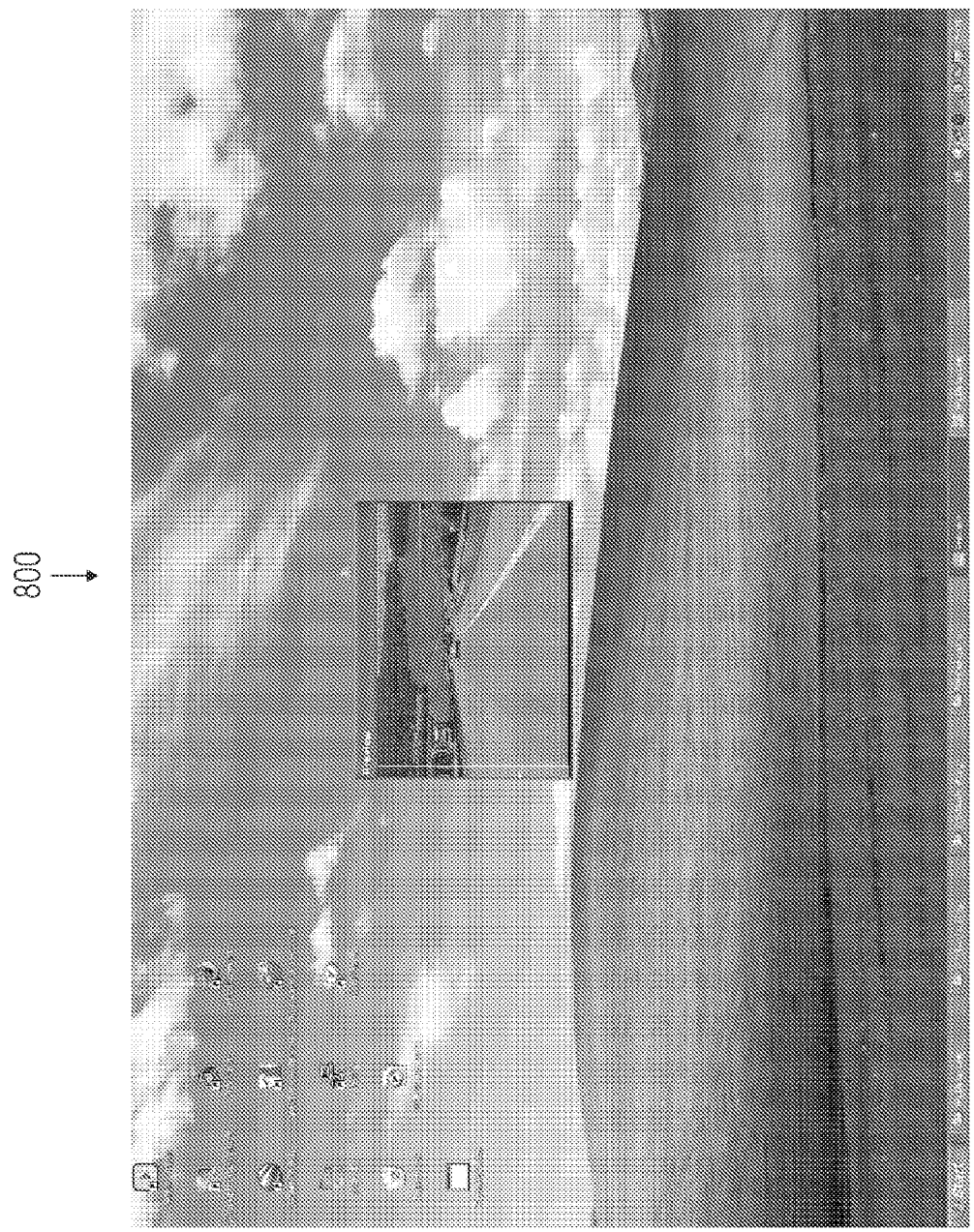
FIG. 8 shows a graphical illustration of a course of a road and extreme values identified therein.

FIG. 8 shows a graphical illustration of a road course recording. The image according to FIG. 8 is designated by 800 in its entirety. A road course recording is here illustrated using red marked points at the right roadside mark.

It is further noted, that a further feature and/or additional feature of a video supported navigation may for example be a video ESP system.

A video ESP as it may be used according to an embodiment of the present invention optimally in connection with a video supported navigation here serves as an assistance system and/or driver assistance system. The video ESP is here, for example, advantageous with narrow motorway on-ramps or drives via country roads. A camera calculates a curvature radius (for example of curves) and indicates a recommended maximum speed which you may drive in a curve.

In summary it may be noted that the present invention further includes the following aspects with regard to a video supported navigation:

course of the road: from video images of a roadside, a median and/or centerline and a guardrail, a roadmap is generated and compared to a map material.

vanishing point determination: from intersections of centerline, guardrail, left roadside and/or right roadside a vanishing point is determined.

horizon: the Hough method is especially suitable to separate ground and sky.

video ESP: it is calculated from a road curvature, with what maximum speed a curve may be taken and/or driven.

sign detection: the Hough method is better than conventional methods and for example also serves for traffic sign detection.

font detection: the method according to one embodiment of the present invention serves for detecting symbols and/or signs in traffic signs (e.g. of place names, speed limits "120", "80", arrows, etc.)

OnMove: red points (e.g. extreme points and/or extreme values) are docking points for determining an optical shift vector and thus for determining a shift vector field.

OnEdge: the red points (e.g. extreme points and/or extreme values) are contour lines which may be regarded as extensive anchor points. The method in one embodiment operates on edges of the length 64 and is thus superior to every local OnMove, OnEdge of the size 9×9 to 32×32.

In the following it is briefly explained how a 3D model may be designed. Red point clouds (for example extreme points and/or extreme values) are matched with regard to each other in order to determine a disparity from a shift of two matching red points of a similar curvature radius.

A traffic sign detection is improved by determining from the disparity whether an image point and/or a pixel is associated with a 3D object. Thereupon, all image points and/or pixels are removed from a disparity matrix which do not belong to same. With traffic signs, when using two cameras having different angles of view, different axis values a, b result, from which an angular position of the traffic sign with regard to a camera axis may be concluded. From this, for example a three-dimensional model may be designed.

Apart from that it is to be noted, that the inventive video supported navigation may be regarded as a continuation of an identification of ellipses. A software "WinDelayLine" for executing a Hough transform is for example consequently practically applied to achieve manifold applications. For driver assistance systems for example an eye tracking, line recognition and a traffic sign detection is one and the same thing, as all of these problems are solved using the same software WinDelayLine.

It is to be noted, that image detection is color and shape. The shape results from a merging of a Hubel-Wiesel network (a practical realization is the software "WinDelayLine", using which all examples were generated) with a retinal preprocessing according to Professor Rosska. The shape is normalized using the color information according to Professor Zeki.

The software "WinDelayLine" functions because it is a consequent digital solution of the main theorem of curve theory.

According to one aspect of the present invention, an inventive apparatus for video supported position determination includes a preprocessing means to generate a preprocessed camera image based on a camera image in which areas of the camera image belonging together are illustrated by associated extensive areas of one color.

According to one aspect of the present invention, the apparatus further includes an image comparison means which is implemented to determine a position from which the camera image was recorded by a comparison of the preprocessed camera image to a model image based on an ambient model describing a view of an environment in the form of a plurality of single colored areas and comprising associated location information. The inventive concept further includes a use of Hough extremes which constitute and structure a shape. As an example, reference is made to a traffic sign. If it is known, that the shape of the traffic sign is round and that the color of the traffic sign is red, a traffic sign has thus already almost been determined and/or encircled.

According to one aspect of the present invention, from video images of a roadside, a centerline and a guardrail a roadmap is generated. The roadmap is compared to map material. Additionally, the determination of the course of the road may for example be used to prevent a vehicle from driving off a road. In other words, according to one aspect of the invention, the present invention provides a driver assistance system for lane recognition.

When using the software "WinDelayLine" extreme values of a roadside quickly pass by an observer, so that a feeling like in a formular-1 race results. Roadmaps are generated from the course of curvatures by plotting a piece of a puzzle in every image and then comparing the same to roadmaps.

According to one aspect of the present invention, seeing colors represents an important aspect. According to another aspect of the present invention, however, a stretch is plotted from a continuous continuation of extreme values.

It is further to be noted, that an algorithm for a road course determination according to an embodiment of the present invention may be executed similar to a detection of an ellipse with the help of a Hough transform. A video camera generates input images, then curvatures are determined, and like in a satellite image generation from the extreme values the same are put together into a roadmap again.

With regard to a vanishing point determination it is noted, that parallel lines intersect in a Euclidean metric in an infinite point, but not in a camera model. In a camera model, roadrail, roadside and centerline intersect in one point. The vanishing point and the maximum inner curvature radius at a right roadside in a right curve for example serve for an inner orientation how a driver and/or a vehicle drives into a curve.

It is further noted, that according to one aspect of the present invention, with a vanishing point also color areas may be separated, for example a horizon.

In this respect, reference is for example made to the documents "Inertial sensor data integration in computer vision systems" by J. Lobo (M. Sc. Thesis, University of Coimbra, February 2002).

It is further to be noted, that according to one aspect of the present invention a horizon determination is executed. For example, a horizontal cloud of points separates ground from sky. Thus, for example whole parts of an image may be separated, as clouds may then be completely random.

According to one aspect of the present invention, for a position determination both color and also shape are important. By a horizon determination, however, for example sky is removed. Thus, the inventive concept according to one aspect of the present invention is compatible with a database by Yahoo.

With regard to a video ESP it is noted, that a curvature (for example of a curve) as a physical parameter represents a criterion whether a speed with which for example a vehicle approaches the curve or passes the curve is appropriate for taking the curve and/or driving same and/or for being carried out of the curve. Thus it is to be noted, that roads are in many cases built according to a mathematic formula. Thus, for example, in many cases curves have a predetermined course.

With regard to the video ESP it is to be noted, that the corresponding system which may be combined with the inventive video supported position determination is a driver assistance system which does not arbitrarily intervene. Rather, the video ESP according to one embodiment of the present invention outputs an acoustic warning signal. The acoustic warning signal suggest to a driver for example to drive into a freeway exit ramp with a slower speed (for example with 60 km/h instead of 120 km/h). A function which indicates a maximum speed depending on a curvature radius (also designated as max curvature radius (speed function)) may for example be determined empirically and/or be derived from characteristic curves of an ESP system. Further, a solution may be calculated also physically from a mass, a speed or a centrifugal force as only a centripetal force counteracts a tire adhesion.

According to one aspect of the present invention, the inventive concept may apart from that be combined with a sign detection. Here, for example, all types of traffic signs may be detected. Round traffic signs which appear elliptically from a perspective are detected and/or matched to 100%. Triangular traffic signs, parallelogram shaped traffic signs and rectangular traffic signs are also detected and/or matched, as like with a font detection small roundings may also be finely adjusted using the software "WinDelayLine". In this respect, reference is made to a priority traffic sign and a rectangular sign.

It is further noted, that according to one aspect of the present invention a video navigation and/or a video based position determination is also possible from a character detection. Thus, for example, place names or information signs may be read in order to determine a position.

With regard to a character recognition and/or detection it is apart from that to be noted, that letterings for example include arcs, roundings, vertical lines, diagonal lines and horizontal lines. In other words, letterings are, like with first graders, arcs, roundings and vertical, diagonal and/or horizontal letterings. For example an o" having four extreme values is plausible. An "s" also has four extreme values but in a different position to each other. Thus, in character recognition for example a MIN-variation algorithm having predetermined supporting locations of the extreme values is applied to convert found inputs into strikes.

In the following, details with regard to an OnMove operator are described. According to one aspect of the present invention, the inventive concept applies in full scope, as an inventive OnMove operator goes beyond a 3×3 pixeling. Each extreme value is anchored by up to 64 pixel points, as the extreme value is a representative of a certain curvature and position from up to 64 pixel points. Thus, the extreme value is robust and is for example also found in subsequent images. Thus, a shifting trajectory (an optical flow) may be fixed to the extreme values as anchoring points. With an optical flow, for example stationary objects like traffic signs are separated from moving objects like vehicles. Thus, for example, moving objects are deducted.

In the following, details with regard to an OnEdge operation are described. According to one aspect of the present invention, an edge detection algorithm may be applied universally. An edge results from extremes (red and/or marked in red) for example following a horizontal structure. Histogramming along an axis firmly indicates that this is an extensive edge of a certain length.

In other words, the present invention may especially well be combined with an algorithm as it is executed by the software "WinDelayLine". Apart from that also an algorithm as it is used for ellipse detection is suitable for being used in connection with the inventive concept.

According to one embodiment of the present invention a video supported navigation is executed as follows:

According to one aspect of the present invention, a frame and/or a framework and a core includes an object detection in contour segmentation networks. In this regard, reference is for example made to the publication "Object detection by contour segment networks" by V. Ferrari et al.

The inventive concept of a video supported navigation according to one embodiment of the present invention includes a determination of color areas, a determination of curvature based Hough point clouds, a use of an OnMove operator and an OnEdge operator and a determination of a road course routing.

According to one aspect of the present invention, the inventive concept is based on neurobiology. According to one embodiment, the present invention includes a change of a color constancy and a curvature based Hough part. Thus, for example the operators "OnMove" and "OnEdge" described by Professor Rosska are covered and/or included, wherein a Hough operator and/or an execution of a parallel Hough transform forms the operators OnMove and OnEdge. According to one aspect of the present invention, contours are filled by the color which corresponds to an OnSluggish operator. With the inventive concept, apart from that a contour finding is executed by a Hough operator and/or by the execution of a Hough transform. Further, apart from that, a traffic sign detection and a character recognition may take place using a Hough operator.

Figure 9:
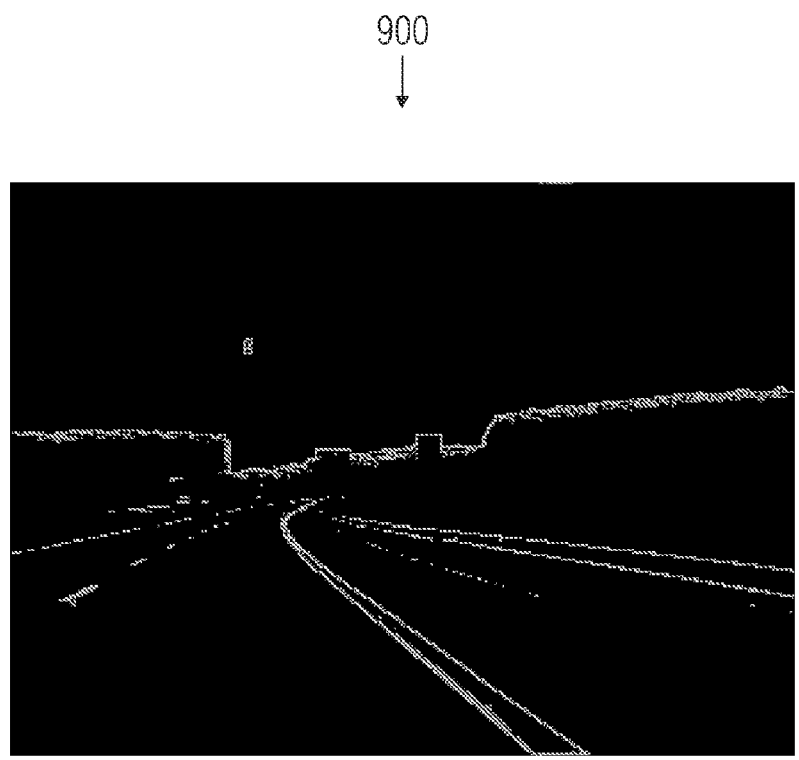
FIG. 9 shows a graphical illustration of a course of a road and extreme values identified therein.

In the following, the inventive concept is again briefly summarized in order to filter out an essence of the method and/or the concept. In one embodiment of the present invention, an image is recorded by a camera mounted in or at the vehicle. FIG. 9 shows a typical image which was recorded for example on highway A71 using a Panasonic GF27 video camera and/or videocam by a passenger from a driving car. The image illustrated in FIG. 9 was gained using the software "WinDelayLine". In the corresponding software, a threshold value, a searched curvature radius range and further parameters (for example parameters of a parallel Hough transform) may be set by slide controls. The Hough transform may be executed similar for example to an ellipse detection.

The software WinDelayLine receives an edge control image as an input image. In a case of comparison of an ellipse detection, the edge contour image is an ellipse border. Visible marked points and/or red points are the extreme values found. They each contain information about the curvature radius. Practically, using a digital solution of a first fundamental theorem of curve sketching, every function may be represented from supporting location and second derivative (curvature radius). From red points of a plurality of individual images (and/or every individual image) a roadmap is generated by following along a sideline and/or a centerline in every subsequent image. To also find straight stretches, in a Hough core linear Hough equations are programmed, so that then straight lines of a different inclination are found.

It is further noted, that a video demonstration and/or a video demo of a motorway drive already exists. In the video, according to one embodiment of the present invention, only red and/or marked extreme values and/or extreme points are illustrated. The film causes the feeling of sitting in a car and looking onto the road.

In the following, with reference to FIGS. 10a to 10h, a further embodiment of the present invention is described. FIGS. 10a to 10d here show a block diagram of an inventive concept for a video supported navigation.

Figure 10A:
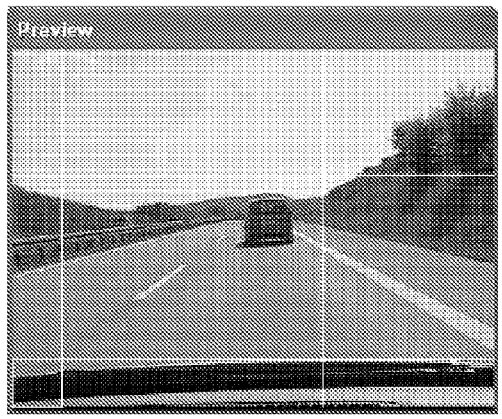
FIG. 10a shows a graphical illustration of an original video image.

FIG. 10a shows a graphical illustration of an original video image, for example of the image and/or camera image 208.

Figure 10B:
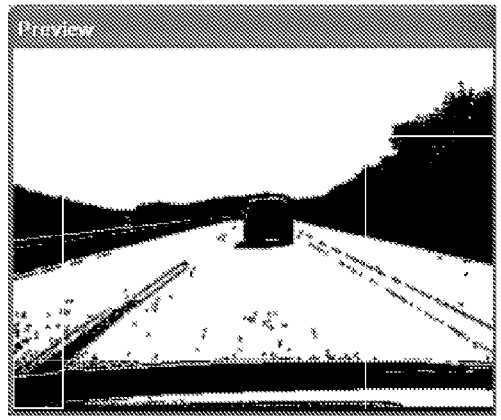
FIG. 10b shows a graphical illustration of a threshold value image processed by threshold value formation.

FIG. 10b shows a graphical illustration of a threshold value processed image and/or threshold value image (threshold image). The graphical illustration of FIG. 10b may here, for example, illustrate the preprocessed image 212.

Figure 10C:
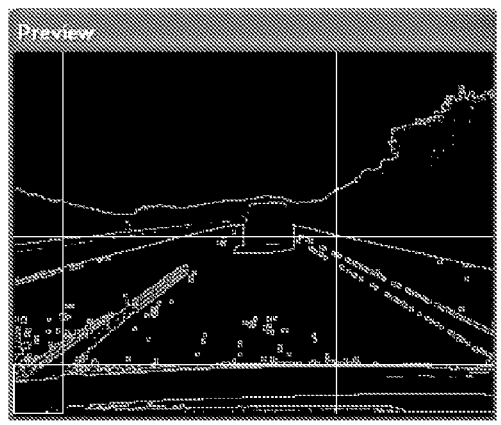
FIG. 10c shows a graphical illustration of a contour image processed by a contour detection.

FIG. 10c shows a graphical illustration of a contour image. The contour image according to FIG. 10c may for example be gained by an edge detection from the threshold value image according to FIG. 10b within the scope of an image preprocessing. In other words, the contour image according to FIG. 10c may, for example, correspond to the preprocessed image 212.

Figure 10D:
FIG. 10d shows a graphical illustration of an image of extremes processed by a Hough transformer.

FIG. 10d shows a graphical illustration of an image of extremes. The image of extremes according to FIG. 10d may for example be generated by an execution of a (for example parallel) Hough transform from the contour image according to FIG. 10c. In other words, the image of extremes according to FIG. 10d may for example correspond to the information 222 on the extreme points of circular arcs or elliptical arcs in the preprocessed image or, alternatively, the image of extremes 232. Further, the image of extremes according to FIG. 10d may additionally include information about straight stretches in the contour image according to FIG. 10c.

Figure 10F:
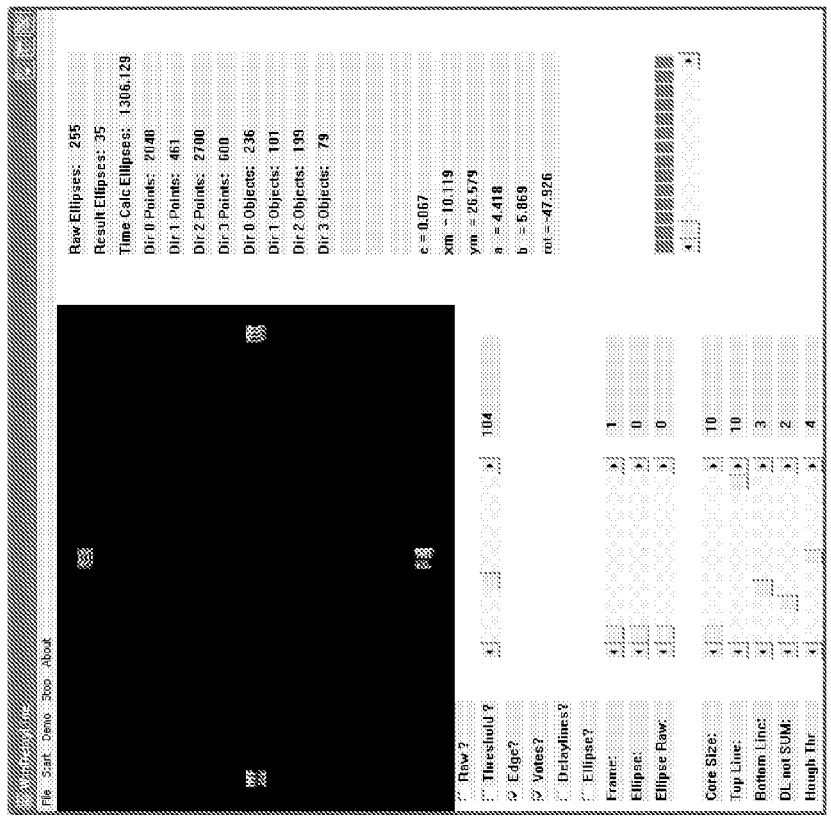
FIG. 10f shows a graphical illustration of a set of parameters used in the generation of the image of extremes according to FIG. 10e.
Figure 10E:
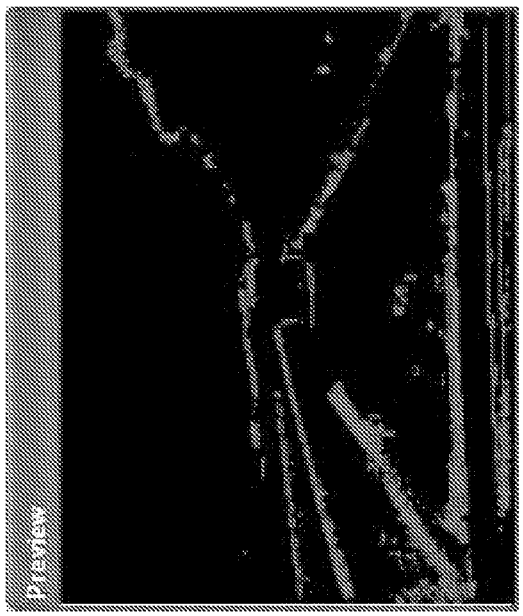
FIG. 10e shows a graphical illustration of a further image of extremes.
Figure 10H:
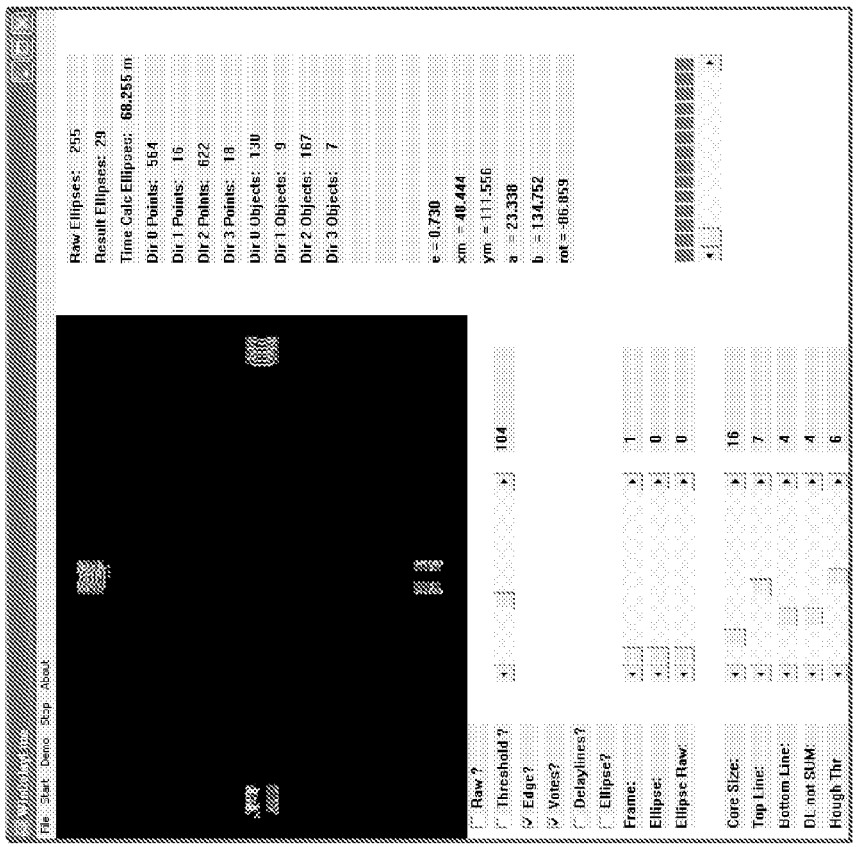
FIG. 10h shows a graphical illustration of a parameter set used in the generation of the image of extremes of FIG. 10g.

FIG. 10e shows an image of extremes as it is generated by the software "WinDelayLine". FIG. 10f shows a graphical surface of the software "WinDelayLine" and selected parameters for generating the image of extremes according to FIG. 10e.

Figure 10G:
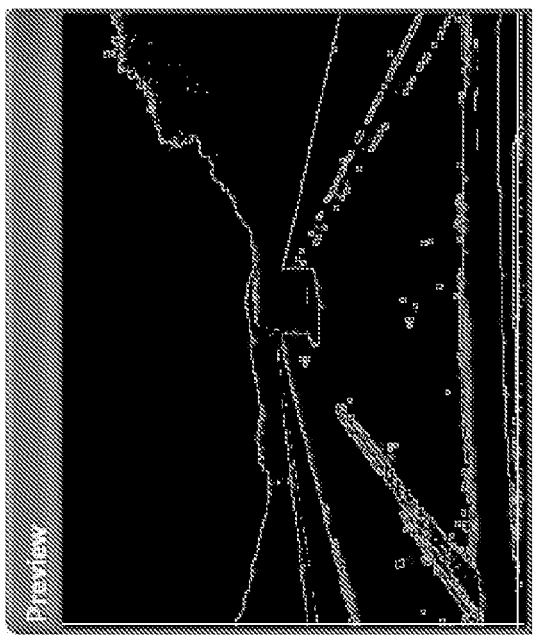
FIG. 10g shows a graphical illustration of a further image of extremes.

FIG. 10g shows a further graphical illustration of an image of extremes as it was generated by the use of the software "WinDelayLine", i.e. executing a Hough transform. FIG. 10h again shows a graphical surface of the software WinDelayLine and the parameters selected for the generation of the image of extremes according to FIG. 10g.

In this respect it is to be noted, that a parameter "core size" determines a radius in image points and/or pixels. Parameters "top line" and "bottom line" determine a searched curvature radius range. A parameter "delay not sum" (DL not SUM) determines a range around an extreme value (a curved line) which is spared so that not too many horizontal lines are found. From combined partial images, a roadmap is constructed by overlaying suitable partial pieces, deskewing the images by projective central projection, reproduction to scale and a comparison to a roadmap.

In the following, again briefly the parameters of a Hough transform are described as it is executed by the software "WinDelayLine". Here, reference is made to a description of the software "WinDelayLine". A parameter "RAW" describes, whether a current image frame is to be indicated. A parameter "threshold" determines that an image region which is darker than a predetermined gray threshold value which may for example be set with the help of a slide control, is indicated. The gray threshold value may, however, for example be calculated automatically for a first image frame. Apart from that a manual setting is possible. A parameter "edges" enables to indicate a contour line of an image region which is darker than the gray threshold value. The parameter "votes" determines, whether the vertices of an ellipse and/or extreme points of circular arc segments or elliptical arc segments are indicated as marked points and/or red points. A parameter "delay lines" determines, whether an indication or display of a content of delay registers takes place. A parameter "ellipse" determines, whether a determined ellipse is displayed in a preview window. A parameter "frame" enables to select a desired image frame and/or frame within a video sequence. A parameter "ellipse RAW" enables to determine, whether the ellipses of an alternative method "Fitzgibbon" are displayed.

A parameter "core size" changes a size of a Hough delay register and/or of several Hough delay registers.

A parameter "top line" varies a top end of the Hough delay register. The lower the top end, the lower a calculation and/or computational effort. A range of ellipse radii, which are searched for, is limited by this, however.

A parameter "bottom line" influences a bottom end of delay registers.

A parameter "delay not sum" and/or "DL not SUM" causes a limitation of a radius of elliptical or circular objects which are to be localized.

A parameter "Hough Thr" (Hough threshold) enables a setting of a Hough histogram threshold value. The lower the Hough histogram threshold, the easier interferences of an ellipse, like interruptions or notches or dents, are tolerated.

In the following, with reference to FIGS. 11a and 11b it is again briefly indicated how a track detection may be executed using a Hough transform.

Figure 11A:
FIG. 11a shows a graphical illustration of an example for a track detection with the help of a Hough transform.
Figure 11B:
FIG. 11b shows a further graphical illustration of an example for track detection with the help of a Hough transform.

In this respect it is to be noted, that using a Hough transform apart from a traffic sign detection by an optical system in a vehicle also a visual track detection may be executed. In this respect it is to be noted, that using a Hough transform, apart from a traffic sign detection by an optical system in a vehicle also a visual track detection may take place. In other words, a warning may result when a vehicle swings off a road and/or threatens to swing off a road. The system may thus serve as a support for an unconcentrated or distracted driver. FIGS. 11a and 11b show examples for a track detection with the help of a Hough transform. The graphical illustrations according to FIGS. 11a and 11b for example show traffic situations on a motorway. With regard to the graphical illustrations of FIGS. 11a and 11b it is further to be noted, that the red points represent found extreme values which additionally comprise non-illustrated information about a local curvature radius. The examples according to FIGS. 11a and 11b were generated using the software WinDelayLine. In the mentioned software, for example a maximum curvature radius, a minimum curvature radius, a number of image lines and/or image columns ("delay not sum") which are not used for the Hough transform may be set. Further, for example a curvature radius and/or a Hough core size may be set. It is to be noted, that for the software WinDelayLine (and/or for the algorithm for executing a Hough transform used therein) already VHDL files exist for use in a frame grabber system.

In other words, the Hough transform may for example directly be used in a frame grabber system, for example by executing the Hough transform in a field programmable gate array (FPGA).

In the following it is again briefly described, how in one embodiment of the present invention a position determination is executed based on an image of extremes. After an intermediate representation in the form of extreme values (for example represented by red marked points) has been generated, the next step is for example a central projection, in which from a focal width of the camera and a line of vision a central projection of the points is executed by a coordinate transformation. To put it simple, this means you look onto the road from the top. In other words, an imaging of the extreme values and/or extreme points into the form of a top view is executed.

Subsequently, a map is put together from patchworks and/or from individual parts and image after image it is overlaid to the suitable connecting point. As a forward directed movement is given, for example only next neighbor values of every point are to be overlaid suitably with regard to each other. This is for example executed by means of an adjustment calculus by determining by variation min (sum $(x\_i, y\_i-x\_i, y\_i))^2$ a mean shift vector of an image with regard to its predecessor.

Then, this information is abstracted, so that map information is present in the form of a position plan and/or in the form of a map. x, y coordinates are combined into stretches of way and sections of an arc in a line graphics form. For example, a description of the form "start at an absolute zero x0, y0, go a stretch of a way which is 50 meters long in a 30° angle, then curvature arc portion to the left, etc." may be generated. For a computer calculation for a comparison to a roadmap, the values are stored in tables and/or stored as numerical values to find matching sequences.

With regard to a procedure how an illustration may be generated using a two-dimensional illustration of the extreme value image, as if you were looking down from above, in the following reference is briefly made to the projective geometry. In this respect it is to be noted, that according to the invention a conventional camera model is used (see document "Inertial sensor data integration in computer vision systems" by J. Lobo, University of Coimbra, pages 37 ff.). Further, reference is made to the publication "Improving calibration of 3D-Videooculography systems" by K. Schreiber and T. Haslwanter (IEEE transactions on biomedical engineering, vol. 51, no. 4, April 2004). Apart from that, corresponding details may further be taken from the standard teaching "Digitale Bildverarbeitung" by Professor Jähne, Springer-Verlag.

For a roadmap, a top view is advantageous. For a view of buildings, however, a vertical view is advantageous. Best would for example be a 3D-grid model. It is further to be noted, that from a camera view of a road from a perspective from a top angle to the side, a top view may be re-constructed.

In an alternative embodiment, further in an image section curvatures and straight courses and/or straight stretches are determined. Further, in the corresponding embodiment the roadmap is back transformed in this space.

Apart from that it is noted, that the method of a projective mapping in one embodiment of the present invention is similar to gaining map material from satellite images.

If further, in one embodiment of the present invention, a vanishing point of a road is determined, then for example all points above the vanishing point may be eliminated as being horizon. The horizon is an unstructured course and may in one embodiment of the present invention be eliminated from a curvature radius histogram.

According to one embodiment of the present invention, a large map is put together from several (for example mapped by a projection) individual images. Thus, for example, two subsequent individual images are shifted and rotated with regard to each other until a difference between the two images and/or individual images is minimized in an overlapping area. By this, in one embodiment of the present invention, from a plurality of individual original video images a large map results which basically represents a top view of a landscape, provided unwanted image portions (like for example a horizon) are removed.

A corresponding illustration for example includes a large number of marked extreme points and/or "red points", as basically a plurality of images of extremes (each including a large number of red points) were coordinate-transformed and combined.

Based on the large map, then information is abstracted so that map information is present in the form of a position plan. x, y coordinates are in one embodiment of the present invention combined into stretches of way and sections of arcs in order to obtain a line graphics form (and/or line graphics representing a shape). With regard to a generation of abstracted information from a plurality of extreme values and/or red points it is to be noted, that this poses a cartographic question. In this respect, scale is for example important.

In one embodiment of the present invention, 25 images per second are regarded as far to high an information density, so that only spatial indications are to be made: a road for example goes straight for half a kilometer, then 20% (or 20°) to the right, etc. In this respect, a procedure in one embodiment of the present invention is similar to the generation of a map from a satellite recording, however.

In the following it is briefly explained, how by an abstraction of a top view, which includes a large number of extreme values and/or extreme points and/or of marked "red" points, an illustration may be generated, which only describes a course of a road as a sequence of stretches of way or sections of arcs. Further, it is explained in the following, how curvature information provided by the Hough transform may be evaluated.

From a continuity of curvature radii of neighboring points it may be concluded, whether a course of a road exists or an unstructured course of the horizon. In order to combine extreme points and/or red marked extremes, in one embodiment of the present invention, a second Hough transform is applied to the extreme points and/or to the red marked extremes to globally determine a curvature of a roadway. In this respect it is noted, that the roads are generally constructed according to predetermined standards (e.g. DIN standards).

In the following it is described, how, according to an embodiment of the present invention, a course of a road is identified, wherein it is assumed, that in a coordinate transformed image, i.e. for example in a top view, a plurality of lines exist which do not all belong to a road. Thus, in a top view for example lines exist belonging to houses, signs, passengers, trees and other objects. According to one embodiment of the present invention, these lines are differentiated from boundaries of the road. A corresponding identification of a course of a road for example takes place from a criterion of a continuity and a plurality of overlaps of images, so that an optical flow of a road results when a video is watched. A horizon jumps more. In other words, a road course is different from other objects in an image, for example due to the fact that a road course is continuous in several images, while other objects move more.

It is further to be noted, that a determination of map information (for example in the form of information describing subsequent stretches of way and sections of arcs) stands in context with a position determined using "Google-Earth" (i.e. using a three-dimensional model, for example of buildings). Thus, the two concepts according to one embodiment of the present invention are connected by a common 3D model, wherein advantageously a horizontal view and/or a vertical view is used.

It is to be noted, that also a building, a vehicle or another object leaves red points and/or identified extreme points. Thus, for example, an image of extremes resulting from the recording of a building may be processed and/or used for an identification of a position in the inventive way. The identification is here executed using a contour labeling. For details, reference is among others made to the above description and to the publication "Object detection by contour segment networks" by V. Ferrari et al.

In the following, the concept of video supported navigation is summarized again step by step according to one embodiment of the present invention. In this respect it is to be noted, that the method of video supported navigation in its first steps is for example similar to an ellipse identification. Parameters, like for example a threshold value, may be set in the already above-mentioned program WinDelayLine. The video supported navigation is executed step by step as follows:

1. Record an image using a camera.
2. Set threshold values;
    binarization (ought to be adaptive according to a histogram distribution of gray values):
    more often with a video and/or repeated readjusting after x frames; alternatively setting an optimal threshold for each image;
    standard image processing as for example described in a textbook by Jähne.
3. Find contour;
    a contour finder algorithm is an algorithm put together from morphological operators but in the principle of an edge detection algorithm.
4. Execution of a Hough transform; using the software WinDelayLine extremes in the image are found and marked (for example red). Every extreme is indicated by an x, y position and additionally has a curvature value. The generated clouds of extremes ("red cloud") may be more or less dense, depending on the variation of the parameters "core size", "maximum curvature radius", "minimum curvature radius", "delay not sum".
    For details in this respect reference is made to the description of the software WinDelayLine.
5. Form an amount and/or a set of templates in a contour description language (for example in the contour description language as it is described by V. Ferrari in the article "Object detection by contour segment networks").
    For example: Straight stretch, then sharp turn to the left, turn to the right (like with rally drivers).
    Generate a component vector for each stretch which is renewed ever again and which is adapted to the current course.
    General method (according to the publication of V. Ferrari): if an object is put together from lines and circular arcs, describe how the object is put together. Example: corner, line upwards, y centimeters, line downwards, x centimeters, curvature arc with curvature radius.
6. The course of a road consists of lines and arcs. One search string each of n subsequent and/or consecutive sections, i.e. for example a vector having the length n with components of the course of the road of the form (curvature, section 1, section 2, straight line, curvature, . . . , ), is compared to courses of roads in a stored search library. Here, a MIN-algorithm classification scheme is used.

Further, here, advantageously a main theorem of curve sketching is taken to heart: every function may be approximated by a supporting location and a second derivation. This only holds true in a limited way in a digital case. Vertical and horizontal lines are found, also circles are no problem, but with straight lines of different gradients, the method does not function well in one embodiment. Thus, advantageously in WinDelayLine a Hough line finder is used, as it is described in the publication "A neural net for 2D slope and sinusoidal shape detection" by A. Brückmann, F. Klefenz and A. Wünsche (published in: International Scientific Journal of Computing, vol. 3, issue 1, Ukraine, 2004, pages 21-26). In other words, for example a complete computational neuro-scientific Hubel-Wiesel solution of an orientation selectivity is used.

It is further noted, that in the above described method according to one embodiment of the present invention, advantageously an intermediate step thanks to video supported navigation is introduced. A course of the road is advantageously not shifted to and fro arbitrarily in a map with regard to congruence, but is disarranged directedly by a mean shift vector. A measuring point grid spanned by identified extreme points (red extremes) is determined as accurately fit as possible by means of adjustment calculus frame by frame, by calculating a degree of freedom of an average shift of the grid in the x direction and the y direction. Likewise, for example, a rotation of the grid is calculated, so that the image frames are connected to each other piece after piece in order to process a complete course of a road.

For details with regard to the software WinDelayLine reference is made apart from that to a dissertation by J. Katzmann.

According to one aspect of the present invention, the inventive concept for supported navigation may also be combined with a video ESP. An ESP is in part more accurate regarding measurement, but a video ESP anticipates danger as thus a curvature of a curve is determined long ahead before a vehicle drives into a curve and/or bend with a possibly higher or too high speed.

In the following it is described how, according to one aspect of the present invention, information reduction may take place. According to one aspect of the present invention, information reduction of a roadmap is an important step in an implementation of the inventive concept. A camera for example records 25 images per second and the image sections overlap. These circumstances may, according to one embodiment of the present invention, for example be embraced by executing an adjustment calculus for each image and by stacking subsequent images onto each other fitted accurately. The adjustment calculus finds an average shift vector and tries to bring the common points of two images in congruence. All outliers which do not fit into a scheme are removed and/or are thrown out. A second Hough transform servers for a further information reduction, by Hough transforming remaining extreme points ("red points") to obtain parameters of a higher level (high level parameters). Thus, by the second Hough transform for example an absolute value may be extracted and/or distilled. For example, by the second Hough transform information may be gained, for example, that a curve with a certain curvature radius is present (e.g. in a curvature radius of 100 meters).

With regard to projective mapping, the following is noted: by a projective geometry, from a focal width of a camera, an angle of view and other geometric parameters a distorted camera image results. To calculate real world coordinates in a 3D model, for example the above-described models according to Jähne or Haselwanter may be used. In another embodiment it is sufficient to operate with undistorted camera images (i.e. without the application of a projective mapping. It is advantageous, however, to execute a processing in real world coordinates and/or to move in real world coordinates.

With regard to a position determination in which no road course and/or stretch course is used, but in which a three-dimensional view for example of buildings is used (e.g. a Google-3D view) it is noted, that the software WinDelayLine detects a horizon, traffic lights, house fronts, windows and/or horizontal and/or vertical structures. Thus, it is a question of interpretation, what the identified extreme values and/or the red points indicate. Here, the template default according the above-cited publication by V. Ferrari is one possible meaningful method to indicate patterns as known (e.g. characters or shapes of buildings). Into this pool the colors neurobiologically flow with and OnSluggish operator.

It is further noted, that this world consists of corners, edges and curvatures, from which this world is put together. The mentioned corners, edges and curvatures may for example be used for position determination using a Hough transform. In summary it may thus be noted, that a position determination may for example be executed using the roadsides, or also additionally using houses, shapes and colors. In this respect it is to be noted, that the roadside for example is the direct environment in the cone of headlamps (of a vehicle) when it is foggy. The roadside is thus reduced to what is absolutely needed. A further structure only results from houses, shapes and colors.

It is further noted, that the execution of a Hough transform is a substantial central idea of the present invention. The software WinDelayLine detects and/or sees extreme values. The detected extremes form a framework of the world and/or the environment. In one embodiment of the present invention, this basic idea is supplemented by latest findings of neurobiology.

According to one aspect of the present invention, a central idea is, that an object is color and shape.

According to one aspect of the present invention, a core performance of the present invention for example consists in the following aspects:

Hough transform, for example with the software WinDelayLine;
contour labeling in accordance with Ferrari;
color vision in accordance with Karl R. Gegenfurtner (see e.g. the article "Colour in the cortex revisited" by K. Gegenfurtner; published in: Nature Neuroscience, vol. 4, No. 4, April 2001).

It is further noted, that in connection with the inventive concept, a Smith-Waterman algorithm may be used for local alignment.

Thus, chapter 8 of the dissertation "Parallel hardware architectures for the life sciences" by Avi Epstein (Technical University of Delft) describes a complete realization of the Smith-Waterman algorithm for local alignment in circuit technology. With regard to an application of the mentioned algorithm reference is for example made to DE 101 178 70.

In video supported navigation it is advantageous to have a complete computational power of a chip available. In this case, with a Hough chip as it is described in chapter 7 of the above-mentioned dissertation and a DNA sequencer chip a real time system is possible symbolically referencing road scenes with full power.

It is to be noted, that the Hough chip as it is described in chapter 7 of the mentioned dissertation, describes a complete implementation of the concept in circuit technology according to EP 1032891 (title: "Verfahren und Einrichtung zur Detektion und Koinzidenzbringung abschnittsweise in monotone und stetige Trajektorien wandelbarer Signalformen"; inventor: F. Klefenz).

It is to be noted, that the combination of the extreme value method with a traffic sign detection and/or a character recognition is especially advantageous. The extreme value method opens a door in image processing so far that it is advantageous to combine the video supported navigation with a traffic sign detection and/or a character recognition. With the help of the extreme value method this is realized especially easily.

Apart from that it is to be noted, that the present invention includes a plurality of aspects which are still to be described in the following. The inventive concept, according to one embodiment, includes the aspects of modeling (Märklin railroad world model), converting to altitude of the sun, fine resolution and annihilation of both worlds by maximum approximation and becoming similar.

Further, according to one aspect, the present invention includes the application of retina operators, color operators, motion operators, edge operators and filling operators. In one preferred embodiment, a search space is instantaneous. In other words, in a preferred embodiment a one to one image comparison is executed. If a search is interrupted, the search space is limited by the fact that search is only executed in the image stacks in which the vehicle may have traveled. In one preferred embodiment standard video identification technologies are used for feature search.

The extreme value method opens new doors in image processing by the fact that extreme values may for example be histrogrammed according to their curvature radii. This may, for example, take place in a finer way than only counting horizontal and/or vertical structures.

According to a further aspect of the present invention, reading of signs is introduced into the inventive concept (for example of place signs, place names and/or speed limits). With regard to characters, as an example "o" is given, but all other characters and numbers are put together from vertical, horizontal, concave and/or convex lines. An "S" has four extreme values, just like an "O", but is different with regard to curvature and relative distance of the extreme values to each other. Thus, the inventive concept further includes the execution of character recognition based on identified extreme points.

According to a further aspect of the present invention, from a centerline (median) and a roadside detection with local curvatures a roadmap may be constructed. This detected roadmap may for example be overlaid with a roadmap "viaMichelin". Further, according to one embodiment for example a retina chip, a Hough chip and/or a Smith-Waterman chip may be used. Thus, a system results, which is better than conventional systems with regard to a real time application and with regard to an extreme value method.

With regard to a 3D modeling it is apart from that noted that the same may take place similar to a desert race method with stereo vision cameras. Thus, 3D models may be reconstructed. For details in this respect reference is made to the publication "Orientierung fürs Auto, Neuer Stereo-Vision-Sensor bringt autonome Fahrzeuge sicher ans Ziel" (published in: innoVisions 1/2006, Fraunhofer Informations- and Kommunikationstechnik, page 22).

In the following, a further embodiment of the present invention is explained in more detail, which may be used by itself or in combination with the above-described aspects.

The corresponding embodiment is explained in more detail with reference to FIGS. 12 to 16.

Figure 12:
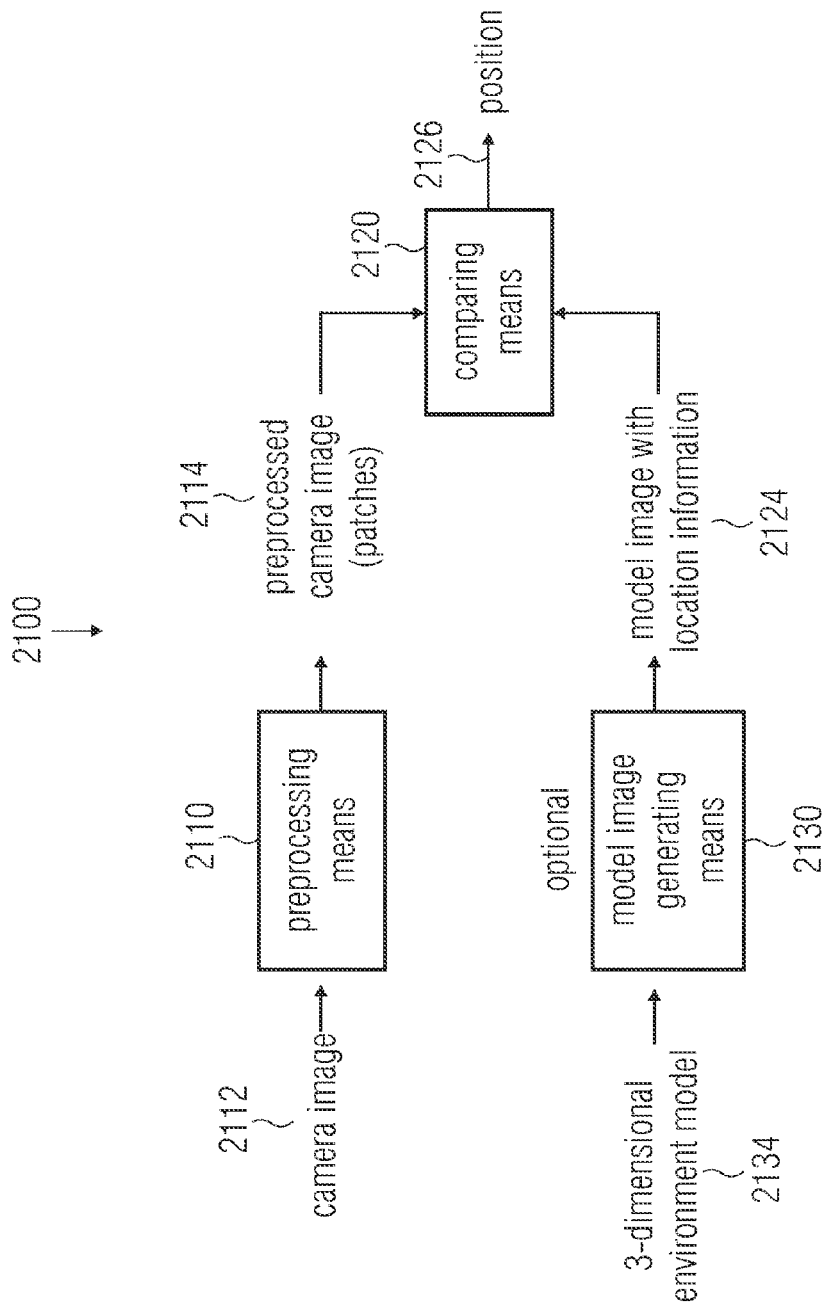
FIG. 12 shows a block diagram of an inventive apparatus for determining a position based on a camera image of a camera according to an embodiment of the present invention.

FIG. 12 shows a block diagram of an inventive apparatus for determining a position based on a camera image from a camera. The apparatus according to FIG. 12 is designated by 2100 in its entirety.

The apparatus 2100 includes a preprocessing means 2110 receiving a camera image 2112. The preprocessing means 2110 is implemented to generate a preprocessed camera image 2114 from the camera image 2112. The apparatus 2100 further includes a comparison means 2120. The comparison means 2120 is implemented to receive the preprocessed camera image 2114 and a model image 2124. The comparison means 2120 is implemented to determine a position 2126 from which the camera image 2112 is recorded based on the preprocessed camera image 2114 and the model image 2124.

With regard to the model image 2124 it is to be noted, that the model image 2124 advantageously includes an illustration of an environment in the form of a plurality of single-colored and/or monochrome areas. The model image 2124 further includes associated location information.

The model image 2124 is apart from that typically based on a three-dimensional environmental and/or ambient model which describes an environment for example in the form of a description of a plurality of geometrical objects, in the form of a network or in the form of another computer readable illustration suitable for the description of three-dimensional objects.

The apparatus 2100 optionally includes a model image generation means 2130 which is implemented to generate the model image 2124 based on a three-dimensional ambient model 2134.

Based on the above-mentioned structural description, in the following, the functioning of the inventive apparatus is explained in more detail. The preprocessing means 2110 is implemented to generate the preprocessed camera image 2114 based on the camera image 2112, so that in the preprocessed camera image 2114 areas of the camera image 2112 belonging together are illustrated by associated extensive monochrome areas. Areas belonging together are here areas which are separated by a border, for example in the form of a contour, in the form of a significant change of color or in the form of a significant change of brightness, from a surrounding area or from a plurality of surrounding areas. In other words, a cohesive area is a face and/or area which is separated from the surrounding areas by a boundary line or by a contour.

In other words, areas belonging together are for example identified by the fact that contours and/or boundaries of areas are detected in the camera image, and that by the detected contours and/or boundaries, bounded areas are designated as areas belonging together. Accordingly, the identified and/or detected areas belonging together in the preprocessed camera image are represented by monochrome areas.

In the illustration, an association between colors of the areas of the camera image and colors of the associated monochrome areas in the preprocessed camera image exists. In other words, a decision about which color from a plurality of at least three used colors is associated with an extensive monochrome area in the preprocessed camera image is made considering the colors occurring in the corresponding coherent area of the camera image. In other words, a color of extensive monochrome areas is for example selected depending on the fact what color the associated area of the camera image comprises on average. Thus, it is guaranteed, that areas which are different in color in the camera image 2112 (and/or are significantly different regarding color), are illustrated by areas of different colors in the preprocessed camera image 2114.

It is to be noted here, that the preprocessed camera image 2114 typically includes less colors than the camera image 2112. Thus, typically an area in a color space of the camera image 2112 is imaged to one single color in the preprocessed camera image 2114. In other words, bounded areas and/or areas belonging together comprising a slightly varying color in the camera image 2112 are illustrated as an extensive monochrome area in the preprocessed camera image 2114. In the preprocessed camera image 2114 thus typically only such areas of the camera image may be differentiated which comprise a difference in the camera image with regard to their color which is significant (i.e. larger than a predetermined minimum difference). The difference with regard to the colors may, for example, be defined as a distance in a color space (for example in a red-green-blue color space or in another color space).

A significant color difference by the way is a color difference which is greater than a predetermined minimum color difference (if any color space is regarded). A significant brightness difference is by the way a brightness difference which is larger than a predetermined minimum brightness difference.

Figure 13:
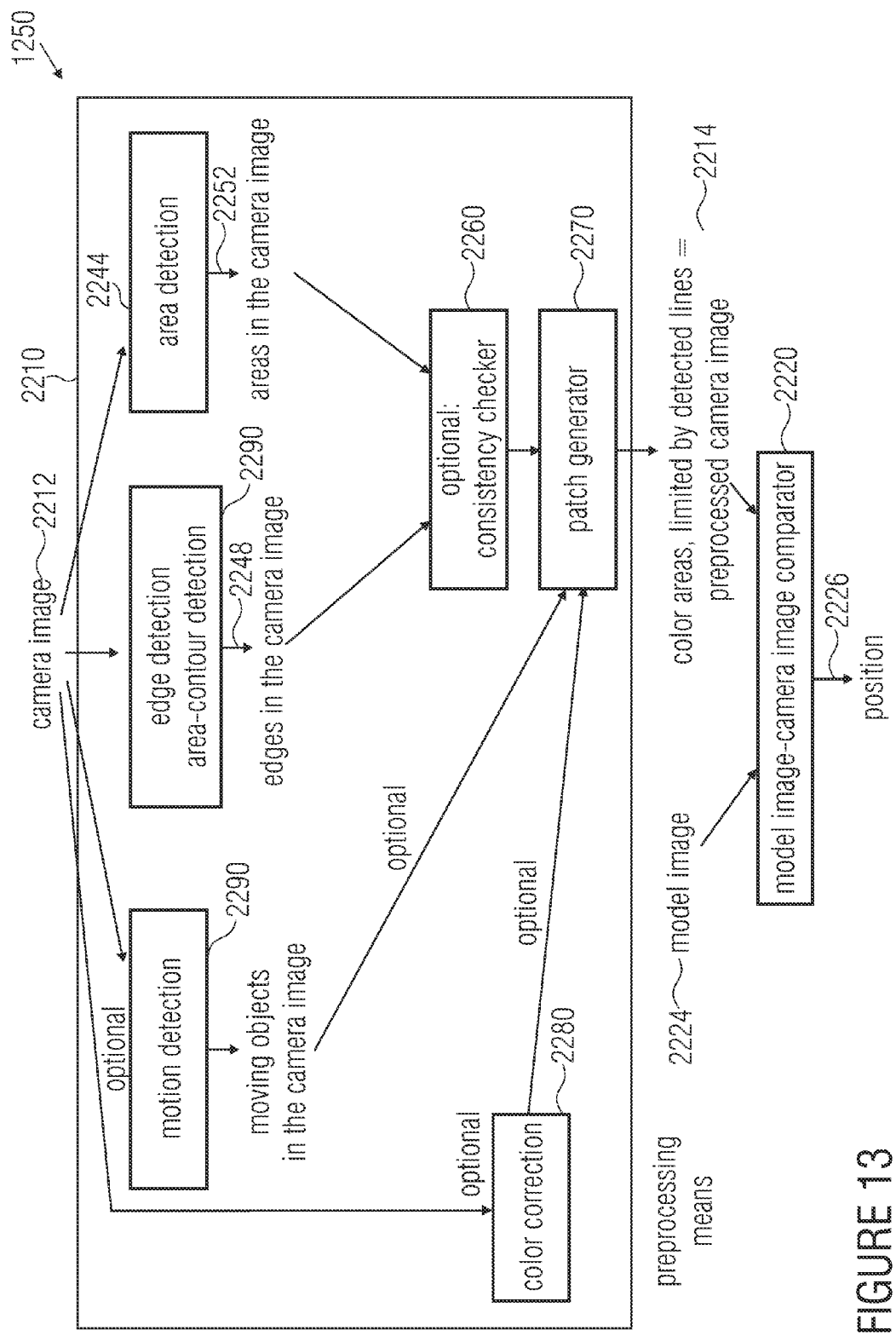
FIG. 13 shows a block diagram of an inventive apparatus for determining a position based on a camera image from a camera according to an embodiment of the present invention.

FIG. 13 shows a block diagram of an inventive apparatus for determining a position based on a camera image. The apparatus according to FIG. 13 is designated by 2200 in its entirety. The apparatus 2200 includes a preprocessing means 2210 receiving a camera image 2212. The preprocessing means 2210 provides a preprocessed camera image 2214, wherein a preprocessed camera image 2214 includes a plurality of color areas bounded by detected lines. The apparatus 2200 further includes a model image/camera image comparator 2220 which basically corresponds to the comparison means 2120. The model image/camera image comparator 2220 is implemented to receive the preprocessed camera image 2214 and a model image 2224, wherein the model image 2224 basically corresponds to the model image 2124 according to FIG. 12, and wherein the preprocessed camera image 2214 basically corresponds to the preprocessed camera image 2114. The model image/camera image comparator 2220 is by the way implemented to provide information 2226 about a position from which the camera image 2212 was recorded.

In the following, reference is made to details with regard to the preprocessing means 2210. It is here to be noted, that the preprocessing means 2210 describes an embodiment of the present invention, that the preprocessing means 2210 may however also be implemented differently, as long as the functionality described with reference to FIG. 12 is fulfilled.

The preprocessing means 2210 basically serves to generate the preprocessed camera image 2214 based on the camera image 2212, so that in the preprocessed camera image 2214 areas belonging together in the camera image 2212 are illustrated by monochrome areas.

Furthermore, the preprocessing means 2210 may, in addition, optionally be formed to remove further spurious influences, e.g. movements or color purity errors, from the camera image 2212, in order to generate a preprocessed camera image 2214 in which the disturbances mentioned (e.g. movements and color purity errors) are removed.

The preprocessing means 2200 includes edge detection means 2240 as well area detection means 2244, for example. The edge detection means 2240 receives the camera image 2212 and provides information 2248 on detected edges in the camera image 2212. The area detection means 2244 advantageously is formed to receive the camera image 2212 and provide information 2252 on detected edges in the camera image 2212.

The preprocessing means 2210 further includes an optional consistency checker 2260, which, if present, is advantageously formed to check for consistency between information 2248 on detected flanks and the information 2252 on detected areas. For example, the consistency checker 2260 may be formed to check whether the detected edges described by the information 2248 limit the detected areas described by the information 2252. If there is consistency, i.e. the detected edges limit the detected areas, the consistency checker advantageously forwards the corresponding information on the detected edges and/or areas to a patch generator 2270. If there is no consistency, i.e. the detected edges (described by the information 2248) are prohibitively far away (i.e. further than a default maximum distance) from edges of the detected areas (described by the information 2252), the consistency checker 2260 thus may, for example, change parameters of the edge detector 2240 and/or the area detector 2244, so as to achieve consistency again.

Besides, if the consistency checker 2260 is omitted, the information 2248 on the detected edges in the camera image 2212 and/or the information 2252 on the detected areas in the camera image is supplied directly to the patch generator 2270.

Thus, the patch generator 2270 generates a plurality of associated monochrome, extensive areas, which form the preprocessed camera image 2214 in their entirety, on the basis of the detected edges and/or the detected areas.

It is to be pointed out here that the edge detector 2240 typically is formed to detect a position of edges with particularly high precision. In other words, the edge detector 2240 is formed to detect linear contours or color transitions, and describe the location thereof. For example, the edge detection means 2240 may be the processing means subjecting the camera image to processing by an edge operator, so that edges and/or color transitions or brightness transitions are highlighted or emphasized.

The area detector 2244, however, advantageously is formed to detect areas the chromaticity and/or brightness of which varies only slowly (for example, by less than a default maximum variation allowable per length unit). Thus, the area detector 2244 may, for example, formed to detect and/or mark a region in the camera image in which approximately the same color and/or approximately the same brightness is present. For example, the area detector 2244 may suppress local disturbances in the coherent region (e.g. single pixels of different color, or smaller groups of pixels of different color, for example, having at most a default maximum number of pixels of different color). Yet, the area detector 2244 typically is not capable of marking contours and/or outer boundaries of areas.

For this reason, the patch generator 2270 is formed to combine the information 2248 from the edge detector 2240 with the information 2252 from the area detector 2244, in one preferred embodiment. The patch generator 2270 thus is formed to decide, based on the information 2248, 2252 mentioned, for example, which of the edges detected by the edge detector 2240 lie near a rim of an area detected by the area detector 2244. In other words, the patch generator 2270, for example, is formed to check as to how far the various edged detected by the edge detector 2240 are away from an area detected by the area detector 2244, and to detect the detected edges as a rim of the detected areas on the basis thereof (or depending thereon).

For example, if a distance of a detected edge from an area detected by the area detector 2244 is smaller than a default maximum distance, the patch generator 2270 may, for example, classify the detected edge as an edge forming the rim of the area detected by the area detector 2244.

Once the patch generator 2270 has detected all edges forming the rim of an area considered and detected by the area detector 2244, the patch generator can represent the area enclosed by the detected edges as a monochrome, extensive area associated with the area considered and detected by the area detector 2244. The patch generator 2270 may thus fill the detected coherent extensive area with color, so that there is an association between the color of the coherent region in the camera image and the associated monochrome, extensive color area in the preprocessed camera image 2214.

Details regarding edge detection will be described in the following. For edge detection, for example, a retina preprocessing or retinotopic image preprocessing can be employed. Thus, for example, an "OnEdge" image space in which substantially edges are highlighted may be determined. Such retinotopic preprocessing may, for example, easily be understood on the basis of the publication "Receptive Field Atlas of the Retinotopic visual pathway and some other sensory organs using dynamic cellular neural network models" by J. Hámori and T. Roska (published by: "Analogical and neural computing laboratory, computer and automation institute, Hungarian Academy of Sciences"). Further details regarding retinotopic processing, and particularly regarding retinotopic edge detection ("a local edge detector") are described in the article "Functional representations of retina channels via the RefineC retina simulator" by A. K. Lázár, R. Wagner, D. Bálya and T. Roska. Further details regarding the retinotopic processing can also be found in the bibliography of the publications cited.

Furthermore, it is to be pointed out that edge detection may, for example, be obtained by way of formation of a difference (or a gradient) of chromaticities and/or brightness values of two adjacent image points. In other words, for example, one forms a local gradient of chromaticities and/or brightness values of two or more adjacent image points, in order to detect an edge. If the gradient has a value greater (for example, in magnitude) than a predetermined threshold, this may, for example, be seen as a local indication of the presence of an edge.

In the preferred embodiment, an edge is detected by the edge detection means 2240 only if a plurality of (or at least a default minimum number of) locations at which a corresponding, high gradient of the chromaticities and/or brightness values has been detected are on a (straight or curved) line. For example, such detection is possible by means of pattern recognition.

In the following, a particularly advantageous, exemplary procedure in edge detection will be described.

In the corresponding procedure, for example, at first extreme points of convexly or concavely curved areas or regions in the camera image are determined. To this end, for example, at first an edge image will be generated on the basis of the camera image, wherein the edge image describes edges and/or boundaries of areas in the camera image. The edge image, for example, is present in form of raster lines and raster columns, i.e. as a bitmap. Thereupon, an ellipse detection algorithm is applied to the edge image, for example.

One method of ellipse detection is described in the article "A high-speed-algorithm for elliptical object detection" by C.-T. Ho and L.-H. Chen (published in: IEEE transactions on image processing, volume 5, number 3, March 1996, pages 574-550), for example. Another particularly advantageous method of detecting ellipses in an image, using a Hough transform, further is described in the non-prepublished German patent application, application number 102005047160.

In other words, extreme values or extreme points of curved lines are extracted from the edge image with one of the known methods of ellipse detection, but advantageously using a Hough transform and/or using a Hubel-Wiesel network. In other words, what is detected are points of a line course located furthest in a default direction in the line course. The detected points thus form extreme points of a curved line. Furthermore, break points of line courses can be detected in the edge image by way of suitable pattern recognition algorithms (advantageously using a Hough transform and/or a Hubel-Wiesel network). To this end, for example, line courses having a maximum match with a default, bent curve course are sought and/or identified in the edge image.

Figure 13A:
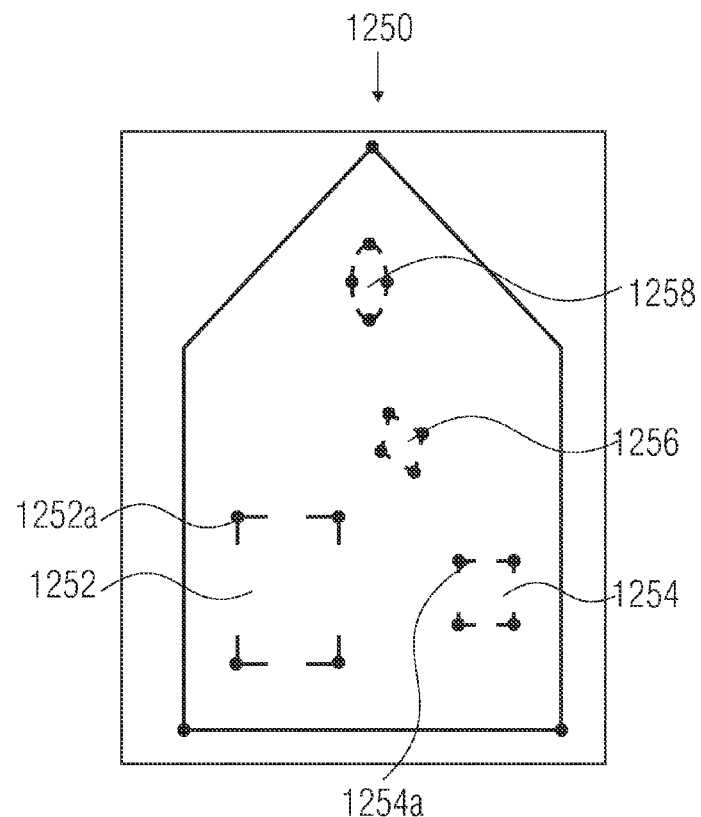
FIG. 13a shows a graphical illustration of an edge image with marked inflexion points and extreme points.
Figure 13B:
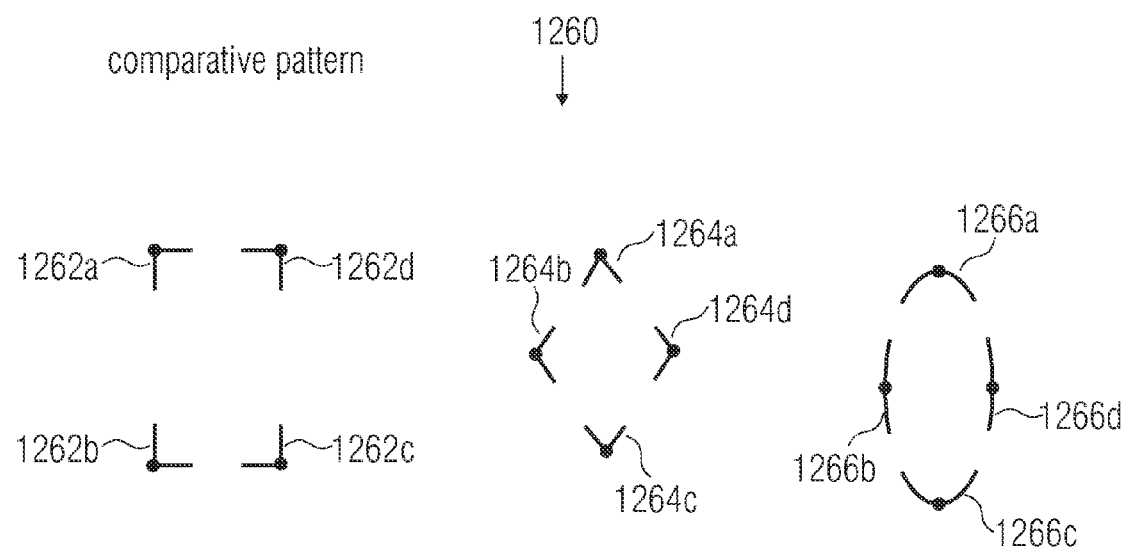
FIG. 13b shows a graphical illustration of comparative patterns for a search of inflexion points and extreme points.

FIG. 13A shows an example of an edge image with marked extreme points and break points for better illustration, and FIG. 13B shows an exemplary selection of comparison patterns for detecting break points and extreme points within the framework of image processing.

The graphical illustration of FIG. 13A is designated with 1250 in its entirety, whereas the graphical illustration in FIG. 13B is designated with 1260 in its entirety. The graphical illustration 1250 shows an exemplary edge image. Detected extreme points or break points here are represented by a blackened circle. It can be seen from the graphical illustration of FIG. 13A that particularly corner points of squares or rectangles lying in the edge image in straight or slanted manner are marked as break points. In this respect, reference is made to the squares and/or rectangles 1252, 1254, 1256, for example. Likewise, extreme points of ellipses, i.e. ellipse points, located furthest in a first direction or furthest in a direction opposite to the first direction of the ellipse are marked as extreme points. Furthermore, ellipse points located furthest in a second direction of the ellipse, as well as ellipse points located furthest in a direction opposite to the second direction are marked as extreme points. The first direction here advantageously is different from the second direction (and the first direction advantageously is perpendicular to the second direction). For illustration, reference is made to the ellipse 1258.

The detection of the extreme points and/or break points mentioned may, for example, be done by searching for certain default patterns and/or comparison patterns in the edge image according to FIG. 13A, wherein a break point or extreme point advantageously is associated with each comparison pattern.

The association between comparison patterns and extreme points, for example, is shown in the graphical illustration 1260 of FIG. 13B, wherein the comparison patterns 1262a to 1262d, 1264a to 1264d, 1266a to 1266d each have an associated extreme point (characterized by a black circle). In other words, for example, if the pattern 1262a, which only consists of a bent line segment as taken by itself, is detected in the edge image 1250, the accompanying break point can be determined with high accuracy from the presence of the pattern 1262a in the edge image. For example, break points 1252a and 1254a were determined by way of detection of the comparison pattern 1262a in the edge image 1250.

Hence, following the detection of the extreme points and/or break points, there is information on an amount of extreme points and/or break points. Furthermore, in the preferred embodiment, there is information on what kinds of extreme points and/or break points there are.

Figure 13C:
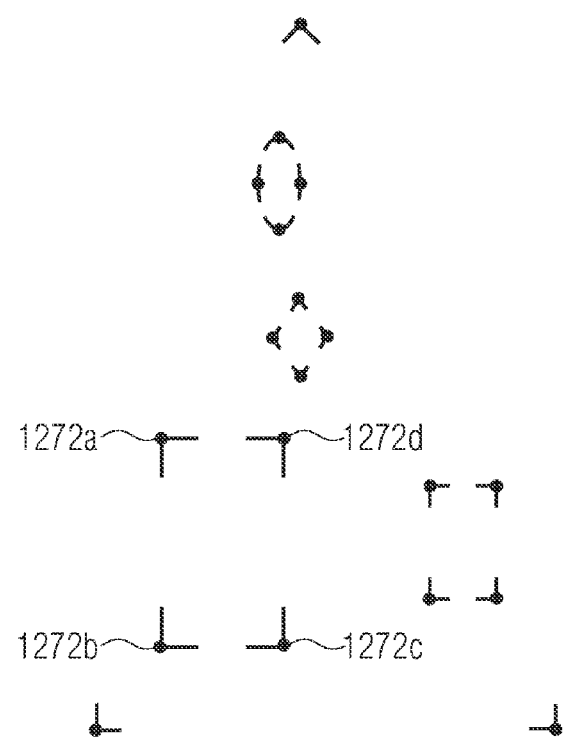
FIG. 13c shows a graphical illustration of inflexion points and extreme points extracted from a edge image.

A corresponding image of extreme points and/or break points is shown in FIG. 13C, for example. For example, in the graphical illustration of FIG. 13C, extreme points and break points are characterized by black points, with the type of the extreme points and/or break points being characterized in the graphical illustration of FIG. 13C.

In a preferred embodiment of the present invention, the geometrical shapes to which the extreme points and/or break points belong are reconstructed on the basis of the detected extreme points and/or break points. Thus, for example, accompanying geometrical shapes can be identified by way of the extreme points and/or break points with the aid of a fitting method. For example, it can be detected that four break points 1272a, 1272b, 1272c, 1272d define a rectangle. Correspondingly, location coordinates of the corresponding rectangle can be determined from the location of the break points 1272a, 1272b, 1272c, 1272d, so that a quadratic error is minimized, for example. In other words, what can be identified is a rectangle best fitted to the four break points 1272a, 1272b, 1272c, 1272d. In similar fashion, also location parameters and/or shape parameters and/or size parameters of ellipses to which the above-described extreme points belong can be determined.

In summary, it can thus be stated that, according to an embodiment of the present invention, geometrical objects (e.g. circles, ellipses, squares, rectangles, triangles, trapezoids or parallelograms) bounding matching regions in the camera image are identified in the camera image.
The geometrical objects identified then are used as rims of the monochrome areas in the preprocessed camera image.

In other words, by way of the detected extreme points or break points, for example, line-shaped portions, such as vertical lines, horizontal lines, convex circular arc sections or concave circular arc sections are determined, which can be employed as part of the rims of the monochrome areas in the preprocessed camera image.

Besides, it is to be pointed out that the geometrical objects (e.g. circles, ellipses, squares, rectangles, triangles, trapezoids or parallelograms) determined using break points and/or extreme points may be regarded as solid areas, so that the detected objects are added to the preprocessed camera image as monochromatically filled areas. The preprocessing may here be done both independently (i.e. by way of direct generation of the areas mentioned, due to the detected geometrical objects) and in connection with area detection (e.g. by the area detector 2244 according to FIG. 13).

Direct determination of monochromatically filled areas can be done by way of identification of break points or extreme points and by fitting the geometrical objects (or location parameters, shape parameters and/or size parameters thereof) to the identified break points or extreme points, as already described above. As an alternative thereto, the detection of the geometrical objects may only be used for edge detection (for example the edge detection by the edge detector 2240). In other words, the geometrical objects detected may only be interpreted as contours and/or edges in the case mentioned. Determination of the actual color areas by the patch generator 2270 may then be done by way of combination of the information 2248 of the edge detector 2240 (i.e. the edges of the identified geometrical objects) with the information 2252 of the area detector 2244 (i.e. the information on detected areas). Here, the optional consistency checker 2260 may be employed, as this has already been described above.

Furthermore, it is preferred to employ information provided by a color corrector for the generation of the color areas in the preprocessed camera image 2214. The optional color corrector is designated with 2280 in the graphical illustration 2200 according to FIG. 13.

The color corrector 2280 advantageously is formed so as to correct colors in the camera image, so that the colors in the preprocessed camera image are substantially independent of an illumination situation as present during the capture of the camera image, for example. It is preferred for the chromaticities in the camera image to be processed (by the color corrector) so that the chromaticities in the preprocessed camera image correspond to chromaticities as would be perceived by a human, for example.

Details regarding human color perception are described in the article "How does the Cortex construct colors?" by Vincent Walsh (published in: Proceedings of the National Academy of Sciences of the United States of America, vol. 96, no. 24, pages 13594-13596, Nov. 23, 1999), for example.

In other words, chromaticities in the camera image are mapped to chromaticities in the preprocessed camera image in accordance with a mapping rule. For example, various colors in the camera image that would be perceived as the same by a human are mapped to the same color in the preprocessed camera image.

Alternatively or additionally, color correction using Plank's radiation law takes place in the color corrector 2280. To this end, for example, it is determined what color temperature an illumination has. In other words, it can be extracted, from the camera image, at which color temperature of the illumination this was captured. For example, if it is known that a certain area represented in the camera image has a certain color (e.g. white), it may thus be determined which color temperature the present illumination has. Based on the color temperature of the illumination, the camera image may then be converted and/or calibrated or converted to the default color temperature. After all, if a color temperature of the illumination is known, a spectral distribution of the incident light is known. Furthermore, a spectral distribution is known at the default color target temperature. By way of quotient formation, it can be determined how strongly the various color proportions in the camera image may be altered so that the camera image appears as if captured at the predetermined target color temperature and/or unit color temperature.

In other words, when an actual color temperature at which the camera image was captured and the target color temperature are known, the camera image is converted as if captured at the target color temperature.

Thus, corrected color information, which is passed on to the patch generator 2270, on the camera image 2212 is available. The patch generator 2270 therefore is formed to receive the corrected color information from the color corrector 2280, and to color the color areas in the preprocessed camera image on the basis of the corrected color information, with a single color only being assigned to each individual color area, of course.

In the following, it will be described how moving elements may optionally be suppressed in the preprocessing means 2210. To this end, the preprocessing means 2210 includes an optional motion detector 2290. The motion detector 2290 is formed to receive the camera image 2212 and to detect moving objects in the camera image. The motion detector 2290 therefore is formed to provide optional information 2292 on moving objects in the camera image to the patch generator 2270.

In an alternative embodiment, the motion detector 2290 may also be connected upstream with respect to the edge detector 2240 and/or the area detector 2244. This means that the motion detector 2290 receives the camera image 2212, in the alternative case mentioned, and creates a motion-adjusted camera image based thereon, which it provides to the edge detector 2240 and the area detector 2244, for example. In this case, the edge detector 2240 and the area detector 2244 thus no longer receive the original camera image, but a motion-compensated or motion-adjusted camera image.

In the following, the functioning of the optional motion detector will be described. It is pointed out that the motion detector may detect substantially two types of motions in the camera image 2212 alternatively or together.

For better understanding, various scenarios in which the camera image 2212 may be captured will be explained briefly here. In a first scenario, it is assumed that the camera capturing the camera image 2212 is (at least approximately) stationary. For illustration, it is assumed here that the camera image for example represents urban or rural scenery, for example depicting roads, houses, trees as well as cars and pedestrians. Here, it can be assumed that the streets and houses lead to a stationary, invariant image, since they do not move with respect to the camera in the first scenario. On the other hand, for example, pedestrians and cars move through the camera image 2212. Furthermore, for example, the foliage of the trees may be stirred by wind, so that a moving image impression also develops here.

Besides, a second scenario can be assumed, wherein the camera image is captured by a camera from out of a vehicle, for example. In this case, all objects not moving at the same velocity (according to magnitude and direction) as the vehicle are moving relative to the camera. The further away an object is from the camera, the less the perceivable motion is in the camera image. In other words, even in the case of capture from out of a moving vehicle, objects relatively far away seem (at least approximately) stationary, whereas objects closer to the vehicle move more quickly through the camera image. On the other hand, objects moving at the same velocity as the vehicle (e.g. vehicles driving ahead) do not or hardly move in the camera image.

In this respect, it is to be pointed out that what is of importance for position determination substantially are the spatially immobile features (i.e. for example buildings and streets, as well as natural fixed objects, such as trees or mountains). Movable objects, however, are of subordinate importance for the position determination or even disturbing (e.g. other vehicles or persons).

Hence, it is the object of the motion detector 2290 to remove, from the camera image, such objects having relative movement with respect to a fixed reference point in the camera image.

To this end, the motion detector according to an embodiment of the present invention is formed to identify a spatially fixed reference point in the camera image, and further to identify moving objects moving relative to the fixed reference point in the camera image 2212. Furthermore, the motion detector 2290 is formed to mark the moving objects and to provide information indicating that the moving objects are to be removed from the preprocessed camera image 2214 to the patch generator 2270, or to directly generate a motion-adjusted camera image in which the moving (relative to the fixed reference point) objects are removed on the basis of the camera image 2212.

To this end, the motion detector 2290 may, for example, be formed to determine whether the moving object in the camera image moves relative to a fixed reference point in the camera image, based on a size of the moving object and/or based on a velocity of the image of the moving object in the camera image. If relative movement of the moving object with respect to a fixed reference point is determined, the moving object is marked for removal from the preprocessed camera image or removed directly.

Besides, it is to be pointed out that movement of a moving object may not only be detected through movement of a center of the moving object, but also through a temporal change of the size of the moving object, for example. For example, if another vehicle approaches a vehicle from the front, the image of the approaching vehicle in the camera image 2212 increases over time, whereas a position of the image of the approaching vehicle (for example, as defined by a center of the image) changes only insignificantly. Nevertheless, movement for example is obvious through movement of the edges limiting the moving object.

Besides, it is to be pointed out that, for example, the fact that an object (e.g. a vehicle traveling in front) moves at the same speed as the camera may be reflected in the fact that the object is represented (e.g. approximately) in unchanged and/or temporally constant manner in the camera image. For example, if the motion detector 2290 receives information on how quickly the camera capturing the camera image is moving, the motion detector 2290 may, for example, determine that an object the representation of which in the camera image does not or only slightly (less than a default upper threshold) change over time is moving with the camera. In this case, the motion detector 2290 may be formed to remove, from the camera image, objects the image of which (or the edges of which) is (are) temporally unchanged in the camera image 2212 or mark the same for removal from the preprocessed camera image.

It is to be pointed out that the motion detector 2290 may receive information on how quickly the camera capturing the camera image 2212 is moving in many ways. For example, the motion detector 2290 may obtain information on relative movement of a vehicle (relative to a road), when the camera is mounted in or on a vehicle, for example.

Generally speaking, it is to be noted that the motion detector 2290 may obtain information on how quickly the camera capturing the camera image 2212 is moving relative to a geostationary coordinate system (i.e. a coordinate system fixedly coupled with the Earth) from any position determination system (for example from a GPS position determination system).

As an alternative thereto, the motion detector 2290 may also identify, in the camera image 2212, a reference object known to represent a fixed reference object. From a movement of the image of the reference object in the camera image 2212, the motion detector 2290 may then determine a movement of the camera capturing the camera image 2212.

Alternatively or additionally, the motion detector 2290 may, for example, also determine how quickly and/or in which direction the camera capturing the camera image 2212 is moving, from an image of a road.

In summary, it may generally be stated that the motion detector 2290 according to an embodiment of the present invention is formed to remove such objects moving with respect to a fixed (typically geostationary) reference point from the preprocessed camera image 2214 (or provide corresponding signals, which effect removal, to the patch generator 2270).

In a further embodiment of the present invention, the motion detector 2290 additionally or alternatively is formed to remove objects moving particularly quickly in the camera image 2212 (i.e. quicker than at a given maximum speed) from the preprocessed camera image 2214. Such objects may, for example, be objects located particularly closely to the camera. The corresponding objects, which have (for example, with respect to the camera image) particularly fast movement (faster than a given maximum speed), typically cannot be employed for reliable position determination, since they cannot be captured sharply in many cases, for example. As one example, an object (e.g. a building or a tree) located in direct proximity to a road is to be mentioned here. The closer an object comes to a moving camera, the quicker an image of the object moves through the camera image. The object can no longer be detected sharply, once it has come too close to the camera.

Hence, according to an embodiment of the present invention, the motion detector 2290 is formed to detect, in the camera image 2212, objects moving more quickly than at a given maximum speed (through the camera image). The motion detector 2290 further is formed to mark these objects for removal from the camera image, so that altogether a preprocessed camera image 2214 develops, from which objects moving more quickly than at a given maximum speed in the camera image 2212 are removed.

Here, it is to be pointed out that what is meant by the speed of the movement in the camera image, for example, is a speed in image points per camera image at which an object moves in the camera image. For example, it can be defined that objects moving more quickly than one image point per camera image are removed from the preprocessed camera image 2214, since the position information thereof is inexact. However, one may also choose another threshold value and/or limit value for a rate of travel.

Furthermore, it is to be pointed out that removal of an object from the preprocessed camera image 2214 may include replacing the removed object by a monochrome region. The color of the monochrome region may, for example, be either default (so that all objects moving more quickly than at the default maximum speed in the camera image 2212 are replaced by an area or by several areas having default color), or the color of the area by which the quickly moving object is replaced may be chosen dynamically. For example, if a region in which objects are moving quickly (more quickly than the default maximum speed) in the camera image 2212, for example, a mean color of the region mentioned can be determined, and the region mentioned may be replaced by a monochrome area of the mean color.

In the following, it will still be described how the model image is generated. In this respect, it is to be noted in advance that the model image can be generated either within the inventive apparatus or also externally to the inventive apparatus. It is to be pointed out here that the inventive apparatus thus may optionally include a model image generating device 2130, which is formed to generate the model image 2124, 2224.

It is to be pointed out here that the present invention, however, also includes a separate model image generating device, which is formed to be employed in a position determination system.

Independently of the fact whether the model image generator is part of an inventive apparatus or not, the model image generator is advantageously formed to include a three-dimensional model of an environment. In other words, the model image generator includes a database or another description of the environment, for example. The description may, for example, be present in form of a descriptive language for three-dimensional models, for example describing a location of various geometrical objects. The three-dimensional model may, however, also describe the environment in form of a grid, wherein the grid characterizes a surface. The three-dimensional model may, for example, describe an environment and/or landscape describing roads, buildings and maybe (optionally) also vegetation. Furthermore, the three-dimensional description may also describe natural surface forms, such as hills or mountains. Additionally, the three-dimensional description of the three-dimensional model may optionally describe any man-made alteration of the environment, for example n way signs, house numbers, lamp posts, phone booths, and the like.

It is preferred for the three-dimensional model to be chosen so as to be suited for generating a two-dimensional view of the environment as seen from a selectable viewpoint. In other words, the three-dimensional model is designed to describe the environment in electronic form so that various views of the three-dimensional environment can be generated from various viewpoints.

The three-dimensional model advantageously is chosen so that surfaces of geometrical objects (for example of areas, cuboids, rectangular parallelepipeds, circles, ellipses, cylinders) are described by monochrome areas. In other words, the model is designed so as to describe the environment by way of a plurality of monochrome surfaces. Thereby, the complexity of the model, as well as the effort in computing a view (also referred to as model image) on the basis of the model, is comparably low.

Hence, it is to be stated that the three-dimensional model describes the environment at a (medium) resolution, which would be sufficient for the human observer to identify a certain environment. However, due to the selection of the three-dimensional model, colors of surfaces or textures of surfaces, as described by the model, do not necessarily match with real colors or textures. Yet, the model is compact and thus excellently suitable for automated processing.

Figure 14:
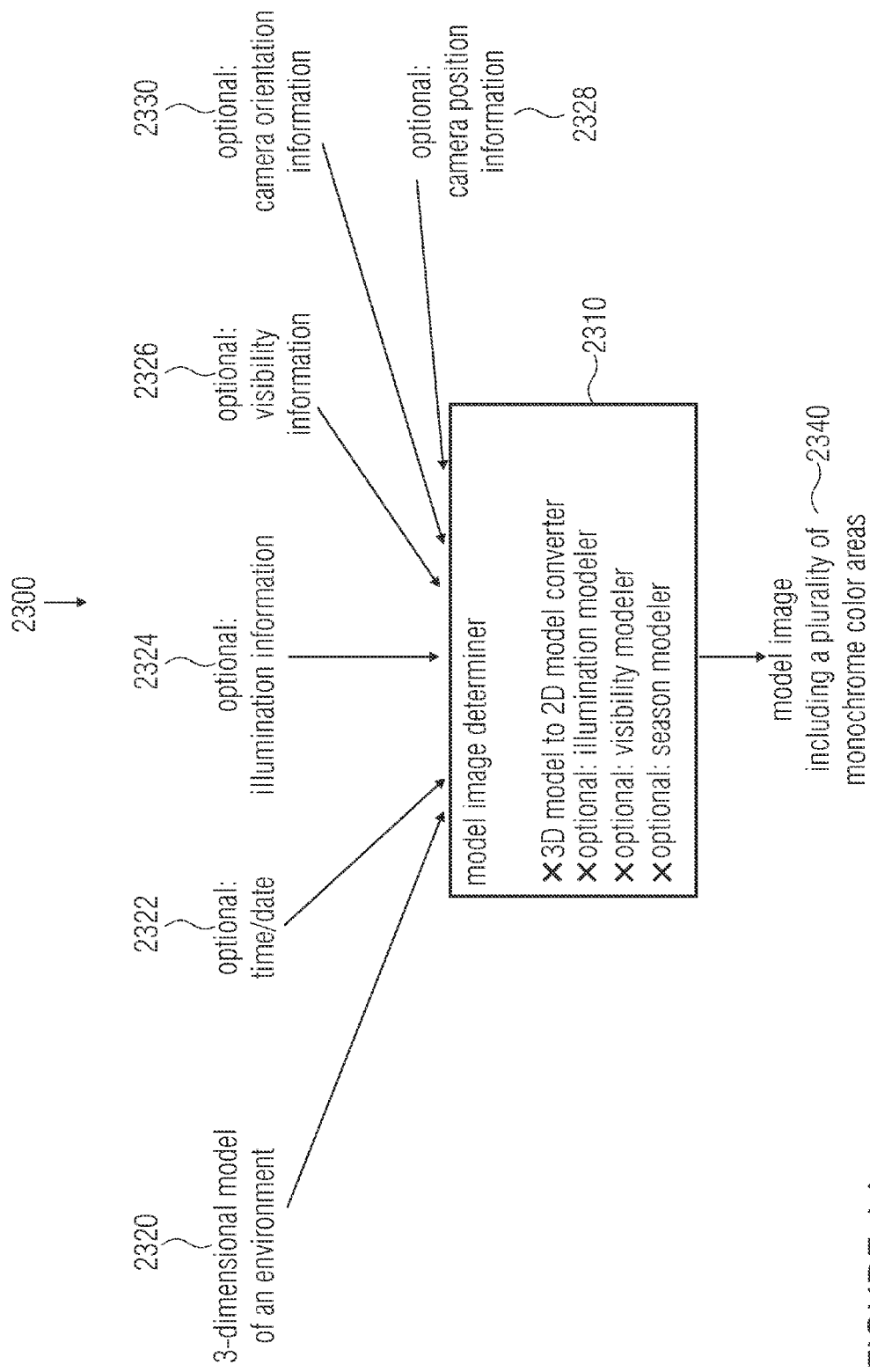
FIG. 14 shows a schematical illustration of an inventive model image determination means according to an embodiment of the present invention.

FIG. 14 shows a schematic illustration of input quantities and output quantities of a model image determiner according to the invention. The graphical illustration of FIG. 14 is designated with 2300 in its entirety. The model image determiner is designated with 2310. The model image determiner 2310 typically is formed to receive a three-dimensional model 2320, as described previously. Furthermore, the model image determiner 2310 is formed to optionally receive information 2322 on a date and/or time. Furthermore, the model image determiner 2310 is formed to optionally receive information 2324 on an illumination situation. The model image determiner 2310 further is formed to optionally receive information 2326 on current visibility. Furthermore, the model image determiner 2310 is formed to optionally receive camera position information 2328, which describes a position of the camera capturing the camera image (at least roughly or approximately). Furthermore, the model image determiner 2310 is formed to optionally receive camera orientation information 2330.

The model image determiner 2310 is also formed to generate a model image 2340, which describes the environment described by the three-dimensional model 2320 in form of a plurality of monochrome color areas.

Typically, the model image is a two-dimensional, planar representation of the environment, based on a three-dimensional model 2320.

The model image determiner 2310 typically includes a three-dimensional model to two-dimensional model image converter formed to receive the three-dimensional model 2320 and generate the two-dimensional model image 2340 on the basis thereof. The three-dimensional model to two-dimensional model image converter according to a preferred embodiment here is formed to take the optional information 2322, 2324, 2326, 2328, 2330 into account when generating the model image 2340. To this end, the model image determiner 2310 optionally includes an illumination modeler, which adjusts the illumination as described by the information 2324 on the current illumination situation when generating the model image 2340 from the three-dimensional model 2320. The illumination modeler may further take the optionally available information 2322 on date and/or time into account, in order to determine the position of the sun, for example, and in order to take the information on the position of the sun into account when computing the model image 2340. In other words, the illumination modeler in the model image determiner 2310 may be formed to take both a position of the sun and a current illumination situation into account (for example comprising information on a brightness of the illumination, information as to whether diffuse illumination or illumination by a point source is present or dominant, as well as further illumination-specific information). Hence, in summary, it is to be stated that the illumination modeler may, for example, be formed to distinguish between a state of direct insolation (for example in the case of clear sky) and a state of diffuse illumination (for example in the case of overcast sky). The distinction may here, for example, be made on the basis of the information of an illumination sensor, which determines light intensity, or on the basis of the camera image from the camera. Furthermore, the illumination modeler may determine the position of the sun as a function of the time of day and/or season or take the same into account when computing the illumination of the model image 2340. This is particularly important and/or advantageous if parts of the environment are in the shade of a large building (for example, a city surrounding), for example. In this case, a surface of a building that is partially shaded no longer appears as a uniform area, but is divided into a first area lying within the shade and appearing comparably dark and a second area lying outside the shade and appearing comparably bright. In this case, the model image generator for example describes the area lying in the shape by way of a monochrome, comparably dark color area and the area lying outside the shade by way of a comparably bright, monochrome area. Thus, it is altogether guaranteed that the model image is adapted to the actual perception of the environment. In other words, the model image 2340 is generated so that it substantially matches the camera image captured by the camera regarding a light and shadow environment. Thereby, it is ensured that image comparison for position determination is done in particularly reliable manner, using both the camera image and the model image 2340.

In a preferred embodiment, the model image determiner 2310 further includes a visibility modeler. The visibility modeler typically is formed to receive the optional visibility information 2326, which for example indicates whether the current visibility is influenced by fog or by rain, for example. If this is the case, the visibility modeler adapts the model image 2340 correspondingly, for example by suppressing, in the model image, such elements no longer visible due to the visibility. The visibility information 2326 for example indicates that there is fog with a visibility range of about 100 meters, the model image determiner generates a model image only including such features of the environment lying within the visibility range (i.e. within about 100 meters, for example). Other features, i.e. features further away than the visibility range, however, are suppressed. Hence, the model image 2340 again is adapted to the camera image captured by the camera.

Detection as to what the visibility is like at the moment may, for example, be done by a corresponding sensor, for example determining the actual visibility on the basis of a light propagation distance. As an alternative thereto, also the camera image provided from the camera can be employed to detect which objects are visible. For example, if the rough position is known, a provisional model image describing the environment at ideal visibility can be generated. Then, it can be detected which of the objects contained in the model image are no longer visible in the camera image. Since the location of the no longer visible objects is known from the three-dimensional model 2320, information on the actual visibility can be acquired from the information as to which of the objects contained in the three-dimensional model are no longer visible in the actual camera image.

Besides, as an alternative thereto, the information on the visibility may also be received externally. Visibility sensors thus may be arranged in the environment, as this for example is the case along motorways or highways with changing traffic signs. The information of these visibility sensors may for example be transmitted wirelessly to the inventive apparatus 2100 and/or to the model image determiner 2310. Besides, also information from weather stations across the country can be received by the inventive apparatus 2300 and/or the model image determiner 2310, in order to provide the visibility information 2326 to the model image determiner 2310.

In a further preferred embodiment, the model image determiner 2310 further optionally includes a season modeler. The season modeler is formed to determine which season it is at the moment, for example based on the information 2322 on the time and/or the date (but advantageously solely due to the information on the date). The model image determiner 2310 may, for example, adjust the representation of the vegetation in the model image 2340 on the basis of the seasonal information. For example, this is particularly important when a user of the apparatus 2100 is in a municipal park and yet would like to determine the exact position. If the user is in the park during summertime, it can be assumed that deciduous trees in the park are strongly foliate, and hence the visual field is limited by the foliage of the trees. In this case, the trees represent a substantial navigation feature. Although exact appearance of the foliage typically cannot be predicted, the foliage of the trees can be approximated by way of a monochrome color area, for example. In other words, an area in the model image probably covered by leaves during the summer is assigned a monochrome greenish hue in the model image, wherein the exact hue may, for example, depend on the kind of tree present. Thus, the model image 2340 substantially matches the camera image captured by the camera and hence allows for a reliable navigation.

However, if the user of the apparatus 2100 is in the same municipal park or the same municipal green during winter, the deciduous trees present therein have lost their leaves. Hence, for example, the user's view opens to the buildings surrounding the park, and the buildings surrounding the park represent a substantial feature for the position determination. In other words, the model image determiner 2310 will represent the trees only by their trunks (and maybe some branches) in this case, i.e. when determining that it is winter at the moment, but will additionally also represent the buildings or further features present behind the trees in the model image 2340. Hence, optimum match between the model image 2340 and the camera image captured by the camera is guaranteed also during winter, which again leads to optimum position determination.

Besides, it is to be pointed out that when using the same model image independently of the season, substantial impairment of the reliability of the position determination typically would occur either in summer or in winter. Hence, the inventive season-dependent adaptation of the model image 2340 used for position determination allows for significant improvement in reliability of the position determination.

Besides, it is to be pointed out that the model image determiner 2310 may optionally receive snow information in addition. In this case, the season modeler may, for example, take presence of snow into account when generating the model image. Thus, it is easy to see that a landscape or environment changes strongly in its appearance when it is covered in snow. The information on the snow may, for example, be derived from the camera image. If it is determined that a large part of the camera image appears white or approximately white, for example, it can be inferred therefrom that snow is present. For example, it can be detected that white or approximately white areas in the camera image amount to a proportion greater than a default threshold value. In this case, it can be inferred therefrom that snow is present, and corresponding information can be passed on to the model image determiner 2310. The model image determiner 2310 may thus generate a model image 2340 in which the snow is taken into account. To this end, the model image determiner 2310 may, for example, determine which areas in the three-dimensional model 2320 are horizontal or approximately horizontal areas, for example. The model image determiner in this case may assign a color approximately corresponding to the white hue of snow to the corresponding horizontal areas. As an alternative thereto, the three-dimensional model 2320 may include information indicating which areas in the three-dimensional model 2320 are to be represented as covered in snow in the case of snow. For example, by way of the corresponding information, it can be ensured that streets cleared of snow are not represented as covered in snow in the model 2340 when snow is present, while areas (e.g. meadows) not cleared of snow are represented as covered in snow, and hence as approximately white areas.

In summary, it may thus be stated that the model image determiner 2310 advantageously is formed to represent the model image 2340 in a manner adapted to illumination conditions, visibility conditions, seasonal conditions and/or meteorological conditions. To this end, the model image determiner 2310 receives information on the corresponding illumination conditions, visibility conditions, seasonal conditions or meteorological conditions, and generates the model image 2340 correspondingly on the basis of the three-dimensional model 2320. The three-dimensional model 2320 here optionally may include additional information describing a change in the model image 2340 depending on the seasonal conditions or meteorological conditions for representing seasonal changes (for example of the vegetation) or meteorologically-induced changes (for example snow), optionally. In other words, the three-dimensional model 2320 for example includes several parameters enabling adaptation to seasonal changes or weather-induced changes.

Furthermore, it is pointed to the fact that the model image determiner 2310, in a preferred embodiment, is formed to obtain the camera position information 2328 and/or the camera orientation information 2330 and take the same into account when generating the model image. The camera position information 2328 may, for example, represent rough information including information on the position of the camera capturing the camera image. The camera position information may, for example, have been obtained by a system other than the inventive navigation system. For example, the camera position information may have been determined due to a satellite-aided position determination system (e.g. GPS). Alternatively, the camera position information 2328 may also have been obtained on the basis of a known starting point by taking movement of the camera into account. In other words, if a position at which the camera was located once has been known, a current position of the camera may have been determined at least approximately by detecting the movement of the camera, and this approximate information or rough information on the position of the camera may serve as the camera position information 2328.

The camera orientation information 2330 may, for example, describe a direction of sight of the camera, and may further alternatively or additionally carry information as to which image portion the camera is able to capture (for example, due to a setting of the camera objective). In other words, the camera orientation information 2330 may, for example, describe the direction of an optical axis of the camera, and may further carry information as to whether the camera captures an angularly (e.g. with respect to a solid angle) large portion of the environment, for example using a wide-angle lens, or captures an angularly (or in terms of solid angle) small portion of the environment, for example using a telephoto lens.

The model image determiner 2310 in this case is advantageously formed to generate the model image 2340, on the basis of the three-dimensional model 2320, so as would be visible as viewed from the location at which the camera is (as described by the camera position information 2328). Here, the model image determiner 2310 advantageously (but not necessarily) is formed to take the direction of sight of the camera (by way of the camera orientation information 2330) as well as the information on the solid angle captured by the camera (also described by the camera orientation information 2330) into account and hence generate the model image 2340 so that it describes the region actually captured by the camera. Hence, again an optimum adaptation of the model image 2340 to the camera image captured by the camera is obtained.

In the following, it will be described how the position can be determined via the camera capturing the camera image, on the basis of the camera image captured by the camera as well as further on the basis of the model image. In this respect, at first a method for rough position determination as well as for extraction of features will be described. For example, a single feature, advantageously also a feature vector, is extracted from a model image generated (for example, from the model image 2340). The feature vector describes a plurality of features of the model image. For example, the feature vector may include a horizontal histogram or a vertical histogram, as will be described in the following. Alternatively or additionally, the feature vector may include information on characteristic areas in the model image. The feature vector may, for example, indicate how many areas of a certain color are included in the model image. As an alternative thereto, the feature vector may, for example, indicate how large an area proportion of the certain color is in the model image. The feature vector may further describe characteristic areas, for example, regarding their shapes, sizes or locations. For example, the feature vector may describe the size of the area included in the model image with respect to its area expansion and/or with respect to its position. The feature vector may further describe color features of the model image, for example, and may indicate which color is dominant in the model image, for example. In other words, the feature vector may include information on proportions of various colors, which are sorted according to an area proportion, for example. The feature vector may further include information on vanishing points in the model image. Vanishing points may, for example, be defined as intersection points of two or more lines representing an extension of edges of a rectangular or cuboid object in the model image. In this respect, it is pointed out that, when viewed perspectively, the extensions of parallel edges intersect at a point also referred to as a vanishing point. For example, if the location of two vanishing points is known, a location of a rectangular body in relation to an observer can be inferred therefrom, for example. The feature vector in the model image may further include distance features, for example, which indicate how far certain objects are away from each other or from the position of the viewer. Furthermore, the feature vector may optionally include information describing an angular location of one or more objects (for example with respect to each other or with respect to a position of a viewer).

According to the invention, a feature or feature vector also is extracted from the preprocessed camera image. Thus, at least one feature of the preprocessed camera image, but advantageously a feature vector, is obtained. In one embodiment of the present invention, it is preferred for the feature vector created for the preprocessed camera image to describe the same features as the feature vector created for the model image. However, it also is perfectly well possible for the feature vector of the model image to include a (for example real) subset of the features of the feature vectors for the preprocessed camera image, or vice versa. Generally speaking, it is sufficient for the feature vector for the model image to have at least one feature, but advantageously a plurality of features, in common with the feature vector for the preprocessed camera image.

The features included in common in the feature vector for the model image and the feature vector for the preprocessed camera image then are compared in a feature comparator. The feature comparator may, for example, be formed to determine qualitative or quantitative matching of features. For example, the feature comparator may be formed to detect the occurrence of the same characteristic areas in the model image and the preprocessed camera image. A characteristic may here, for example, be characterized by its property of representing a certain surrounding object (e.g. sky, forest, meadow, field, street, side rail or sign). For example, the feature comparator may determine that, both in the model image and in the preprocessed camera image, there are shown a portion of a street each and a sign each. Alternatively or additionally, the feature comparator may compare quantitative features. If the feature comparator for example has detected qualitatively matching features in the model image and in the preprocessed camera image, the feature comparator may perform a quantitative comparison of properties of the features. For example, if the feature comparator has detected that a sign is depicted in both the model image and the preprocessed camera image, the feature comparator may, for example, compare positions of the two signs in the model image and in the preprocessed camera image. In a further embodiment of the present invention, the feature comparator may, however, also compare text included on the signs, as far as the feature comparator includes a corresponding text feature.

Besides, the feature comparator may, for example, also compare further features in the feature vector of the model image and in the feature vector of the preprocessed camera image with each other (for example, a proportion of a certain color).

If the feature vector (for example, taking a default tolerance range into account) detects a match of the feature vector belonging to the model image and the feature vector belonging to the preprocessed camera image, greater than a default minimum match, the feature comparator can determine that the position for which the camera image was captured matches with the position described by the model image. In other words, the feature comparator may output the position from which the model image was captured as the positional information.

In a further preferred embodiment, there is a database consisting of a plurality of feature vectors belonging to various model images. The various model images here describe the environment as viewed from a plurality of various positions. In other words, a position of a viewer is associated with each of the model images from the plurality of model images, wherein the positions are different from each other. Hence, the feature comparator is formed to determine, based on a feature vector of a preprocessed camera image, to the feature vector of which model image the feature vector of the preprocessed camera image has maximum similarity. To this end, for example, a distance measure between two feature vectors can be defined (for example, in terms of a mathematical norm). If it is determined that the feature vector of the preprocessed camera image has maximum similarity (or minimum distance regarding the mathematical distance measure) to a certain feature vector from the plurality of feature vectors, the positional information belonging to the certain feature vector is output as a result by the feature comparator.

Altogether, it is to be stated that a position can be determined on the basis of the comparison between a feature vector of a preprocessed camera image and one or more feature vectors of one or more model images.

Figure 15:
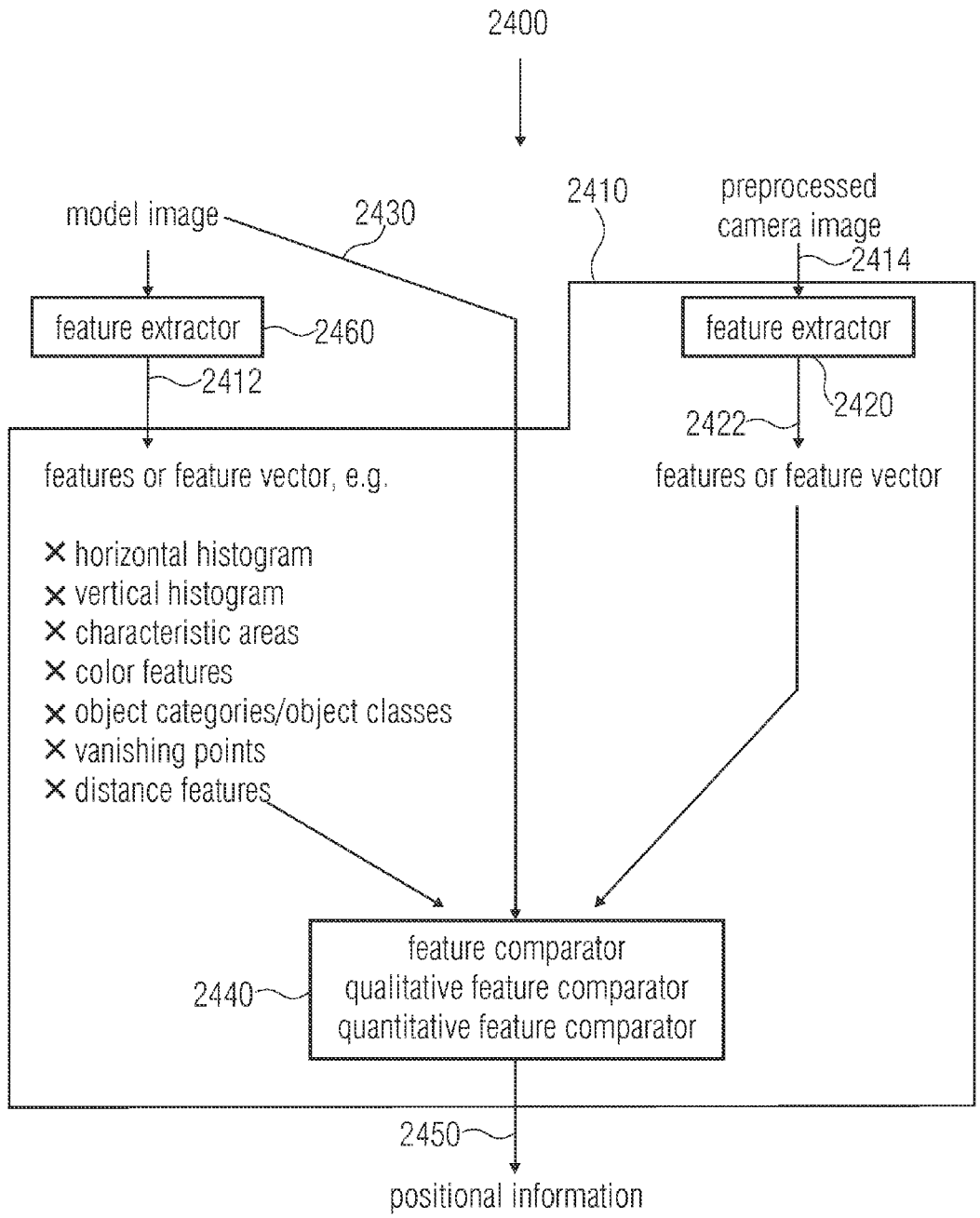
FIG. 15 shows a block diagram of an inventive image comparison means according to an embodiment of the present invention.

FIG. 15 shows a block circuit diagram of an inventive position determination means according to an embodiment of the present invention. The block circuit diagram of FIG. 15 is designated with 2400 in its entirety. The block circuit diagram 2400 shows a position determination means 2410. The position determination means 2410 receives one or more feature vectors 2412 of one or more model images. The position determination means 2410 further receives a preprocessed camera image 2414, for example, corresponding to the preprocessed camera image 2114 according to FIG. 12 or the preprocessed camera image 2214 according to FIG. 13.

The position determination means 2410 includes a feature extractor 2420, which is formed to generate one feature, several features or a feature vector from the preprocessed camera image 2414. The features or the feature vector may, for example, include one or more of the following features: horizontal histogram, vertical histogram, information on characteristic areas, information on color features, information on object categories or object classes, information on vanishing points, information on distance features. The features or feature vectors 2412 advantageously include the same features as the features or feature vectors 2422 provided by the feature extractor 2420. The position determiner 2410 further is formed to receive positional information 2430 associated with the model image or the model images on which the features or feature vectors 2412 are based. The feature determiner 2410 further includes a feature comparator 2440 receiving the features or feature vectors 2412 belonging to the model images, as well as the features or feature vector 2422 belonging to the preprocessed camera image 2414.

The feature comparator 2440 thus is formed to compare the feature or the feature vector 2422 with the feature or the feature vectors 2412, and to determine, from the feature vectors 2412, a certain feature vector of maximum match with the feature vector 2422. The feature comparator 2440 further is formed to provide the positional information 2430 belonging to the certain feature vector 2412 as a position determination result 2450.

Thus, it is to be stated that the feature comparator 2440 altogether identifies a certain model image of maximum match with the preprocessed camera image 2414 according to the feature vector associated therewith. Since positional information advantageously is associated with each model image, the feature comparator 2440 then outputs the positional information associated with the certain model as the result 2450. Hence, the result 2450 describes the position for which the camera image on which the preprocessed camera image 2414 is based was captured.

It is to be pointed out that, in an alternative embodiment, the position determiner 2410 includes a feature extractor 2460, which is formed to receive a model image 2462 and to generate an accompanying feature vector 2412 on the basis of the model image 2462, as already defined above.

Besides, it is to be pointed out that also other methods of position determination may be used. Thus, for example, a horizontal histogram and/or a vertical histogram can be created both for the preprocessed camera image 2414 and for the model image 2462. A histogram (no matter whether horizontal histogram or vertical histogram) may, for example, describe a color distribution or brightness distribution in individual image lines or image columns of the preprocessed camera image. For example, if a characteristic horizontal or vertical (for example) bright line located on a (for example) dark background occurs in the preprocessed camera image, a maximum occurs at the corresponding horizontal or vertical position of the line in the brightness histogram. However, if several horizontal lines occur, there are several characteristic maxima in the corresponding histogram.

For exact position determination, for example, a histogram belonging to the preprocessed camera image 2414 may be compared with a histogram belonging to the model image 2462. It may be checked here, for example, whether the two histograms described match or the two histograms described can be made to match by way of a shift. This may, for example, be determined by way of cross-correlation between the histograms. For example, if it is determined that two histograms, which belong to the preprocessed camera image 2414 and the model image 2462, respectively, are substantially matching, but shifted by a certain amount with respect to each other, it may, for example, be determined that the position from which the camera image was captured deviates by a certain amount from the position from which the model image was generated. Thus, the position determination means 2430 may, for example, output a corrected position as the result 2450, by correcting the positional information 2430 belonging to the model image (on the basis of the detected shift between the histograms).

Figure 16:
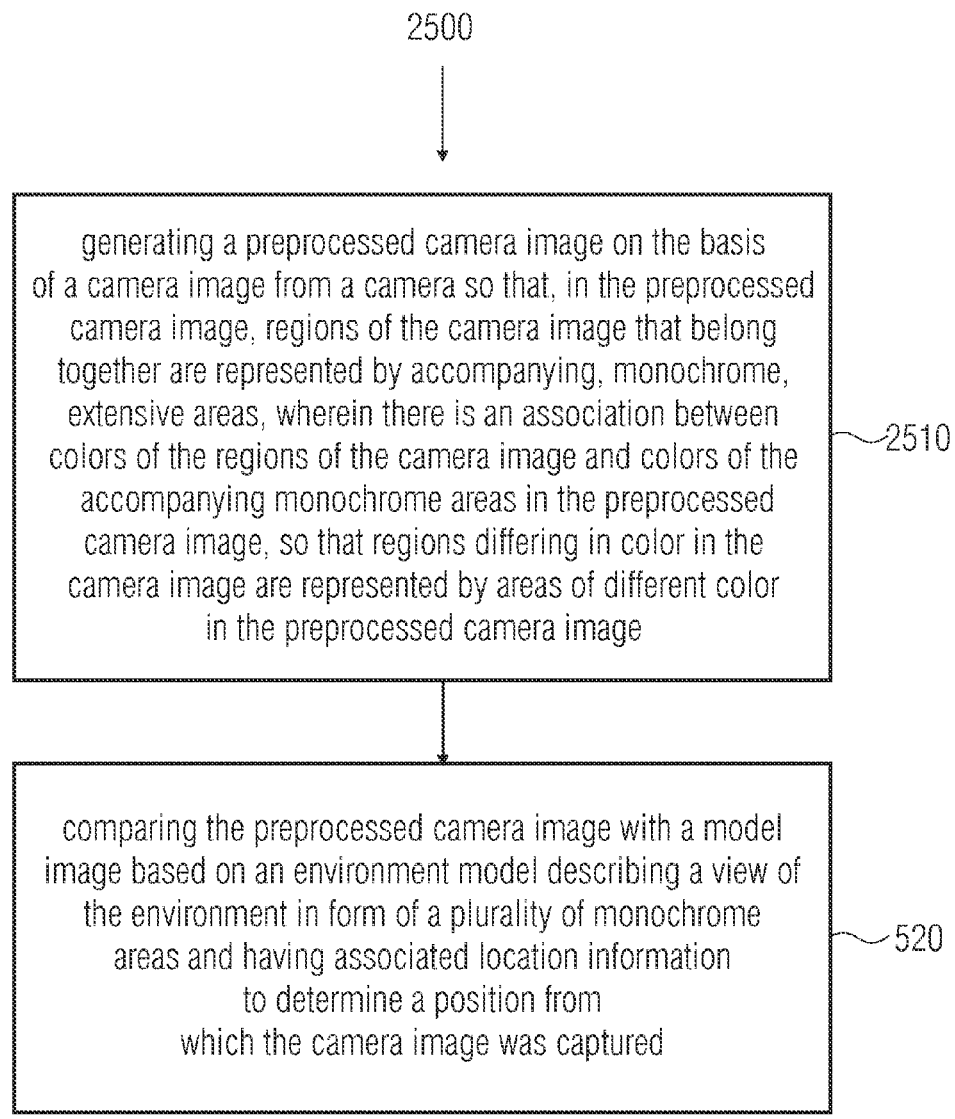
FIG. 16 shows a flowchart of an inventive method according to an embodiment of the present invention.

What will be described in the following is an inventive method of determining a position. To this end, FIG. 16 shows a flowchart of an inventive method of position determination. The method according to FIG. 16 is designated with 2500 in its entirety. The method 2500 includes, in a first step 2510, generating a preprocessed camera image on the basis of a camera image from a camera, so that matching regions of the camera image are represented by matching monochrome, extensive areas in the preprocessed camera image. There is an association here between colors of the regions of the camera image and colors of the accompanying monochrome areas in the preprocessed camera image, so that regions differing in color in the camera image are represented by areas of different color in the preprocessed camera image.

The method 2500 further includes, in a second step 2520, comparing the preprocessed camera image to a model image, which is based on an environment model. The environment model describes a view of an environment in form of a plurality of areas and comprises associated location information. On the basis of the comparison, a position from which the camera image was captured is determined.

It is to be pointed out that the method 2500 according to FIG. 16 may be supplemented by all those steps having been described regarding the inventive apparatuses.

Furthermore, it is to be pointed out that individual aspects, as have been described above, may be combined in any way. For example, it is not absolutely mandatory to generate a preprocessed camera image on the basis of a camera image.

After all, it is also possible to use the camera images without further preprocessing (or only with conventional preprocessing) for position determination, provided that the model image is adapted to the camera image captured by the camera (for example, taking conditions of the environment into account, such as illumination, visibility, seasonal or meteorological conditions). In this case, the (correspondingly processed or adapted) model image can be compared directly to the camera image from the camera (for example using features, feature vectors or other image detection methods), without preprocessing of the camera image having to take place.

In the following, the present invention will again be summarized briefly.

It is to be pointed out that the present invention, according to an embodiment, includes a method and a means for video-aided navigation. Advantageously, but not necessarily, the present invention deals with video road navigation. According to a preferred embodiment of the present invention, a vehicle is equipped with a video camera. The video captures are compared with stored captures by way of video analysis, and the current location is determined therefrom. For example, road intersections, signs, houses, street courses or scenery images at branched points serve as excellent reference images. The data store may include e.g. Google 3D views. In an alternative embodiment, for example, the driver automatically supplies new scenes. In other words, the data store is supplemented automatically, when new images are captured by the video camera. Identification algorithms (enabling the determination of the position determination on the basis of the video captures) for example are such identification algorithms as are employed in video sequence identification in feature film scenes or in image similarity analysis. An advantage of the method described is that no GPS signal (and/or no additional positional information) is needed.

According to an embodiment of the present invention, when using suitable comparison methods, it is conceivable that the video reference keys are present in compressed form. With this, entire regions (e.g. Baden-Württemberg) can be held out as a photo library in a store.

In the following, details regarding the video-aided navigation according to an embodiment of the present invention will be explained in greater detail. In this respect, it is to be pointed out that the various features of the system may also be employed by themselves. In other words, the present invention is not limited to realizing a complete system, as will be described in the following, but also includes the individual aspects as taken by themselves.

According to an embodiment of the present invention, the surroundings are captured with a video camera from out of a traveling vehicle. Space-time features, which are filed as feature vectors, are extracted from the image stack (generated by the video camera). The feature vectors are compared with stored feature vector sequences by way of content retrieval methods. A maximum of a match indicates a momentary position of a vehicle, and/or allows for drawing conclusions regarding the position of a vehicle.

So as to generate constant, invariant feature vectors, retinotopic image preprocessing is employed and/or performed upstream. An input image (for example provided from the video camera) is decomposed into three image spaces "OnMove", "OnSluggish" and "OnEdge" by way of retina preprocessing. OnMove is a retina operator with which movements can be determined. OnSluggish is a retina operator filling segments within edges. OnEdge is a retina operator detecting edges.

The three spaces (or image spaces) (optionally) are checked for consistency and/or cross-checked (common boundary, contiguous areas), and patches and/or areas are generated therefrom. A developing image (e.g. a preprocessed camera image) thus consists of segmented patches and/or areas.

This is followed by neuro-physiologically founded further processing so as to work out structuring elements:

In a color constancy map (optional), the chromaticities are processed, according to a method by Zeki and Roska, as perceived by humans, so that sky is blue, grass green and a rape field yellow, under natural illumination conditions. Fields contiguous in color are marked (e.g. sky, forest, meadow, field, street, side rails, color of house, signs). Regarding the procedure mentioned, for example, reference is to be made to the article "How does the Cortex Construct Color?" by Vincent Walsh, as well as to the publication "Receptive Field Atlas of the Retinotopic Visual Pathway and some other Sensory Organs using Dynamic cellular Neural Network Models" by J. Hámori and T. Roska. Further information in this respect can be found in the dissertation "Farbkonstanz und Farbkontrast—Eine Untersuchung mit Hilfe der farbigen Schatten" by A. J. Kallmann (filed in the department of biology at the Johannes-Gutenberg University of Mainz), for example.

Furthermore, some details regarding color processing also are described in the publication "Praktische Probleme beim Robot-Fußball—die visuelle Wahrnehmung" by S. Tegtmeyer (published within the framework of the seminar "Agenten und Robot-Fußball" of the Institute of Computer Science at the University of Münster).

In a Hubel-Wiesel computation map, extreme points of convexly or concavely curved areas are determined from edge images. With this, linear portions are described (for example vertical lines, horizontal lines, convex or concave circular arc sections).

The extreme values (or extreme points) are referenced to each other by attempting to fit or adapt squares, rectangles, circles and/or ellipses with these supporting locations (i.e. with the supporting locations defined by the extreme points, for example), for example.

In the patch images, a two-dimensional fast Fourier transform (FFT) is performed to determine spatial frequencies of the vertical line segments, for example.

A digital value is assigned to the color areas. The color temperature is determined in accordance with Plank's radiation law, in order to calibrate to a unit color temperature.

The patches or areas consist of color-constant, sectionwise monochrome areas with fixed linear boundary.

The areas are filled by the OnSluggish operator, and the areas become (at least approximately) monochrome by way of the color constancy map.

The areas are given a fixed boundary by the OnEdge operator and the Hubel-Wiesel line segmenter.

Geometrical objects, such as circles, ellipses, squares or rectangles, are treated as a special object class and interpreted as traffic signs, tires, house fronts, or windows, for example.

The patches or areas are classified into horizontal patches and vertical patches. The horizontal patches are classified by way of vanishing point determination. Categories for outside of populated areas are road, forest, field, meadow, sky, water and others, for example. For separating sky, ground and water, the horizon is determined, for example.

In the following, it will be described how two-dimensional (2D) and/or three-dimensional (3D) modeling or 2D-3D modeling is performed. In one embodiment of the present invention, Google Earth 3D models, such as an already existing model of New York, serve as reference data. By way of photogrammetry, projective mappings, co-linearity equation and/or equalization, the 3D model is rotated to a direction of sight of the camera as a reference point, for example. Gray areas of the Google 3D house model are provided with original color painting, for example. For example with the aid of a gyroscope and/or a swivel device of the camera, a momentary position is determined and this image portion depicted, for example. Here, affine distortions are calculated back by searching for vanishing points and by calculating back to a 3D cube model.

In the following, it will be described how shadowing (also referred to as "shading") may take place. Shadows fall very strongly particularly in street canyons. By determination of orientation and/or time of day and/or date, the position of the sun can be determined. By way of a method of ray tracing (ray tracing method), in a preferred embodiment of the invention, the course of the shadow is computed. For example, shadow at a current time can be computed into the model, for example in the Google 3D model, for example. The shading is computed according to a retinex theory, for example.

In the following, it will be described how optional motion detection may take place. In this respect, it will at first be dealt with the fact of how intrinsic motion can be evaluated. The vehicle (in or on which the camera is mounted) is traveling linearly, accelerates or performs a turning motion, for example. Depending on velocity and radial distance, individual images are no longer resolved (c.f. e.g. ties on a neighboring track in a high-speed train), but objects further away are clearly visible. Detected blurred edges thus are separated from a constantly visible part. Velocity-dependent flow patterns, however, are not utilized for analysis (for example for comparing the camera image with the model image and/or for position determination).

Through the linear or accelerated intrinsic motion, objects draw nearer. This is compensated for by zooming in on a reference model. Through the intrinsic motion, objects fall out of the visual field. This is taken into account by simultaneously advancing the reference model. By way of the rotation, objects fall out of the visual field. This is taken into account by simultaneous rotation of the reference model.

In the following, it will be described how shaking is counteracted. For image stabilization, the camera advantageously is borne in shake-free manner, and/or an electronic shake compensation unit optionally may be incorporated.

In the following, it will be described how relative movement can be evaluated and/or taken into account. Other vehicles move relative to the vehicle (i.e. for example the vehicle on which the camera is mounted). For example, other vehicles overtake, approach, move away or cross the lane. Since these (i.e. the movable vehicles) are no reliable features, they are advantageously computed out of the image (i.e. out of the camera image and/or out of the preprocessed camera image). To this end, the other vehicles are detected and characterized with the OnMove detector.

Furthermore, it is to be pointed out that the wind moves the clouds and makes the trees rustle. These structures are marked as "bushy and fleecy", since they have no specific expressiveness.

In the following, a monotony detector will be described, which for example uses horizontal/vertical histogramming. Horizontal histogramming or vertical histogramming is a monotony detector offering high expressiveness for solid features. The feature vectors are a series of space-time 3D color cubes expanding or contracting depending on speed and distance. A temporally expandable dwelling time in the pattern search is supported by scale-invariant search algorithms.

In the following, it will be described how the location determination can be enhanced also by way of an aperture. The camera advantageously is provided with an automatically adjustable aperture, or automatically regulates so as to alleviate a dazzling effect due to direct radiation of the sun.

In the following, it will be described how a search can be performed. In a preferred embodiment, a pattern vector is associated with each image sequence. With the aid of a search algorithm and/or with the aid of several search algorithms, the series of pattern vectors is compared with stored series, and a distance between a pattern vector sequence and a master sequence (i.e. a stored series, for example) is output. For example, the position then is determined from the distance.

Besides, it is to be pointed out that further information that may be useful for understanding the present invention may, for example, be taken from the following publications:

Jorge Nuno de Almeida e Sousa Lobo: "Inertial Sensor Data Integration in Computer Vision Systems" (M. Sc. Thesis at the University of Coimbra, Faculty of Science and Technology, Electrical and Computer Engineering Department);

A. Bartels and S. Zeki: "The Architecture of the Color Center in the Human Visual Brain, New Result and a Preview" (Eur. J. Neurosci. 12 (1), 172-193 (2000));

J. Romaya: "A Computer Model of the Land Mondrian Retinex Experiment" (Eur. J. Neurosci. 12 (1), 191-193 (2000));

A. Bartels and S. Zeki: "The chronoarchitecture of the cerebral cortex" (Philosophical Transactions of the Royal Society B (2005) 360, 733-750);

K. Gegenfurtner: "Color in the Cortex Revisited" (Nature Neuroscience, vol. 4, no. 4, April 2001, Nature Publishing Group);

L. Rüttiger et al.: "Selective Color Constancy Deficits after Circumscribed Unilateral Brain Lesions" (The Journal of Neuroscience, Apr. 15, 1999, 19 (8): 3098-23106).

In summary, it may thus be stated that the retinal preprocessing represents a substantial aspect of the present patent. According to the invention, color constancy is achieved here (c.f. also the publications by Zeki). Furthermore, various retina operators are employed (c.f. also the publications by Roska). Furthermore, a Hubel-Wiese network is employed, as has been described by Klefenz, for example. Another important aspect of the present invention is the Google 3D house referencing with rotation of the model to momentary direction of sight.

A further aspect of the present invention is that, for example (at least regarding coloring), original painting of buildings or houses is used in the 3D model.

Besides, it is to be pointed out that the generation of the model images for the inventive position determination corresponds to a driving simulator fed by retina images, for example. In other words, while a user is moving with their vehicle, model images adapted to an approximate or estimated position of the user are generated. Precise and/or fine determination of the position takes place, for example, by comparing the model images with the camera images and/or preprocessed camera images. According to an embodiment of the present invention, what is obtained is a worldwide driving simulator fed with retina images.

In the following, yet another aspect of the present invention will be described. According to an aspect of the present invention, it follows that:

Shape=Color Area+Contour.

Thus, for example, color areas constant in color ratio can be generated by retinex and color space transform and inverse transform. A contour bounds the color area. Thereupon, local extremes are determined, as this is described in the non-prepublished German patent application DE 102005047160.9-53 entitled "Vorrichtung, Verfahren and Computerprogramm zum Ermitteln einer Information über eine Form und/oder einer Lage einer Ellipse in einem graphischen Bild" (inventor: Frank Klefenz), for example. Each local extreme also carries information on a local radius of curvature (for example in pixels). With this, an object or arbitrary shape can be assembled in steadily continuous manner by way of the supporting locations of the extremes and their imaginary reconstruction and approximation by way of the radii of curvature through the extreme. With this, object detection is possible efficiently and easily. For example, the method is suited for the detection of writing. For example, the letter "O" has four extremes. When laying the corresponding radii of curvature through the four extremes, the "O" can be constructed in steadily continuable manner. The method may, for example, be extended to real object scenes, e.g. to cars. In addition, linear elements of different slope are searched for, which is also possible with a parallel Hough transform method with corresponding pattern programming, for example. A Hough transform method is described in EP 1032891, for example.

It is to be pointed out that the described way of pattern recognition of characters corresponds to the kind of how everyone draws characters. For example, a B is a vertical stroke with two arches ("squiggles"). As it is known from content retrieval methods, a number of horizontal and vertical lines is determined and recorded in a histogram in block environments. The method according to the invention is much more precise, since a histogram or radii of curvature is plotted, in which it is counted how often various radii of curvature (for example with three, four, five, six, seven or an infinite number of pixels as radius of curvature) were counted in the image, for example, according to an aspect of the present invention. The stored histogram is compared with the current histogram of a search pattern.

In other words, when performing a Hough transform, it is determined which curvature a detected line course has, according to the invention. Then, a histogram in which the frequency of various radii of curvature is plotted is created. A corresponding histogram created for a model image then is compared with a histogram for a current camera image and/or a preprocessed camera image. If there is a sufficient matching, it is determined that the current camera image and/or the preprocessed camera image matches with the model image with sufficient accuracy. In other words, the histogram mentioned, which provides information on the frequency of occurrence of curved lines of various radii of curvature, may be part of the above-described feature vector, for example.

Besides, it is to be pointed out that the doctoral thesis "Parallel Hardware Architectures for the Life Sciences" by A. Epstein describes a complete circuitry realization of a Smith-Watermann algorithm for local alignment ("Smith-Watermann local alignment algorithm"). The algorithm mentioned may, for example, also be employed in a "database query by humming" application (query by humming application). The algorithm mentioned also is described in DE 10117870 entitled "Verfahren und Vorrichtung zum Überführen eines Musiksignals in eine Noten-basierte Beschreibung, und Verfahren und Vorrichtung zum Referenzieren eines Musiksignals in einer Datenbank" (inventors: Frank Klefenz, Karlheinz Brandenburg and Matthias Kaufmann).

DNA sequencing is not a limiting time factor in a "database query by humming" application (query by humming application). In video-aided navigation, however, it is preferred to utilize maximum computation power of an available chip. By employing a Hough transform chip (for performing pattern recognition and/or identification of line segments), as described in chapter 7 of the doctoral thesis by Epstein, and a DNA sequencing chip, as described in chapter 8 of the doctoral thesis by Epstein, for example, a real-time system symbolically referencing street scenes at full power can be created. It is to be pointed out that the Hough transform chip according to Epstein represents a complete circuitry implementation of the apparatus and/or the method according to EP 1032891 ("Verfahren und Einrichtung zur Detektion und Koinzidenzbringung abschnittsweise in monotone und stetige Trajektorien wandelbarer Signalformen"; inventor: Frank Klefenz).

Figure 17:
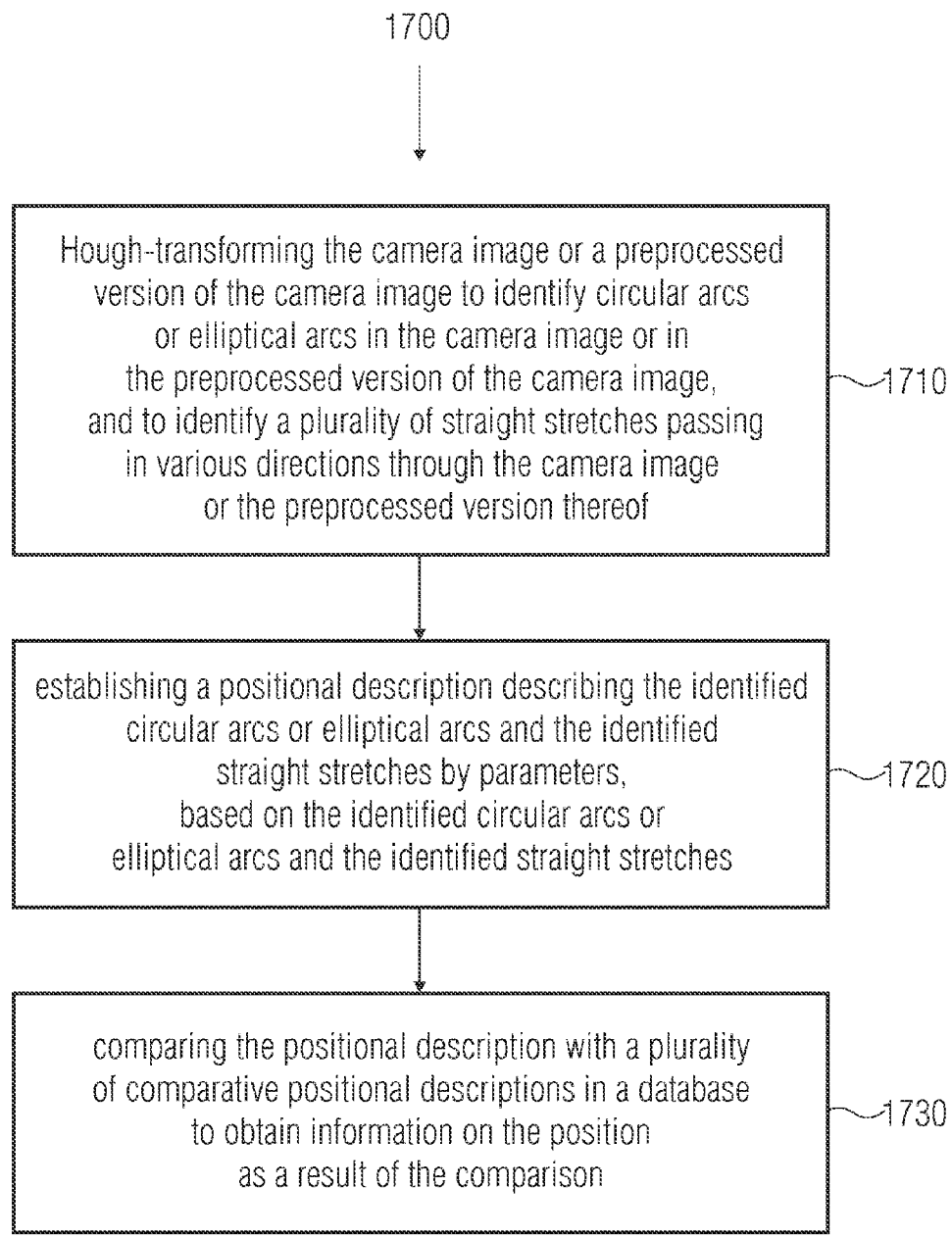
FIG. 17 shows a block diagram of an inventive method for determining a position based on a camera image from a camera.

FIG. 17 shows a flowchart of a method of determining a position on the basis of a camera image from a camera, according to the invention. The method according to FIG. 17 is designated with 1700 in its entirety. The method 1700 includes, in a first step 1710, Hough-transforming the camera image or a preprocessed version of the camera image, in order to identify circular arcs or elliptical arcs in the camera image or in the preprocessed version of the camera image, and identify a plurality of straight stretches passing in various directions through the camera image or through the preprocessed version derived therefrom. The method 1700 includes, in a second step 1720, establishing a positional description describing the identified circular arcs or elliptical arcs and the identified straight stretches by parameters, on the basis of the identified circular arcs and elliptical arcs and the identified straight stretches. The method 1700 further includes, in a third step 1730, comparing the positional description with a plurality of comparative positional descriptions in a database, in order to obtain information on the position as a result of the comparison.

Furthermore, the method 1700 may be supplemented by all steps explained in the present description.

The present invention also includes a corresponding computer program. In other words, the apparatus according to the invention and the method according to the invention may be implemented in hardware or in software. The implementation may be on a digital storage medium, for example a disk, a CD, a DVD, in a ROM, PROM, EPROM, EEPROM or a FLASH memory with electronically readable control signals capable of cooperating with a programmable computer system so that the corresponding method is executed. In general, the invention thus also is a computer program product with program code stored on a machine-readable carrier for performing the inventive method, when the computer program product is executed on a computer. In other words, the present invention may also be realized as a computer program with program code for performing the inventive method, when the computer program is executed on a computer.

In summary, it may thus be stated that the present invention provides a concept enabling to substantially increase accuracy and reliability in a determination of a position on the basis of a camera image.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for determining a position on the basis of a camera image from a camera, comprising:

a Hough transformer formed to identify circular arcs or elliptical arcs in the camera image or in a preprocessed version of the camera image derived therefrom, and to identify a plurality of straight stretches passing in various directions through the camera image or through the preprocessed version, wherein the Hough transformer is formed to provide information on a location of an identified circular arc or elliptical arc, and to provide information on a radius of curvature of the identified circular arc or elliptical arc;

a positional description establisher formed to acquire a positional description describing the identified circular arcs or elliptical arcs and the identified straight stretches by parameters, on the basis of the identified circular arcs or elliptical arcs and on the identified straight stretches, wherein the positional description for identified circular arcs or elliptical arcs comprises information on a location of an identified circular arc or elliptical arc and information on a radius of curvature of the identified circular arc or elliptical arc; and a database comparator formed to compare the positional description with a plurality of comparative positional descriptions, and to acquire information on a position as a result of the comparison, wherein the database comparator is formed to form a difference between a feature vector of the positional description and feature vectors of the comparative positional descriptions, and to output, as the result, positional information belonging to the corresponding comparative positional description in response to the difference for one of the comparative positional descriptions being sufficiently small.

2. The apparatus according to claim 1, wherein the positional description establisher is formed to acquire a description of a course of the road, which reproduces the stretch course as an ordered description of identified circular arcs or elliptical arcs, as the positional description.

3. The apparatus according to claim 1, wherein the positional description establisher is formed to acquire the positional description so that the positional description comprises a description of a roadway edge, a lane boundary or a roadway center.

4. The apparatus according to claim 1, wherein the Hough transformer is formed to provide information on a location, an arc length, a radius of curvature, or a radius of curvature of the identified circular arcs or elliptical arcs, and provide information on a location, a length or a direction of the identified straight stretches.

5. The apparatus according to claim 1, wherein the positional description establisher is formed to acquire the positional description from arc course parameters and straight stretch course parameters provided by the Hough transformer, which describe the identified circular arcs or elliptical arcs and the identified straight stretches.

6. The apparatus according to claim 1, wherein the positional description establisher is formed to establish a description of the course of the road by patching selected adjacent identified circular arcs or elliptical arcs or straight stretches together, wherein the positional description establisher is formed to select the selected circular arcs or elliptical arcs or straight stretches used for the description of the course of the road from an entirety of identified circular arcs or elliptical arcs and identified straight stretches so that the selected circular arcs or elliptical arcs and straight stretches describe a continuous course of the road from a default starting point to a default end point.

7. The apparatus according to claim 1, wherein the apparatus comprises an image mapper, which is formed to map the image from the camera or a preprocessed camera image by projective mapping so that a preprocessed image developing thereby shows a top view onto a landscape captured by the camera when the image from the camera shows a panoramic view of the landscape.

8. The apparatus according to claim 1, wherein the apparatus comprises an image assembler, which is formed to assemble a plurality of camera images or preprocessed camera images captured at various time instants to an assembled image.

9. The apparatus according to claim 8, wherein the image assembler is formed to shift or rotate a first image to be assembled and a second image to be assembled with respect to each other until a deviation of the assembled images rotated with respect to each other or shifted with respect to each other in an overlapping region is sufficiently small in accordance with a predefined deviation rule.

10. The apparatus according to claim 8, wherein the image assembler is formed to choose a starting value for a shift of the images to be assembled on the basis of a previously determined mean shift vector.

11. The apparatus according to claim 1, wherein the positional description establisher is formed to generate a feature vector describing successive sections of the course of the road on the basis of the identified circular arcs or elliptical arcs and on the identified straight stretches.

12. The apparatus according to claim 11, wherein the database comparator is formed to compare the feature vector with a plurality of comparative feature vectors associated with positions,
to acquire a measure of differences between the feature vector and the comparative feature vectors, and
to determine the position belonging to the feature vector on the basis of the measure of the difference.

13. The apparatus according to claim 1, wherein the apparatus comprises an edge detector, which is formed to detect edges in the camera image, and
to generate the edge image as a preprocessed version of the camera image on the basis of the camera image.

14. The apparatus according to claim 13, wherein the edge detector is formed to convert the camera image to a monochrome image, using a threshold value, and detect the edge in the monochrome image.

15. The apparatus according to claim 1, wherein the apparatus comprises an edge detector, which is formed to detect edges in the image and to generate an edge image on the basis of the image;
wherein the Hough transformer is formed to provide location information on the identified circular arcs or elliptical arcs, and
to provide location information on the identified straight stretches;
wherein the positional description establisher is formed to generate a description of the course of the road in form of an ordered combination of circular arcs or elliptical arcs and of straight stretches, which together describe the course of the road, on the basis of the identified circular arcs or elliptical arcs and the identified straight stretches; and
wherein the database comparator is formed to compare the description of the course of the road in form of the ordered description with a plurality of comparative descriptions, which describe comparative courses of roads in form of ordered combinations of circular arcs or elliptical arcs and of straight stretches,
to determine a measure of deviations between the description of the course of the road and the comparative descriptions, and
to provide the positional information associated with a certain comparative course of the road as the particular position if a deviation between the description of the course of the road and the comparative description of the particular comparative course of the road is smaller than a default threshold or smaller than deviations determined for the remaining comparative courses of roads.

16. The apparatus according to claim 1, wherein the apparatus is formed to determine a position of a vehicle on the basis of the camera image or on the basis of the plurality of camera images.

17. The apparatus according to claim 1, wherein the camera is attached at a vehicle to capture camera images of a landscape located in front of the vehicle or a landscape located behind the vehicle.

18. The apparatus according to claim 1, wherein the positional description establisher is formed to acquire a description of an environment describing the environment as a representation of identified circular arcs or elliptical arcs or straight stretches, as the positional description.

19. The apparatus according to claim 18, wherein the database comparator is formed to compare the positional description with a plurality of comparative positional descriptions,
to acquire the information on the position as a result of the comparison,
wherein the comparative positional descriptions describe circular arcs or elliptical arcs and straight stretches comprised in a three-dimensional model of the environment.

20. A method of determining a position on the basis of a camera image from a camera, comprising:
Hough-transforming the camera image or a preprocessed version of the camera image, in order to identify circular arcs or elliptical arcs in the camera image or in the preprocessed version of the camera image, and to identify a plurality of straight stretches passing in various directions through the camera image or through the preprocessed version derived therefrom,
wherein, by Hough-transforming, information on a location of an identified circular arc or elliptical arc and information on a radius of curvature of the identified circular arc or elliptical arc are provided;
establishing a positional description describing the identified circular arcs or elliptical arcs and the identified straight stretches by parameters, on the basis of the identified circular arcs or elliptical arcs and the identified straight stretches,
wherein the positional description for identified circular arcs or elliptical arcs comprises information on a location of an identified circular arc or elliptical arc and information on a radius of curvature of the identified circular arc or elliptical arc; and
comparing the positional description with a plurality of comparative positional descriptions in a database, in order to acquire information on the position as a result of the comparison,
wherein a difference between a feature vector of the positional description and feature vectors of the comparative positional descriptions is being formed,
and wherein positional information belonging to the corresponding comparative positional description is output as the result in response to the difference for one of the comparative positional descriptions being sufficiently small.

21. A computer readable non-transitory medium having a computer program for performing, when the computer program is executed on a computer, a method of determining a position on the basis of a camera image from a camera, the method comprising:

Hough-transforming the camera image or a preprocessed version of the camera image, in order to identify circular arcs or elliptical arcs in the camera image or in the preprocessed version of the camera image, and to identify a plurality of straight stretches passing in various directions through the camera image or through the preprocessed version derived therefrom, wherein, by Hough-transforming, information on a location of an identified circular arc or elliptical arc and information on a radius of curvature of the identified circular arc or elliptical arc are provided;

establishing a positional description describing the identified circular arcs or elliptical arcs and the identified straight stretches by parameters, on the basis of the identified circular arcs or elliptical arcs and the identified straight stretches, wherein the positional description for identified circular arcs or elliptical arcs comprises information on a location of an identified circular arc or elliptical arc and information on a radius of curvature of the identified circular arc or elliptical arc; and comparing the positional description with a plurality of comparative positional descriptions in a database, in order to acquire information on the position as a result of the comparison, wherein a difference between a feature vector of the positional description and feature vectors of the comparative positional descriptions is being formed, and wherein positional information belonging to the corresponding comparative positional description is output as the result in response to the difference for one of the comparative positional descriptions being sufficiently small.

* * * * *